United States Patent
Lin et al.

(10) Patent No.: US 11,871,429 B2
(45) Date of Patent: *Jan. 9, 2024

(54) DETERMINATION OF SEARCH SPACE SETS FOR PHYSICAL DOWNLINK CONTROL CHANNEL (PDCCH) MONITORING

(71) Applicant: Samsung Electronics Co., Ltd., Suwon-si (KR)

(72) Inventors: Qiongjie Lin, Sunnyvale, CA (US); Aris Papasakellariou, Houston, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/813,302

(22) Filed: Jul. 18, 2022

(65) Prior Publication Data
US 2022/0369298 A1 Nov. 17, 2022

Related U.S. Application Data

(63) Continuation of application No. 16/816,103, filed on Mar. 11, 2020, now Pat. No. 11,395,283.
(Continued)

(51) Int. Cl.
*H04W 72/23* (2023.01)

(52) U.S. Cl.
CPC .................................. *H04W 72/23* (2023.01)

(58) Field of Classification Search
CPC ... H04L 5/0087; H04L 5/0053; H04L 5/0096; H04L 5/0091; H04L 5/1469; H04L 5/0023; H04L 5/001; H04L 5/0035
See application file for complete search history.

(56) References Cited

U.S. PATENT DOCUMENTS

2014/0213244 A1* 7/2014 Oh .......................... H04W 4/90
455/419
2019/0222357 A1 7/2019 Huang et al.
(Continued)

FOREIGN PATENT DOCUMENTS

| CN | 109417762 A | 3/2019 |
|---|---|---|
| WO | 2018144899 A1 | 8/2018 |

OTHER PUBLICATIONS

"3rd Generation Partnership Project; Technical Specification Group Radio Access Network; NR; Physical channels and modulation (Release 15)", 3GPP TS 38.211 V15.5.0, Mar. 2019, 96 pages.
(Continued)

*Primary Examiner* — Chi Ho A Lee
*Assistant Examiner* — Andrew Lee

(57) ABSTRACT

A user equipment, a base station, and a method for determining search space sets for PDCCH monitoring. The UE includes a receiver and a processor and is configured to receive a configuration for search space sets. The configuration includes a first group of search space sets, a second group of search space sets, a first group index for the first group of search space sets, and a second group index for the second group of search space sets. The UE is also configured to determine an indication corresponding to either the first group index or the second group index, and to receive, based on the indication, physical downlink control channels (PDCCHs) according to either the first group of search space sets or the second group of search space sets.

20 Claims, 22 Drawing Sheets

Related U.S. Application Data

(60) Provisional application No. 62/900,038, filed on Sep. 13, 2019, provisional application No. 62/858,021, filed on Jun. 6, 2019.

(56) References Cited

U.S. PATENT DOCUMENTS

| | | | |
|---|---|---|---|
| 2019/0312665 A1 | 10/2019 | Jo et al. | |
| 2020/0127786 A1* | 4/2020 | Kwak | H04B 7/0417 |
| 2020/0280971 A1 | 9/2020 | Moon et al. | |
| 2020/0322109 A1 | 10/2020 | Yu et al. | |
| 2020/0336928 A1 | 10/2020 | Seo et al. | |
| 2020/0351129 A1 | 11/2020 | Kwak et al. | |
| 2020/0351682 A1 | 11/2020 | Cirik et al. | |
| 2020/0374960 A1 | 11/2020 | Deenoo et al. | |
| 2020/0413410 A1* | 12/2020 | Zhou | H04L 5/0053 |
| 2021/0022124 A1 | 1/2021 | Miao et al. | |
| 2021/0144694 A1* | 5/2021 | Lee | H04L 1/1812 |
| 2021/0235469 A1 | 7/2021 | Mu | |
| 2021/0274536 A1 | 9/2021 | Shin et al. | |
| 2021/0306996 A1 | 9/2021 | Matsumura et al. | |
| 2021/0321446 A1 | 10/2021 | Lee et al. | |
| 2022/0061082 A1* | 2/2022 | Wang | H04L 5/0053 |
| 2022/0132342 A1* | 4/2022 | Kim | H04W 74/0816 |
| 2022/0159733 A1* | 5/2022 | Cirik | H04L 5/0053 |
| 2022/0225390 A1* | 7/2022 | Harada | H04W 72/23 |
| 2022/0330258 A1* | 10/2022 | Xiao | H04L 5/0091 |

OTHER PUBLICATIONS

"3rd Generation Partnership Project; Technical Specification Group Radio Access Network; NR; Multiplexing and channel coding( Release 15)", 3GPP TS 38.212 V15.5.0, Mar. 2019, 101 pages.

"3rd Generation Partnership Project; Technical Specification Group Radio Access Network; NR; Physical layer procedures for control (Release 15)", 3GPP TS 38.213 V15.5.0, Mar. 2019, 104 pages.

"3rd Generation Partnership Project; Technical Specification Group Radio Access Network; NR; Physical layer procedures for data (Release 15)", 3GPP TS 38.214 V15.5.0, Mar. 2019, 103 pages.

"3rd Generation Partnership Project; Technical Specification Group Radio Access Network; NR; Physical layer measurements (Release 15)", 3GPP TS 38.215 V15.5.0, Jun. 2019, 16 pages.

"5G; NR; Medium Access Control (MAC) protocol specification (3GPP TS 38.321 version 15.5.0 Release 15)", ETSI TS 138 321 V15.5.0, May 2019, 80 pages.

"3rd Generation Partnership Project; Technical Specification Group Radio Access Network; NR; Radio Resource Control (RRC) protocol specification (Release 15)", 3GPP TS 38.331 v15.5.0, Mar. 2019, 491 pages.

"3rd Generation Partnership Project; Technical Specification Group Radio Access Network; NR; Study on UE Power Saving (Release 16)", 3GPP TR 38.840 V0.1.1, Feb. 2019, 33 pages.

International Search Report and Written Opinion of the International Searching Authority in connection with International Application No. PCT/KR2020/007370 dated Sep. 7, 2020, 10 pages.

Smog, "Discussion on PDCCH-based power saving signal/channel design," R1-1906524, 3GPP TSG RAN WG1 Meeting #97, Reno, USA, May 13-17, 2019,10 pages.

LG Electronics, "Discussion on PDCCH-based power saving signal/ channel," R1-1906695, 3GPP TSG RAN WG1 Meeting #97, Reno, USA, May 13-17, 2019, 6 pages.

Qualcomm Incorporated, "PDCCH-based power saving channel design," R1-1907294, 3GPP TSG RAN WG1 Meeting #97, Reno, USA, May 13-17, 2019, 16 pages.

Samsung, "PDCCH-based power saving signal/channel," R1-1906980, 3GPP TSG RAN WG1 Meeting #97, Reno, USA, May 13-17, 2019, 12 pages.

Extended European Search Report dated Feb. 15, 2022 regarding Application No. 20818605.6, 8 pages.

\* cited by examiner

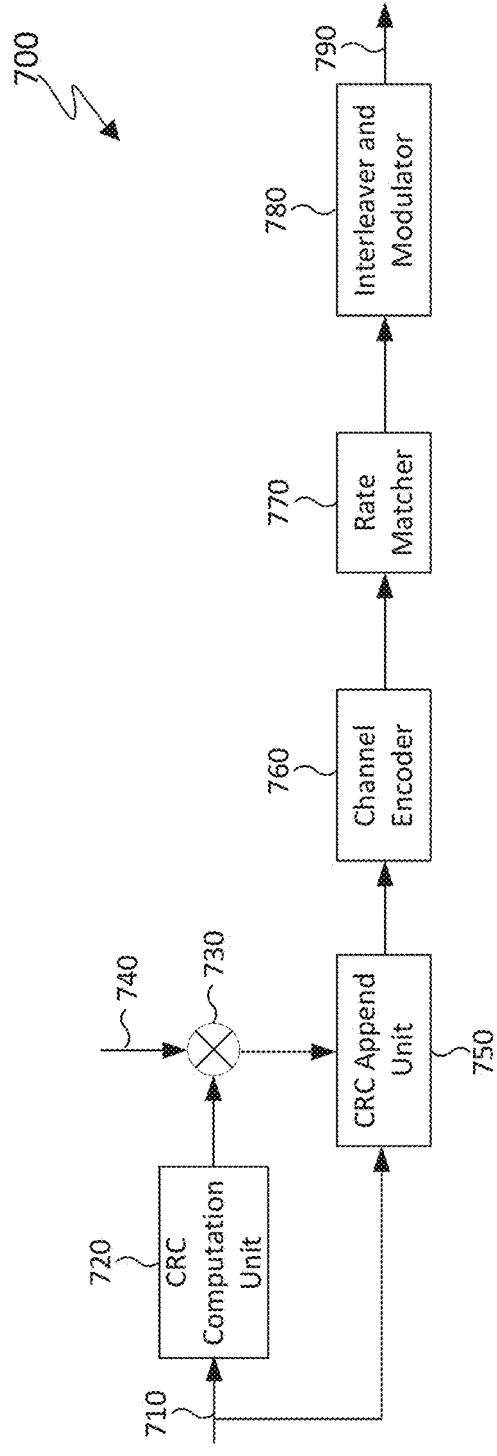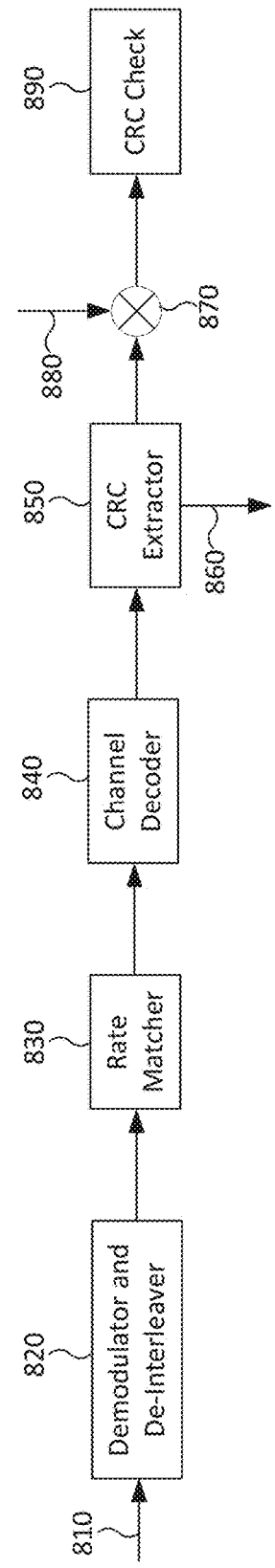
FIG. 7
FIG. 8

DETERMINATION OF SEARCH SPACE SETS FOR PHYSICAL DOWNLINK CONTROL CHANNEL (PDCCH) MONITORING

CROSS-REFERENCE TO RELATED APPLICATION AND CLAIM OF PRIORITY

This application is a continuation of U.S. patent application Ser. No. 16/816,103 filed on Mar. 11, 2020, which claims priority under 35 U.S.C. § 119(e) to U.S. Provisional Patent Application No. 62/858,021 filed on Jun. 6, 2019, and to U.S. Provisional Patent Application No. 62/900,038 filed on Sep. 13, 2019. The above-identified provisional patent applications are hereby incorporated by reference in its entirety.

TECHNICAL FIELD

The present disclosure relates to a pre-5$^{th}$-Generation (5G) or 5G communication system to be provided for supporting higher data rates Beyond 4$^{th}$-Generation (4G) communication system such as Long-Term Evolution (LTE). More particularly, some embodiments of the present disclosure are directed to determination of search space sets for PDCCH monitoring.

BACKGROUND

To meet the increased demand for wireless data services since the deployment of 4G communication systems, efforts have been made to develop an improved 5G or pre-5G communication system. Therefore, the 5G or pre-5G communication system is also called a 'Beyond 4G Network' or a 'Post LTE System'. A 5G communication system can be implemented in higher frequency (mmWave) bands, e.g., 60 GHz bands, compared to a 4G communication system to provide higher data rates. To decrease a propagation loss of radio waves and increase a transmission distance, beamforming, massive multiple-input multiple-output (MIMO), Full Dimensional MIMO (FD-MIMO), array antenna, analog beamforming, and large-scale antenna techniques are considered in 5G communication systems. In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like. In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

SUMMARY

Embodiments of the present disclosure include a user equipment (UE) and a base station (BS) for determining search space sets for PDCCH monitoring.

One embodiment is directed to a UE that includes a receiver configured to receive a configuration for search space sets. The configuration can include a first group of search space sets and a second group of search space sets, and a first group index for the first group of search space sets and a second group index for the second group of search space sets. The UE also includes a processor operably connected to the receiver and configured to determine an indication corresponding to either the first group index or the second group index. The receiver is further configured to receive, based on the indication, physical downlink control channels (PDCCHs) according to either the first group of search space sets or the second group of search space sets.

Another embodiment is directed to a BS for determining search space sets for PDCCH monitoring. The BS includes a processor configured to generate a configuration for search space sets. The configuration can include a first group of search space sets and a second group of search space sets, and a first group index for the first group of search space sets and a second group index for the second group of search space sets. The BS also includes a transceiver operably connected to the processor and configured to transmit the configuration and transmit physical downlink control channels (PDCCHs) according to either the first group of search space sets or the second group of search space sets. Additionally, the PDCCHs are based on an indication corresponding to either the first group index or the second group index.

Yet another embodiment is directed to a method for determining search space sets for PDCCH monitoring. The method includes a step of receiving a configuration for search space sets. The configuration includes a first group of search space sets and a second group of search space sets, and a first group index for the first group of search space sets and a second group index for the second group of search space sets. The method also includes a step of determining an indication corresponding to either the first group index or the second group index. The method includes another step of receiving, based on the indication, physical downlink control channels (PDCCHs) according to either the first group of search space sets or the second group of search space sets.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C. Likewise, the term "set" means one or more. Accordingly, a set of items can be a single item or a collection of two or more items.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of this disclosure and its advantages, reference is now made to the following description, taken in conjunction with the accompanying drawings, in which:

FIG. 7 illustrates an exemplary encoding flowchart for a DCI format in accordance with various embodiments of this disclosure;

FIG. 8 illustrates an exemplary decoding flowchart for a DCI format in accordance with various embodiments of this disclosure;

DETAILED DESCRIPTION

Figure 1:
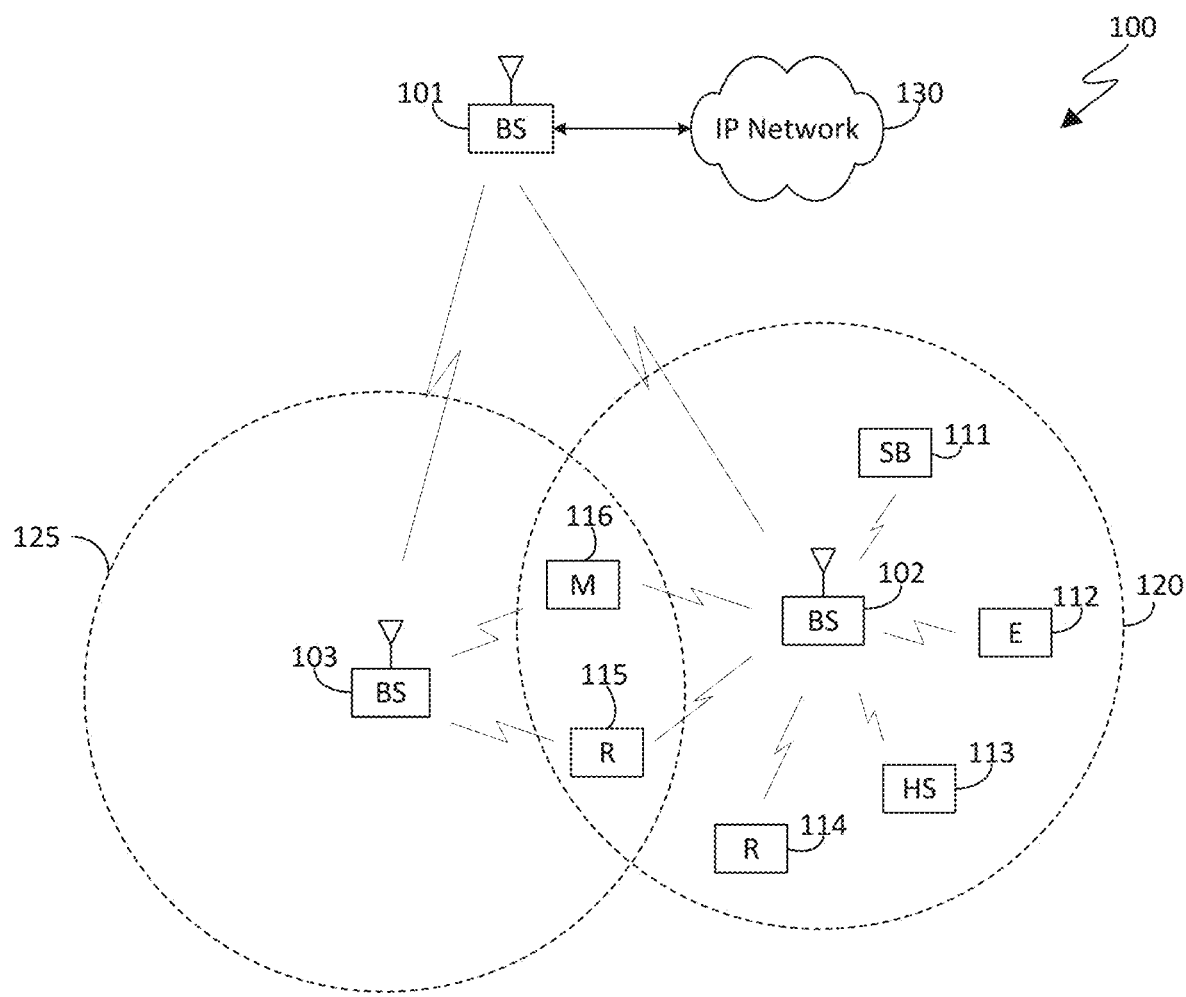
FIG. 1 illustrates an exemplary networked computing system according to various embodiments of this disclosure.

The figures included herein, and the various embodiments used to describe the principles of the present disclosure are by way of illustration only and should not be construed in any way to limit the scope of the disclosure. Further, those skilled in the art will understand that the principles of the present disclosure may be implemented in any suitably arranged wireless communication system.

The following documents are hereby incorporated by reference into the present disclosure as if fully set forth herein: 3GPP TS 38.211 v15.5.0, "NR; Physical channels and modulation", hereinafter "REF 1"; 3GPP TS 38.212 v15.5.0, "NR; Multiplexing and channel coding", hereinafter "REF 2"; 3GPP TS 38.213 v15.5.0, "NR; Physical layer procedures for control", hereinafter "REF 3"; 3GPP TS 38.214 v15.5.0, "NR; Physical layer procedures for data", hereinafter "REF 4"; 3GPP TS 38.215 v15.5.0, "NR; Physical layer measurements", hereinafter "REF 5"; 3GPP TS 38.321 v15.5.0, "NR; Medium Access Control (MAC) protocol specification", hereinafter "REF 6"; 3GPP TS 38.331 v15.5.0, "NR; Radio Resource Control (RRC) protocol specification", hereinafter "REF 7"; and 3GPP TR 38.840 v0.1.1, "NR1 Study on UE power Saving", hereinafter "REF 8".

A time unit for downlink (DL) signaling or for uplink (UL) signaling on a cell can include one or more symbols of a slot that includes a predetermined number of symbols, such as 14 symbols, and has predetermined duration. A bandwidth (BW) unit is referred to as a resource block (RB). One RB includes a number of sub-carriers (SCs) and one SC in one symbol of a slot is referred to as resource element (RE). In one example, a slot can have duration of 1 millisecond and an RB can have a bandwidth of 180 KHz when the RB includes 12 SCs with inter-SC spacing of 15 KHz. In another example, a slot can have duration of 0.25 milliseconds and an RB can have a bandwidth of 720 KHz when the RB includes 12 SCs with inter-SC spacing of 60 KHz. A slot can include symbols used for DL transmissions or for UL transmissions including all symbols being used for DL transmissions or all symbols being used for UL transmissions. For more detail, refer to REF 1.

DL signals include data signals conveying information content, control signals conveying DL control information (DCI), and reference signals (RS) that are also known as pilot signals. A gNB transmits data information or DCI through respective physical DL shared channels (PDSCHs) or physical DL control channels (PDCCHs). A gNB transmits one or more of multiple types of RS s including channel state information RS (CSI-RS) and demodulation RS (DMRS), as discussed in more detail in REF 1. A CSI-RS is primarily intended for UEs to perform measurements and provide channel state information (CSI) to a gNB. A DMRS is received only in the BW of a respective PDCCH or PDSCH reception and a UE typically uses the DMRS to demodulate data or control information.

UL signals also include data signals conveying information content, control signals conveying UL control information (UCI), DMRS associated with data or UCI demodulation, sounding RS (SRS) enabling a gNB to perform UL channel measurement, and a random access (RA) preamble enabling a UE to perform random access (as discussed in more detail in REF 1). A UE transmits data information or UCI through a respective physical UL shared channel (PUSCH) or a physical UL control channel (PUCCH). When a UE simultaneously transmits data information and UCI, the UE can multiplex both in a PUSCH. UCI includes hybrid automatic repeat request acknowledgement (HARQ-ACK) information, indicating correct or incorrect detection of transport blocks (TBs) with data information in a PDSCH, scheduling request (SR) indicating whether a UE has data to transmit in its buffer, and CSI reports enabling a gNB to select appropriate parameters for PDSCH or PDCCH transmissions to a UE (as discussed in more detail in REF 4).

UL RS includes DMRS and SRS. DMRS is transmitted only in a BW of a respective PUSCH or PUCCH transmission. A gNB can use a DMRS to demodulate information in a respective PUSCH or PUCCH. SRS is transmitted by a UE to provide a gNB with an UL CSI and, for a TDD system, also DL CSI. Additionally, in order to establish synchronization or an initial RRC connection with a gNB, a UE can transmit a physical random-access channel (PRACH), as discussed in more detail in REF 3 and REF 5. To reduce control overhead for scheduling receptions or transmission over multiple RBs, an RB group (RBG) can be used as a unit for PDSCH receptions or PUSCH transmissions where an RBG includes a predetermined number of RBs (see also REF 2 and REF 4).

Figure 5:
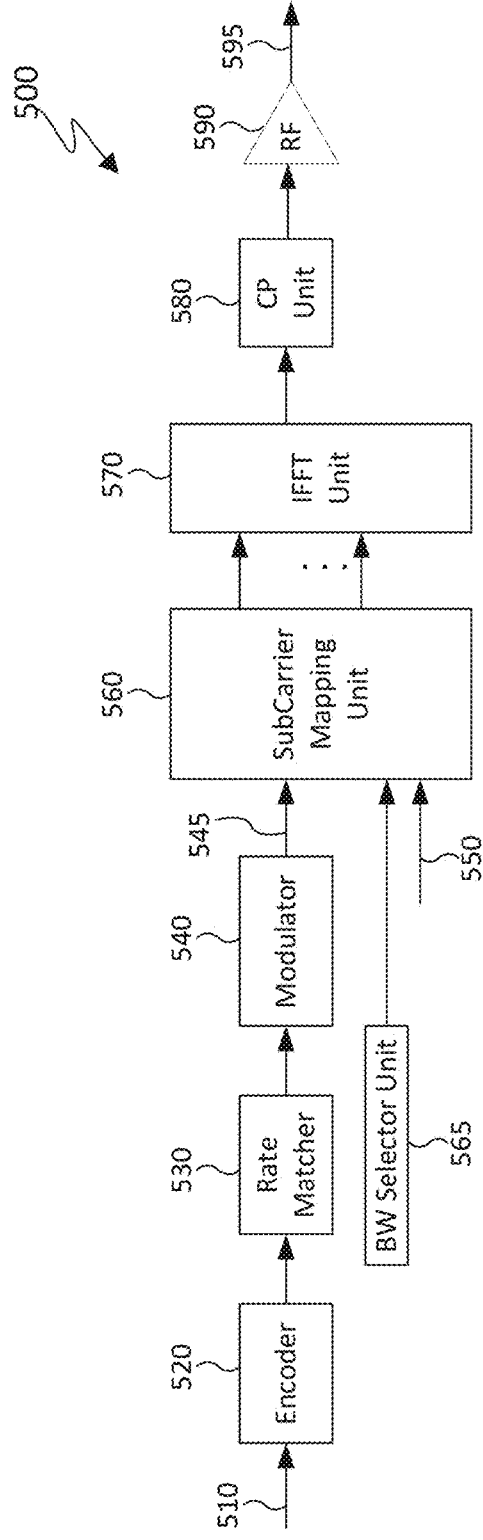
FIG. 5 illustrates an exemplary transmitter according to various embodiments of this disclosure.
Figure 6:
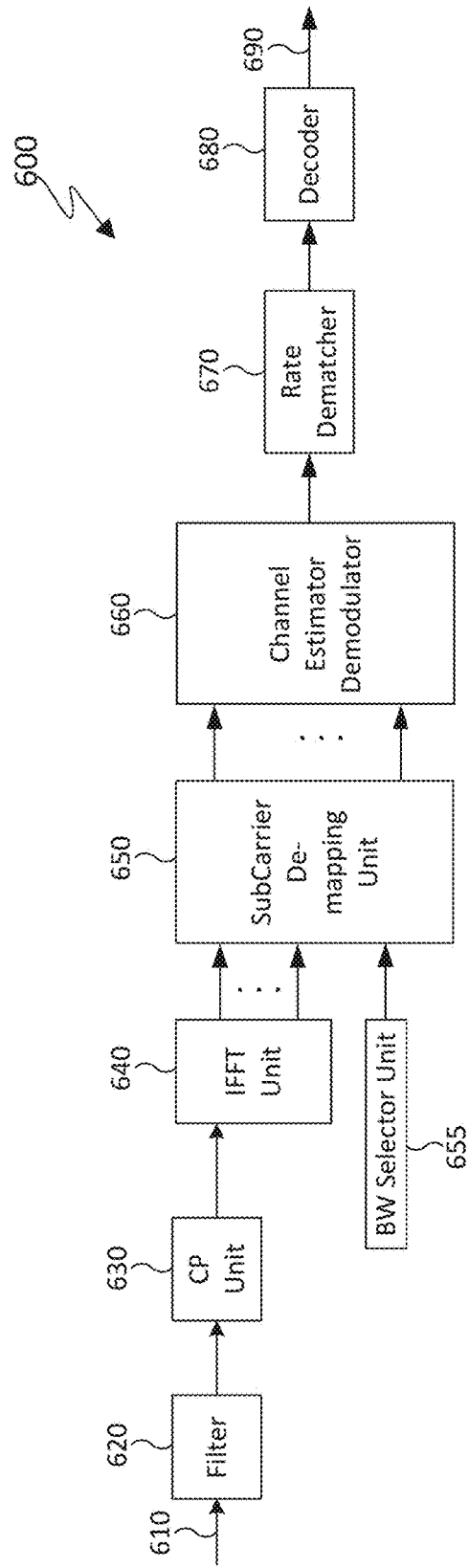
FIG. 6 illustrates an exemplary receiver according to various embodiments of this disclosure.

DL transmissions or UL transmissions can be based on an orthogonal frequency division multiplexing (OFDM) waveform including a variant using DFT preceding that is known as DFT-spread-OFDM, as discussed in more detail in REF 1. Exemplary transmitters and receivers using OFDM are depicted in FIGS. 5 and 6 that follow.

A UE typically monitors multiple candidate locations for respective potential PDCCH receptions to decode one or more DCI formats in a slot, for example as described in REF 3. A DCI format includes cyclic redundancy check (CRC) bits in order for the UE to confirm a correct detection of the DCI format. A DCI format type is identified by a radio network temporary identifier (RNTI) that scrambles the CRC bits, as described in REF 2. For a DCI format scheduling a PDSCH or a PUSCH to a single UE, the RNTI can be a cell RNTI (C-RNTI) and serve as a UE identifier. For a DCI format scheduling a PDSCH conveying system information (SI), the RNTI can be a SI-RNTI. For a DCI format scheduling a PDSCH providing a random-access response (RAR), the RNTI can be a RA-RNTI. For a DCI format providing transmit power control (TPC) commands to a group of UEs, the RNTI can be a TPC-RNTI. Each RNTI type can be configured to a UE through higher layer signaling such as RRC signaling, as discussed in REF 5. A DCI format scheduling PDSCH transmission to a UE is also referred to as DL DCI format or DL assignment while a DCI format scheduling PUSCH transmission from a UE is also referred to as UL DCI format or UL grant.

A PDCCH transmission can be within a set of PRBs. A gNB can configure a UE one or more sets of PRB sets, also referred to as control resource sets (CORESETs), for PDCCH receptions (see also REF 3). A PDCCH transmission can be in control channel elements (CCEs) of a CORESET. A UE determines CCEs for a PDCCH reception based on a search space set (see also REF 3). A set of CCEs that can be used for PDCCH reception by a UE define a PDCCH candidate location.

An exemplary encoding process and decoding process for a DCI format is discussed in FIGS. 7 and 8 below.

For each DL bandwidth part (BWP) configured to a UE in a serving cell, the UE can be provided by higher layer signaling a number of CORESETs. For each CORESET, the UE is provided:
- a CORESET index, p;
- a DM-RS scrambling sequence initialization value;
- a precoder granularity for a number of REGs in frequency where the UE can assume use of a same DM-RS precoder;
- a number of consecutive symbols;
- a set of resource blocks;
- CCE-to-REG mapping parameters;
- an antenna port quasi co-location, from a set of antenna port quasi co-locations, indicating quasi co-location information of the DM-RS antenna port for PDCCH reception; and
- an indication for a presence or absence of a transmission configuration indication (TCI) field for DCI format 1_1 transmitted by a PDCCH in CORESET p. Additional detail is provided in REF 1, REF 2, and REF 3.

For each DL BWP configured to a UE in a serving cell, the UE is provided by higher layers with a number of search space sets where, for each search space set from the number search space sets, the UE is provided the following (see also REF 3):
- a search space set index, S;
- an association between the search space set, S, and a CORESET index, p;
- a PDCCH monitoring periodicity of $k_s$ slots and a PDCCH monitoring offset of $o_s$ slots;
- a PDCCH monitoring pattern within a slot, indicating first symbol(s) of the control resource set within a slot for PDCCH monitoring;
- a number of PDCCH candidates, $M_s^{(L)}$, per CCE aggregation level, L;
- an indication that search space set S is either a common search space set or a UE-specific search space set; and
- a duration of $T_s < k_s$ slots indicating a number of slots that the search space set S exists.

For a search space set S associated with CORESET p, the CCE indexes for aggregation level L corresponding to PDCCH candidate $m_{s,n_{CI}}$ of the search space set in slot $n_{s,f}^{\mu}$ for a serving cell corresponding to carrier indicator field value $n_{CI}$ (also referred to as search space) are given as in Equation 1:

$$L \cdot \left\{ \left( Y_{p,n_{s,f}^{\mu}} + \left\lfloor \frac{m_{s,n_{CI}} \cdot N_{CCE,p}}{L \cdot M_{s,max}^{(L)}} \right\rfloor + n_{CI} \right) \bmod \lfloor N_{CCE,p}/L \rfloor \right\} + i \quad \text{(Equation 1)}$$

where:
for any common search space, $Y_{p,n_{s,f}^{\mu}} = 0$;
for a UE-specific search space, $Y_{p,n_{s,f}^{\mu}} = (A_p \cdot Y_{p,n_{s,f}^{\mu}-1}) \bmod D$, $Y_{p,-1} = n_{RNTI} \neq 0$, $A_p = 39827$ for pmod3=0, $A_p = 39829$ for pmod3=1, $A_p = 39839$ for pmod3=2 and D=65537; i=0, ..., L−1;
$N_{CCE,p}$ is the number of CCEs, numbered from 0 to $N_{CCE,p}-1$, in CORESET p;
$n_{CI}$ is the carrier indicator field value if the UE is configured with a carrier indicator field; otherwise, including for any common search space, $n_{CI}=0$;
$m_{s,n_{CI}}=0, \ldots, M_{p,s,n_{CI}}^{(L)}-1$ where $M_{s,n_{CI}}^{(L)}$ is the number of PDCCH candidates the UE is configured to monitor for aggregation level L for a serving cell corresponding to $n_{CI}$ and a search space set S;
for any common search space, $M_{s,max}^{(L)} = M_{s,0}^{(L)}$;
for a UE-specific search space, $M_{s,max}^{(L)}$ is the maximum of $M_{s,n_{CI}}^{(L)}$ across all configured $n_{CI}$ values for a CCE aggregation level L of search space set S in control resource set p; and
the RNTI value used for $n_{RNTI}$.

A PUCCH can be transmitted according to one from multiple PUCCH formats as described in REF 1 and REF 3. A PUCCH format corresponds to a structure that is designed for a particular UCI payload range as different UCI payloads require different PUCCH transmission structures to improve an associated UCI block error rate (BLER). A PUCCH transmission is also associated with a TCI state providing a spatial domain filter for a PUCCH transmission as described in REF 3 and REF 4. A PUCCH can be used to convey HARQ-ACK information, SR, or periodic/semi-persistent CSI and their combinations.

A UE can be configured for operation with multiple bandwidth parts (BWP) in a DL system BW (DL BWPs) and in an UL system BW (UL BWP) as described in REF 3. At a given time, only one DL BWP and only one UL BWP are active for the UE. Configurations of various parameters, such as search space set configuration for PDCCH reception or PUCCH resources for PUCCH transmission, can be separately provided for each respective BWP. A primary purpose for BWP operation is to enable power savings for the UE. When the UE has data to transmit or receive, a large BWP can be used and, for example, search space sets can be greater than one and have short monitoring periodicity. When the UE does not have data to transmit or receive, a small BWP can be used and, for example, a single search space set can be configured with longer monitoring periodicity.

There are two types of search space supported in NR Rel-15: UE-specific search space (USS) and common search space (CSS). A UE determines CCE locations for PDCCH candidates in a USS using a corresponding C-RNTI and determines CCE locations in a CSS independently of an RNTI as described in Equation 1.

Table 1 summarizes search spaces types according to REF 3 and corresponding RNTIs for DCI formats according to REF 2 and REF 3.

TABLE 1

| Type | Search Space | RNTI | Use case |
|---|---|---|---|
| Type0-PDCCH | CSS | SI-RNTI for RMSI on a primary cell | SIB Decoding |
| Type0A-PDCCH | CSS | SI-RNTI on a primary cell | SIB Decoding |
| Type1-PDCCH | CSS | RA-RNTI, TC-RNTI, C-RNTI on a primary cell | Msg2, Msg4 decoding in RACH |
| Type2-PDCCH | CSS | P-RNTI on a primary cell | Paging Decoding |
| Type3-PDCCH | CSS | INT-RNTI, SFI-RNTI, TPC-PUSCH-RNTI, TPC-PUCCH-RNTI, TPC-SRS-RNTI, only for the primary cell, C-RNTI, or CS-RNTI(s) | |
| UE-specific PDCCH | USS | C-RNTI, or CS-RNTI(s), or SP-CSI-RNTI | User-specific PDSCH decoding |

Table 2. Association between RNTI Types and Search Spaces.

TABLE 2

| Type | Signaling Parameters |
| --- | --- |
| Type0-PDCCH | pdcch-ConfigSIB1 in MasterInformationBlock |
| | searchSpaceSIB1 in PDCCH-ConfigCommon |
| | searchSpaceZero in PDCCH-ConfigCommon |
| Type0A-PDCCH | searchSpaceOtherSystemInformation in PDCCHConfigCommon |
| Type1-PDCCH | ra-SearchSpace in PDCCH-ConfigCommon |
| Type2-PDCCH | pagingSearchSpace in PDCCH-ConfigCommon |
| Type3-PDCCH | SearchSpace in PDCCH-Config with searchSpaceType = common |
| UE-specific PDCCH | SearchSpace in PDCCH-Config with searchSpaceType = ue-Specific |

In addition to the previous use cases, use of a CSS can be beneficial for other functionalities. For example, a CSS can be used to multicast data to a group of UEs, such as multicast of virtual reality videos to people in a same room, or multicast an industrial control message to machines for massive machine-type communication (mMTC) applications.

In NR Rel-15, after a UE establishes RRC connection with a serving gNB, the UE can be configured to monitor PDCCH in a CSS for a corresponding DCI format through a UE-specific RRC IE, such as PDCCH-config as described in REF 2 and REF 5. When needed to address a sub-group of UEs, from a group of UEs configured to monitor the DCI format, the DCI format can schedule a PDSCH reception and the UEs that need to process the information content of the DCI format or the information content of the TB in the PDSCH can be indicated by information in the PDSCH. For example, when a group of UEs in RRC_CONNECTED state are configured to monitor PDCCH in a CSS in order to detect a DCI format and obtain information for an adaptation request, such as a go-to-sleep request for a UE to at least not monitor PDCCH for a time period, a sub-group of UEs from the group of UEs can be indicated by information in a PDSCH scheduled by the DCI format and the remaining UEs from the group of UEs can ignore the adaptation request.

Therefore, novel aspects of the present disclosure recognize the need to determine PDCCH assignment, including search space, search space set, PDCCH candidates and non-overlapping CCE of blind decoding; to support multicasting of both data and control messages to a group of UEs; to define a PDCCH type for multicasting a transmission block (TB) to a group of UEs; to define a PDCCH type for multicasting common control information to a group of UEs; and to enhance PDCCH transmission to a group of UEs.

Dynamic adaptation on PDCCH monitoring for a UE, such as skipping PDCCH monitoring for one or more search space sets during a period, or (de)activation of CORESETs/search space sets, and adapting PDCCH monitoring periodicity/duration, have been considered to enable UE power savings. In REF 8, various schemes for reducing PDCCH monitoring show 0.5%-85% power saving gains for a UE relative to the power required by the UE for PDCCH monitoring as previously described for Rel-15 NR. Lower power saving gains 0.5-15% occur for the continuous traffic corresponding to a full buffer for a UE. High power saving gains 50-85% were observed for sporadic traffic arrival corresponding to more typical, FTP-based, traffic patterns for a UE.

In NR Rel-15, a UE monitors PDCCH (decoded PDCCH candidates at corresponding PDCCH monitoring occasions) based on configured search space sets provided to the UE for each serving cell and activated BWP per serving cell by a serving gNB. The configuration of search space sets is provided to a UE by higher layer signalling and therefore does not allow for fast adaptation of PDCCH monitoring by the UE to address dynamic variations in the traffic patterns for the UE. A faster adaptation for PDCCH monitoring by a UE, such as one provided by a DCI format in a PDCCH or by a MAC control element, can offer material reduction in a power consumption by the UE for monitoring PDCCH by enabling/disabling decoding operations associated with PDCCH candidates in search space sets according to dynamic variations in traffic while avoiding a loss in throughput or an increase in scheduling latency that may occur when a UE is provided an insufficient number of PDCCH candidates.

Therefore, other novel aspects of this disclosure also recognize the need to enable an adaptation for PDCCH monitoring in search space sets through a signal/channel at the physical layer; to provide an indication for PDCCH monitoring occasions when PDCCH monitoring is adapted through a signal/channel at the physical layer; to determine PDCCH candidates and non-overlapped CCEs per slot, or per PDCCH monitoring occasion, for a DL BWP when PDCCH monitoring is adapted through a signal/channel at the physical layer; to define a timeline for applying an adaptation request through a signal/channel at the physical layer; to determine the interpretation of a DCI format for triggering UE adaptation at least for power saving purpose; to determine the monitoring occasion of signal/channel at physical layer for triggering UE adaptation associated with DRX operation in RRC_CONNECTED state; and to determine the monitoring occasion of signal/channel at physical layer for triggering UE adaptation without association with DRX operation in RRC_CONNECTED state.

FIG. 1 illustrates an exemplary networked computing system according to various embodiments of this disclosure. The embodiment of the wireless network 100 shown in FIG. 1 is for illustration only. Other embodiments of the wireless network 100 could be used without departing from the scope of this disclosure.

As shown in FIG. 1, the wireless network 100 includes an gNodeB (gNB) 101, an gNB 102, and an gNB 103. The gNB 101 communicates with the gNB 102 and the gNB 103. The gNB 101 also communicates with at least one Internet Protocol (IP) network 130, such as the Internet, a proprietary IP network, or other data network.

The gNB 102 provides wireless broadband access to the network 130 for a first plurality of user equipments (UEs) within a coverage area 120 of the gNB 102. The first plurality of UEs includes a UE 111, which may be located in a small business (SB); a UE 112, which may be located in an enterprise (E); a UE 113, which may be located in a WIFI hotspot (HS); a UE 114, which may be located in a first residence (R); a UE 115, which may be located in a second residence (R); and a UE 116, which may be a mobile device (M) like a cell phone, a wireless laptop, a wireless PDA, or the like. The gNB 103 provides wireless broadband access to the network 130 for a second plurality of UEs within a coverage area 125 of the gNB 103. The second plurality of UEs includes the UE 115 and the UE 116.

Depending on the network type, the term 'base station' can refer to any component (or collection of components) configured to provide wireless access to a network, such as transmit point (TP), transmit-receive point (TRP), a gNB, a macrocell, a femtocell, a WIFI access point (AP), or other wirelessly enabled devices. Base stations may provide wireless access in accordance with one or more wireless communication protocols, e.g., 5G 3GPP New Radio Interface/Access (NR), long term evolution (LTE), LTE advanced (LTE-A), High Speed Packet Access (HSPA), Wi-Fi 802.11a/b/g/n/ac, etc. Also, depending on the network type, other well-known terms may be used instead of "user equipment" or "UE," such as "mobile station," "subscriber station," "remote terminal," "wireless terminal," or "user device." For the sake of convenience, the terms "user equipment" and "UE" are used in this patent document to refer to remote wireless equipment that wirelessly accesses an gNB, whether the UE is a mobile device (such as a mobile telephone or smartphone) or is normally considered a stationary device (such as a desktop computer or vending machine).

Dotted lines show the approximate extents of the coverage areas 120 and 125, which are shown as approximately circular for the purposes of illustration and explanation only. It should be clearly understood that the coverage areas associated with gNBs, such as the coverage areas 120 and 125, may have other shapes, including irregular shapes, depending upon the configuration of the gNBs and variations in the radio environment associated with natural and man-made obstructions.

As described in more detail below, wireless network 100 can be a 5G communication system in which a UE, such as UE 116, can communicate with a BS, such as BS 102, to determine search space sets for PDCCH monitoring.

Although FIG. 1 illustrates one example of a wireless network 100, various changes may be made to FIG. 1. For example, the wireless network 100 could include any number of gNBs and any number of UEs in any suitable arrangement. Also, the gNB 101 could communicate directly with any number of UEs and provide those UEs with wireless broadband access to the network 130. Similarly, each gNB 102-103 could communicate directly with the network 130 and provide UEs with direct wireless broadband access to the network 130. Further, the gNB 101, 102, and/or 103 could provide access to other or additional external networks, such as external telephone networks or other types of data networks.

Figure 2:
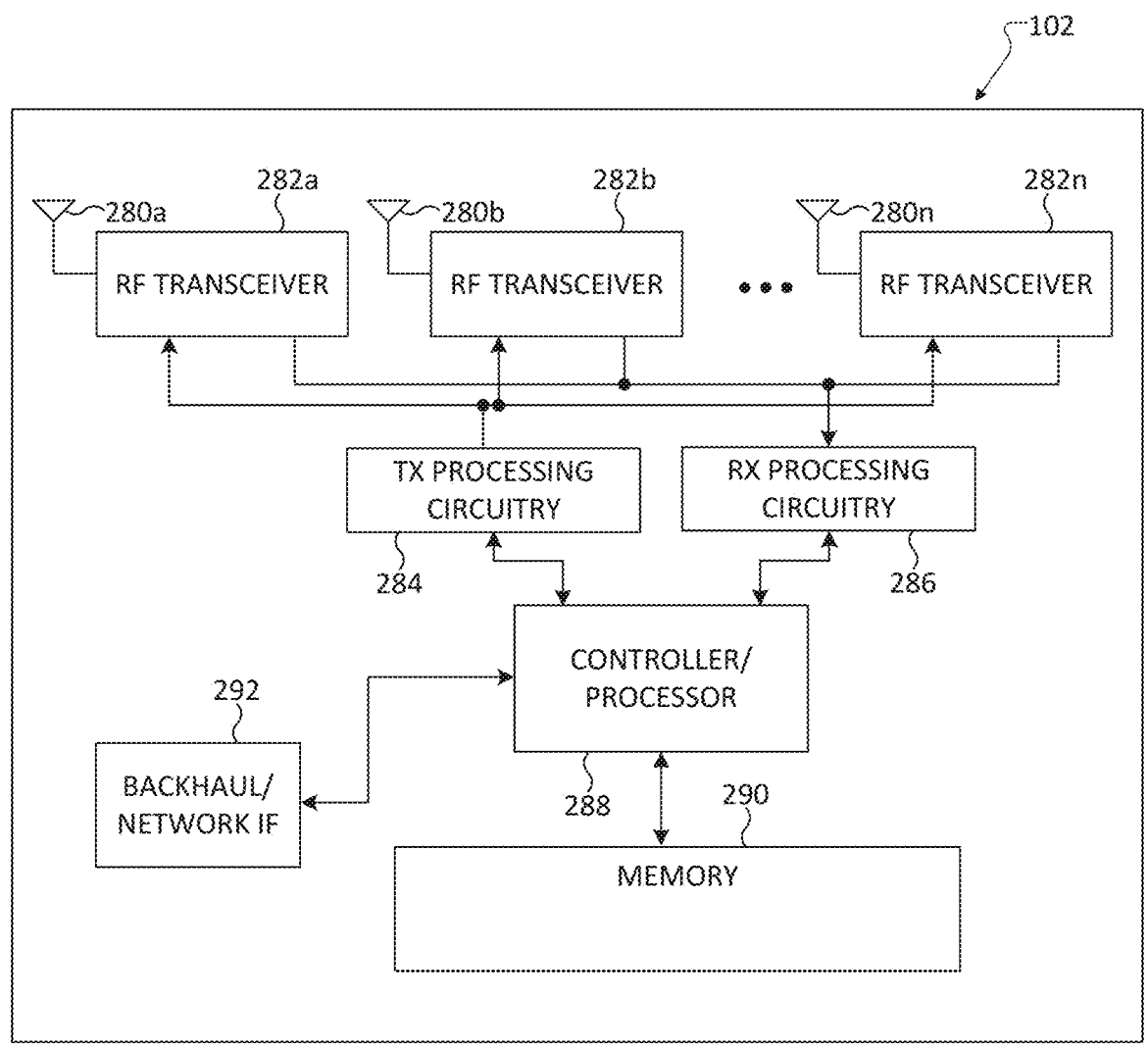
FIG. 2 illustrates an exemplary base station (BS) in the networked computing system according to various embodiments of this disclosure.

FIG. 2 illustrates an exemplary base station (BS) according to various embodiments of this disclosure. The embodiment of the gNB 102 illustrated in FIG. 2 is for illustration only, and the gNBs 101 and 103 of FIG. 1 could have the same or similar configuration. However, gNBs come in a wide variety of configurations, and FIG. 2 does not limit the scope of this disclosure to any particular implementation of an gNB.

As shown in FIG. 2, the gNB 102 includes multiple antennas 280a-280n, multiple RF transceivers 282a-282n, transmit (TX) processing circuitry 284, and receive (RX) processing circuitry 286. The gNB 102 also includes a controller/processor 288, a memory 290, and a backhaul or network interface 292.

The RF transceivers 282a-282n receive, from the antennas 280a-280n, incoming RF signals, such as signals transmitted by UEs in the network 100. The RF transceivers 282a-282n down-convert the incoming RF signals to generate IF or baseband signals. The IF or baseband signals are sent to the RX processing circuitry 286, which generates processed baseband signals by filtering, decoding, and/or digitizing the baseband or IF signals. The RX processing circuitry 286 transmits the processed baseband signals to the controller/processor 288 for further processing.

The TX processing circuitry 284 receives analog or digital data (such as voice data, web data, e-mail, or interactive video game data) from the controller/processor 288. The TX processing circuitry 284 encodes, multiplexes, and/or digitizes the outgoing baseband data to generate processed baseband or IF signals. The RF transceivers 282a-282n receive the outgoing processed baseband or IF signals from the TX processing circuitry 284 and up-converts the baseband or IF signals to RF signals that are transmitted via the antennas 280a-280n.

The controller/processor 288 can include one or more processors or other processing devices that control the overall operation of the gNB 102. For example, the controller/processor 288 could control the reception of forward channel signals and the transmission of reverse channel signals by the RF transceivers 282a-282n, the RX processing circuitry 286, and the TX processing circuitry 284 in accordance with well-known principles. The controller/processor 288 could support additional functions as well, such as more advanced wireless communication functions. For instance, the controller/processor 288 could support beam forming or directional routing operations in which outgoing signals from multiple antennas 280a-280n are weighted differently to effectively steer the outgoing signals in a desired direction. Any of a wide variety of other functions could be supported in the gNB 102 by the controller/processor 288. In some embodiments, the controller/processor 288 includes at least one microprocessor or microcontroller.

The controller/processor 288 is also capable of executing programs and other processes resident in the memory 290, such as a basic OS. The controller/processor 288 can move data into or out of the memory 290 as required by an executing process.

The controller/processor 288 is also coupled to the backhaul or network interface 292. The backhaul or network interface 292 allows the gNB 102 to communicate with other devices or systems over a backhaul connection or over a network. The interface 292 could support communications over any suitable wired or wireless connection(s). For example, when the gNB 102 is implemented as part of a cellular communication system (such as one supporting 5G, LTE, or LTE-A), the interface 292 could allow the gNB 102 to communicate with other gNBs over a wired or wireless backhaul connection. When the gNB 102 is implemented as an access point, the interface 292 could allow the gNB 102 to communicate over a wired or wireless local area network or over a wired or wireless connection to a larger network (such as the Internet). The interface 292 includes any suitable structure supporting communications over a wired or wireless connection, such as an Ethernet or RF transceiver.

The memory 290 is coupled to the controller/processor 288. Part of the memory 290 could include a RAM, and another part of the memory 290 could include a Flash memory or other ROM.

As described in more detail below, the BS 102 can communicate information to a UE, such as UE 116 in FIG. 1 over a networked computing system, for determining search space sets for PDCCH monitoring.

Although FIG. 2 illustrates one example of gNB 102, various changes may be made to FIG. 2. For example, the gNB 102 could include any number of each component shown in FIG. 2. As a particular example, an access point could include a number of interfaces 292, and the controller/processor 288 could support routing functions to route data between different network addresses. As another particular example, while shown as including a single instance of TX processing circuitry 284 and a single instance of RX processing circuitry 286, the gNB 102 could include multiple instances of each (such as one per RF transceiver). Also, various components in FIG. 2 could be combined, further subdivided, or omitted and additional components could be added according to particular needs.

Figure 3:
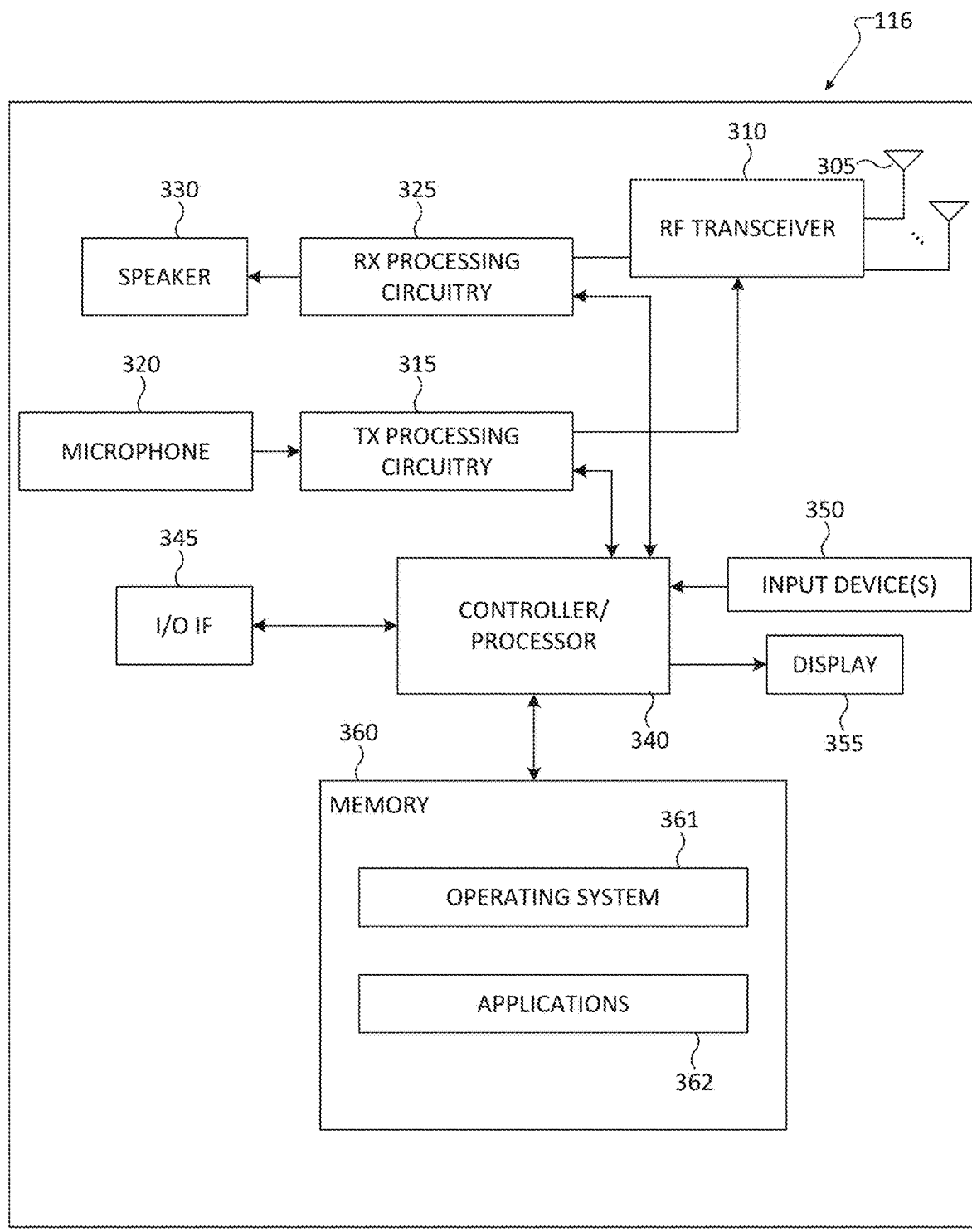
FIG. 3 illustrates an exemplary user equipment (UE) in the networked computing system according to various embodiments of this disclosure.

FIG. 3 illustrates an exemplary user equipment (UE) according to various embodiments of this disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of this disclosure to any particular implementation of a UE.

As shown in FIG. 3, the UE 116 includes an antenna 305, a radio frequency (RF) transceiver 310, transmit (TX) processing circuitry 315, a microphone 320, and receive (RX) processing circuitry 325. The UE 116 also includes a speaker 330, a main processor 340, an input/output (I/O) interface (IF) 345, a keypad 350, a display 355, and a memory 360. The memory 360 includes a basic operating system (OS) program 361 and one or more applications 362.

The RF transceiver 310 receives, from the antenna 305, an incoming RF signal transmitted by an gNB of the network 100. The RF transceiver 310 down-converts the incoming RF signal to generate an intermediate frequency (IF) or baseband signal. The IF or baseband signal is sent to the RX processing circuitry 325, which generates a processed baseband signal by filtering, decoding, and/or digitizing the baseband or IF signal. The RX processing circuitry 325 transmits the processed baseband signal to the speaker 330 (such as for voice data) or to the main processor 340 for further processing (such as for web browsing data).

The TX processing circuitry 315 receives analog or digital voice data from the microphone 320 or other outgoing baseband data (such as web data, e-mail, or interactive video game data) from the main processor 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna 305.

The main processor 340 can include one or more processors or other processing devices and execute the basic OS program 361 stored in the memory 360 in order to control the overall operation of the UE 116. For example, the main processor 340 could control the reception of forward channel signals and the transmission of reverse channel signals by the RF transceiver 310, the RX processing circuitry 325, and the TX processing circuitry 315 in accordance with well-known principles. In some embodiments, the main processor 340 includes at least one microprocessor or microcontroller.

The main processor 340 is also capable of executing other processes and programs resident in the memory 360. The main processor 340 can move data into or out of the memory 360 as required by an executing process. In some embodiments, the main processor 340 is configured to execute the applications 362 based on the OS program 361 or in response to signals received from gNBs or an operator. The main processor 340 is also coupled to the I/O interface 345, which provides the UE 116 with the ability to connect to other devices such as laptop computers and handheld computers. The I/O interface 345 is the communication path between these accessories and the main processor 340.

The main processor 340 is also coupled to the keypad 350 and the display unit 355. The operator of the UE 116 can use the keypad 350 to enter data into the UE 116. The display 355 may be a liquid crystal display or other display capable of rendering text and/or at least limited graphics, such as from web sites.

The memory 360 is coupled to the main processor 340. Part of the memory 360 could include a random-access memory (RAM), and another part of the memory 360 could include a Flash memory or other read-only memory (ROM).

As described in more detail below, UE 116 can communicate with a BS, such as BS 102 in FIG. 2 over a networked computing system, for determining search space sets for PDCCH monitoring in the UEs.

Although FIG. 3 illustrates one example of UE 116, various changes may be made to FIG. 3. For example, various components in FIG. 3 could be combined, further subdivided, or omitted and additional components could be added according to particular needs. As a particular example, the main processor 340 could be divided into multiple processors, such as one or more central processing units (CPUs) and one or more graphics processing units (GPUs). Also, while FIG. 3 illustrates the UE 116 configured as a mobile telephone or smartphone, UEs could be configured to operate as other types of mobile or stationary devices.

Figure 4A:
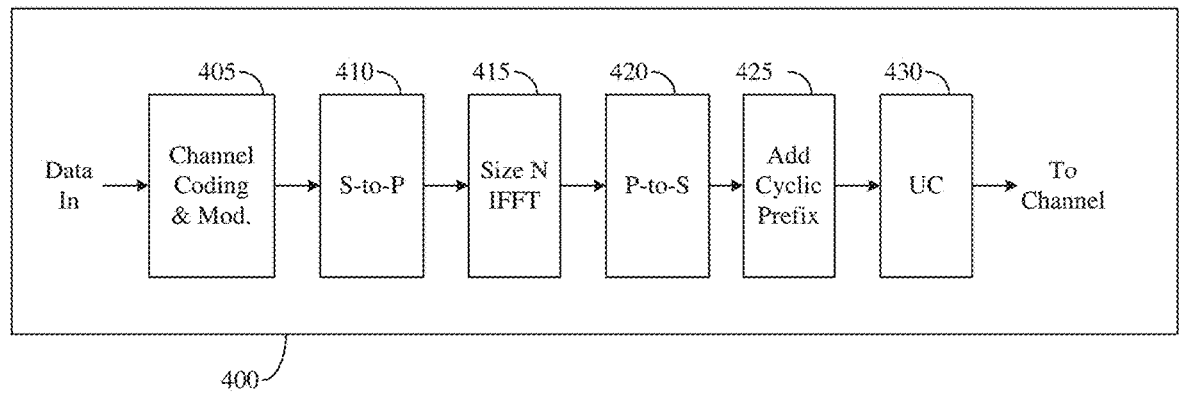
FIGS. 4A and 4B illustrate exemplary transmit and receive paths according to various embodiments of this disclosure.
Figure 4B:
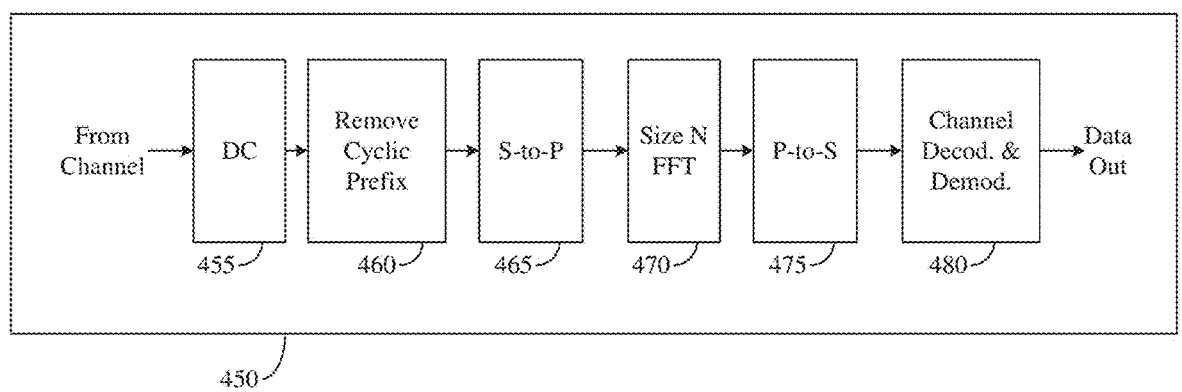

FIGS. 4A and 4B illustrate exemplary wireless transmit and receive paths according to various embodiments of this disclosure. In FIGS. 4A and 4B, for downlink communication, the transmit path circuitry can be implemented in a base station (gNB) 102 or a relay station, and the receive path circuitry may be implemented in a user equipment (e.g., user equipment 116 of FIG. 1). In other examples, for uplink communication, the receive path circuitry 450 may be implemented in a base station (e.g., gNB 102 of FIG. 1) or a relay station, and the transmit path circuitry may be implemented in a user equipment (e.g., user equipment 116 of FIG. 1).

Transmit path 400 comprises channel coding and modulation block 405, serial-to-parallel (S-to-P) block 410, Size N Inverse Fast Fourier Transform (IFFT) block 415, parallel-to-serial (P-to-S) block 420, add cyclic prefix block 425, and up-converter (UC) 430. The receive path 450 comprises down-converter (DC) 455, remove cyclic prefix block 460, serial-to-parallel (S-to-P) block 465, Size N Fast Fourier Transform (FFT) block 470, parallel-to-serial (P-to-S) block 475, and channel decoding and demodulation block 480.

At least some of the components in transmit path 400 and receive path 450 may be implemented in software, while other components may be implemented by configurable hardware or a mixture of software and configurable hardware. In particular, it is noted that the FFT blocks and the IFFT blocks described in this disclosure document may be implemented as configurable software algorithms, where the value of Size N may be modified according to the implementation.

Furthermore, although this disclosure is directed to an embodiment that implements the Fast Fourier Transform and the Inverse Fast Fourier Transform, this is by way of illustration only and may not be construed to limit the scope of the disclosure. It may be appreciated that in an alternate embodiment of the present disclosure, the Fast Fourier Transform functions and the Inverse Fast Fourier Transform functions may easily be replaced by discrete Fourier transform (DFT) functions and inverse discrete Fourier transform (IDFT) functions, respectively. It may be appreciated that for DFT and IDFT functions, the value of the N variable may be any integer number (i.e., 1, 4, 3, 4, etc.), while for FFT and IFFT functions, the value of the N variable may be any integer number that is a power of two (i.e., 1, 2, 4, 8, 16, etc.).

In the following example, the transmit path 400 is implemented in a BS and the receive path is implemented in a UE. In transmit path 400, channel coding and modulation block 405 receives a set of information bits, applies coding (e.g., LDPC coding) and modulates (e.g., quadrature phase shift keying (QPSK) or quadrature amplitude modulation (QAM)) the input bits to produce a sequence of frequency-domain modulation symbols. Serial-to-parallel block 410 converts (i.e., de-multiplexes) the serial modulated symbols to parallel data to produce N parallel symbol streams where N is the IFFT/FFT size used in BS 102 and UE 116. Size N IFFT block 415 then performs an IFFT operation on the N parallel symbol streams to produce time-domain output signals. Parallel-to-serial block 420 converts (i.e., multiplexes) the parallel time-domain output symbols from Size N IFFT block 415 to produce a serial time-domain signal. Add cyclic prefix block 425 then inserts a cyclic prefix to the time-domain signal. Finally, up-converter 430 modulates (i.e., up-converts) the output of add cyclic prefix block 425 to RF frequency for transmission via a wireless channel. The signal may also be filtered at baseband before conversion to RF frequency.

The transmitted RF signal can arrive at a UE after passing through the wireless channel, and reverse operations to those at a gNB are performed. Down-converter 455 down-converts the received signal to baseband frequency and remove cyclic prefix block 460 removes the cyclic prefix to produce the serial time-domain baseband signal. Serial-to-parallel block 465 converts the time-domain baseband signal to parallel time-domain signals. Size N FFT block 470 then performs an FFT algorithm to produce N parallel frequency-domain signals. Parallel-to-serial block 475 converts the parallel frequency-domain signals to a sequence of modulated data symbols. Channel decoding and demodulation block 480 demodulates and then decodes the modulated symbols to recover the original input data stream.

Each of gNBs 101-103 may implement a transmit path 400 that is analogous to transmitting in the downlink to user equipment 111-116 and may implement a receive path 450 that is analogous to receiving in the uplink from user equipment 111-116. Similarly, each one of user equipment 111-116 may implement a transmit path 400 corresponding to the architecture for transmitting in the uplink to gNBs 101-103 and may implement a receive path 450 corresponding to the architecture for receiving in the downlink from gNBs 101-103.

As described in more detail below the transmit path 400 and receive path 450 can be implemented in UEs, such as UE 116 in FIG. 3, and BSs, such as BS 102 in FIG. 2, for communicating information over a networked computing system for determining search space sets for PDCCH monitoring in the UEs.

Although FIGS. 4A and 4B illustrate examples of wireless transmit and receive paths, various changes may be made to FIGS. 4A and 4B. For example, various components in FIGS. 4A and 4B can be combined, further subdivided, or omitted and additional components can be added according to particular needs. Also, FIGS. 4A and 4B are meant to illustrate examples of the types of transmit and receive paths that can be used in a wireless network. Any other suitable architectures can be used to support wireless communications in a wireless network.

FIG. 5 illustrates an exemplary transmitter according to various embodiments of this disclosure. The transmitter 500 can be implemented in an electronic device communicating via networked computing system, such as gNB 101 or UE 111.

Information bits 510, such as DCI bits or data bits, are encoded by encoder 520 and then rate matched to assigned time/frequency resources by rate matcher 530. The output from rate matcher 530 is modulated by modulator 540. The modulated and encoded symbols 545 and DMRS or CSI-RS 550 are mapped by SC mapping unit 560 based on SCs selected by BW selector unit 565. An inverse fast Fourier transform (IFFT) is performed by IFFT unit 570 and a cyclic prefix (CP) is added by CP insertion unit 580. The resulting signal is filtered by filter 590 to generated filtered signal 595, which is transmitted by a radio frequency (RF) unit (not shown).

FIG. 6 illustrates an exemplary receiver according to various embodiments of this disclosure. The receiver 600 can be implemented in an electronic device communicating via networked computing system, such as gNB 101 or UE 111.

A received signal 610 is filtered by filter 620 and then passed through a CP removal unit 630 that removes a cyclic prefix. IFFT unit 640 applies a fast Fourier transform (FFT) and the resulting signals are provided to SCs de-mapping unit 650. The SC de-mapping unit 650 de-maps SCs selected by BW selector unit 655. Received symbols are demodulated by a channel estimator and demodulator unit 660. A rate de-matcher 670 restores a rate matching and a decoder 280 decodes the resulting bits to provide information bits 290.

Each of the gNBs 101-103 may implement a transmitter 400 for transmitting in the downlink to UEs 111-116 and may implement a receiver 600 for receiving in the uplink from UEs 111-116. Similarly, each of UEs 111-116 may implement a transmitter 400 for transmitting in the uplink to gNBs 101-103 and may implement a receiver 600 for receiving in the downlink from gNBs 101-103.

As described in more detail below, the transmitter 500 and receiver 600 can be included in UEs and BS s, such as UE 116 and BS 102, for communicating information over a networked computing system for determining search space sets for PDCCH monitoring in the UEs.

Each of the components in FIGS. 5 and 6 can be implemented using only hardware or using a combination of hardware and software/firmware. As a particular example, at least some of the components in FIGS. 5 and 6 may be implemented in software, while other components may be implemented by configurable hardware or a mixture of software and configurable hardware. For instance, the IFFT block 570 may be implemented as configurable software algorithms.

Furthermore, although described as using IFFT, this is by way of illustration only and should not be construed to limit the scope of this disclosure. Other types of transforms, such as Discrete Fourier Transform (DFT) and Inverse Discrete Fourier Transform (IDFT) functions, could be used.

Although FIGS. 5 and 6 illustrate examples of wireless transmitters and receivers, various changes may be made. For example, various components in FIGS. 5 and 6 could be combined, further subdivided, or omitted and additional components could be added according to particular needs. Also, FIGS. 5 and 6 are meant to illustrate examples of the types of transmitters and receivers that could be used in a wireless network. Any other suitable architectures could be used to support wireless communications in a wireless network.

FIG. 7 illustrates an exemplary encoding flowchart for a DCI format in accordance with various embodiments of this disclosure. The encoding flowchart 700 can be implemented in a BS, such as gNB 102 in FIG. 2.

A gNB separately encodes and transmits each DCI format in a respective PDCCH. When applicable, a RNTI for a UE that a DCI format is intended for masks a CRC of the DCI format codeword in order to enable the UE to identify the DCI format. For example, the CRC can include 16 bits or 24 bits and the RNTI can include 16 bits or 24 bits. Otherwise, when a RNTI is not included in a DCI format, a DCI format type indicator field can be included in the DCI format. The CRC of non-coded DCI format information bits 710 is determined using a CRC computation unit 720, and the CRC is masked using an exclusive OR (XOR) operation unit 730 between CRC bits and RNTI bits 740. The XOR operation is defined as XOR(0,0)=0, XOR(0,1)=1, XOR(1,0)=1, XOR (1,1)=0. The masked CRC bits are appended to DCI format information bits using a CRC append unit 750. A channel encoder 760 performs channel coding (such as tail-biting convolutional coding or polar coding), followed by rate matching to allocated resources by rate matcher 770. Interleaver and modulator unit 780 applies interleaving and modulation, such as QPSK, and the output control signal 790 is transmitted.

FIG. 8 illustrates an exemplary decoding flowchart for a DCI format in accordance with various embodiments of this disclosure. The decoding flowchart 800 can be implemented in a UE, such as UE 116 in FIG. 3.

A received control signal 810 is demodulated and de-interleaved by a demodulator and a de-interleaver 820. Rate matching applied at a transmitter is restored by rate matcher 830, and resulting bits are decoded by decoder 840. After decoding, a CRC extractor 850 extracts CRC bits and provides DCI format information bits 860. The DCI format information bits are de-masked by an XOR operation unit 870 with an RNTI 880 (when applicable) and a CRC check is performed by CRC unit 890. When the CRC check succeeds (check-sum is zero), the DCI format information bits are considered to be valid (at least when corresponding information is valid). When the CRC check does not succeed, the DCI format information bits are considered to be invalid.

As described in more detail below, the encoding flowchart 700 and decoding flowchart 800 can be implemented in a BS and UE, respectively, such as BS 102 in FIG. 2 and UE 116 in FIG. 3, for communicating information over a networked computing system for determining search space sets for PDCCH monitoring in the UEs.

DETERMINATION OF PDCCH ASSIGNMENT

An embodiment of this disclosure considers determination PDCCH assignment that can support multicast data and control messages to a group of UEs. The determination of PDCCH assignment includes specification and configuration of search space, search space set/CORESET that can be used for multicast data and control messages to a group of UEs. The search space set for multicast data and control messages to a group of UEs can be common search space (CSS) set as defined in REF 3 or a new search space set, which is referred to as UE-group search space (UGSS) herein. The PDCCH assignment also includes determination of PDCCH candidates and non-overlapped CCEs per PDCCH monitoring occasion when supporting search space for multicast data and control messages.

For a search space set S associated with CORESET p to support multicast data or control message to a group of UEs, for example a CSS set or a UGSS set, the CCE indexes for aggregation level L corresponding to PDCCH candidate $M_{s,n_{CI}}$ of the search space set in slot $n_{s,f}^{\mu}$ for a serving cell corresponding to carrier indicator field value $n_{CI}$ (also referred to as search space) are given as in Equation 2

$$L \cdot \left\{ \left( Y_{p,n_{s,f}^{\mu}} + \left\lfloor \frac{m_{s,n_{CI}} \cdot N_{CCE,p}}{L \cdot M_{s,max}^{(L)}} \right\rfloor + n_{CI} \right) \bmod \lfloor N_{CCE,p}/L \rfloor \right\} + i \quad \text{(Equation 2)}$$

where:
$Y_{p,n_{s,f}^{\mu}} = (A_p \cdot Y_{p,n_{s,f}^{\mu}-1}) \bmod D$;
$Y_{p,-1} = n_{RNTI} \neq 0$;
$A_p = 39827$ for pmod3=0;
$A_p = 39829$ for pmod3=1;
$A_p = 39839$ for pmod3=2;
D=65537;
i=0, . . . , L−1;
$N_{CCE,p}$ is the number of CCEs, numbered from 0 to $N_{CCE,p}-1$, in CORESET p;
$n_{CI}$ is the carrier indicator field value if the UE is configured with a carrier indicator field; otherwise, including for any CSS, $n_{CI}=0$;
$m_{s,n_{CI}} = 0, \ldots, M_{s,n_{CI}}^{(L)}-1$, where $M_{s,n_{CI}}^{(L)}$ is the number of PDCCH candidates the UE is configured to monitor for aggregation level L for a serving cell corresponding to $n_{CI}$ and the search space set S;
$M_{s,max}^{(L)}$ is the maximum of $M_{s,n_{CI}}^{(L)}$ across all configured $n_{CI}$ values for a CCE aggregation level L of search space set S in control resource set p; and
the RNTI value used for $n_{RNTI}$ is the RNTI used for scrambling the CRC for associated DCI format monitored in the search space set, for example, M-RNTI or G-RNTI as discussed in the embodiments directed to the "determination of PDCCH assignment" embodiment and "group common PDCCH for multicast in DL" embodiment of this disclosure.

A set of PDCCH candidates for a group of UEs to monitor can be defined in terms of a PDCCH search space set, for example a CSS set or a UGSS set. A UE can be configured to monitor up to N^SS_max>=1 search space set(s), wherein the search space sets can be CSS sets or UGSS sets. N^SS_max can be predefined in the specification of the system operation, such that, N^SS_max=10 or be additionally provided to a UE by UE-specific higher layer signaling after the UE establishes an RRC connection. A UE can monitor a DCI format for multicast data or control messages in any of the search space sets. The UE can determine the configuration of the search space set through any of the following two examples.

In one example, the search space set can be provided to the UE by system information through RRC signaling in a PDSCH scheduled by a DCI format with CRC scrambled by SI-RNTI. The search space set configured through a system information block (SIB) can be referred to as initial search space set, which is common to all UEs within the cell. The initial search space set can be a CSS set or a UGSS set.

In another example, the configuration can be provided to the UE through RRC signaling in a PDSCH scheduled by a DCI format that is detected in a PDCCH received in a preconfigured search space set, for example, initial common search space set configured by SIB. The UE can be provided with a RNTI for a DCI format that the UE attempts to detect by monitoring PDCCH in the preconfigured search space set.

Figure 9:
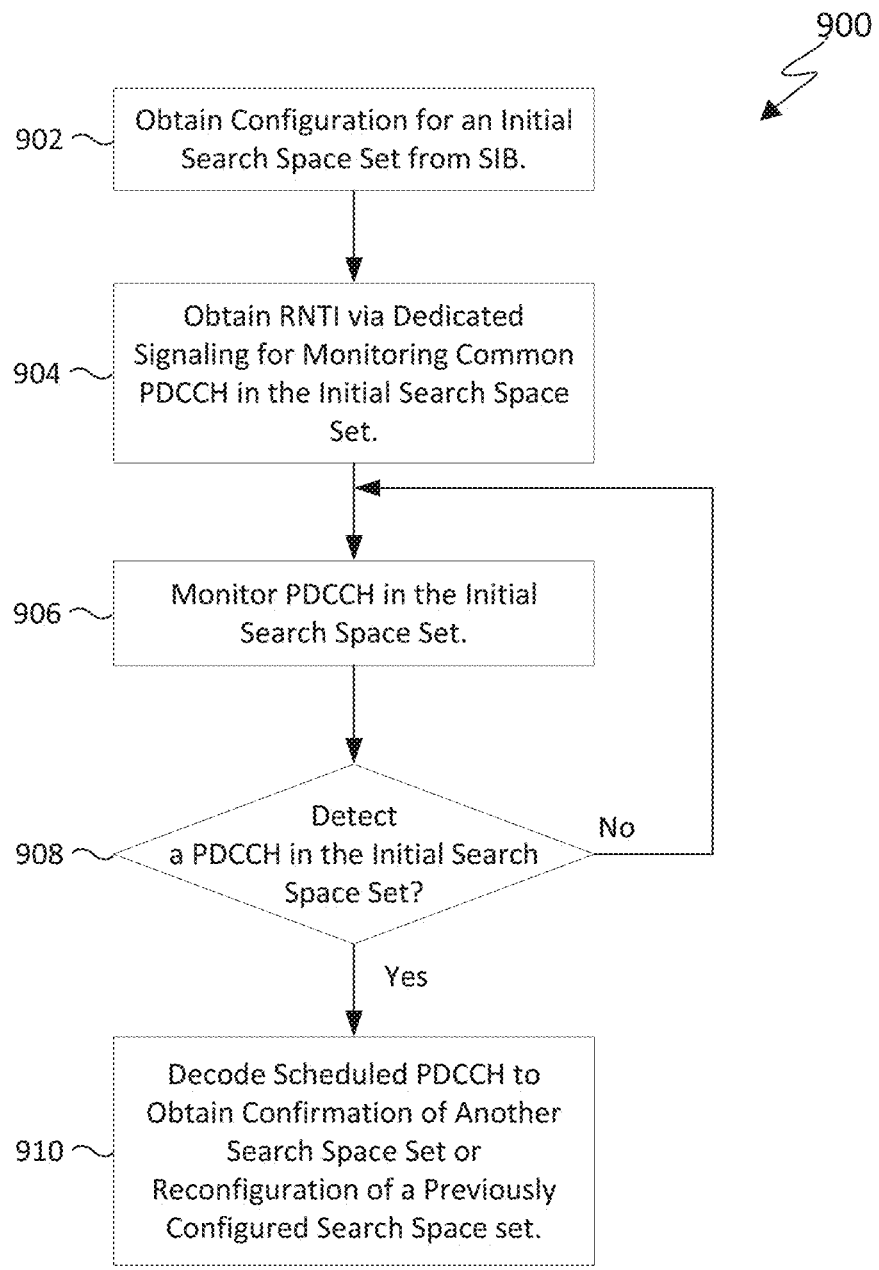
FIG. 9 illustrates a flowchart for determining a configuration of a search space set from a PDSCH scheduled by a DCI format in a search space set in accordance with various embodiments of this disclosure.

FIG. 9 illustrates a flowchart for determining a configuration of a search space set from a PDSCH scheduled by a DCI format in a search space set in accordance with various embodiments of this disclosure. Operations of flowchart 900 can be implemented in a UE, such as UE 116 in FIG. 3.

In operation 902, a configuration for an initial search space set is obtained through a SIB. The SIB can be obtained from a PDSCH scheduled by a DCI format with CRC scrambled by SI-RNTI. In operation 904, an RNTI (e.g., M-RNTI) is obtained via dedicated/UE-specific signaling for monitoring PDCCH in the initial search space set.

In operation 906, the PDCCH is monitored in the initial search space set. A determination is made in operation 908 as to whether a DCI format with CRC scrambled by a M-RNTI is detected. If the DCI format with CRC scrambled by the M-RNTI is not detected, then flowchart 900 returns to operation 906 to continue monitoring. However, if at operation 908 the determination is made that the DCI format with CRC scrambled by the M-RNTI is detected, then flowchart 900 proceeds to operation 910 where a PDSCH scheduled by the DCI format is decoded to obtain configuration information for another search space set, such as for a new CSS set or a new UGSS set or for a previously configured search space set.

For each DL BWP configured to a UE in a serving cell, the UE can be provided, by higher layer signaling, with up to N_CORESETs_max>=1 CORESETs associated with CSS sets for PDCCH monitoring. N_CORESETs_max can be fixed and defined in the specification of the system operation, such that N_CORESETs_max=3 or can be indicated by system information. For each CORESET, the UE can be provided with a configuration including any parameter on CORESET configuration as defined in REF 3, and any of the following:
- a DM-RS scrambling sequence initialization value, $N_{ID}$. If $N_{ID}$ is not provided, $N_{ID}$ can be determined based on a group CSS set ID, I_group; and
- information for TCI state cycling for N_MO>=1 PDCCH monitoring occasions, including a list of N>=1 TCI-states, L_TCIs={TCI-state_0, TCI-state_1, . . . , TCI-state_N-1} wherein a TCI state indicates quasi co-location (QCL) information of the DM-RS antenna port for PDCCH reception in the respective CORESET, index of first TCI state from L_TCIs to apply I_startTCI (0<=I_startTCI<N), and TCI state cycling interval N^MOs_TCI (1<=N^MOs_TCI<=N) in terms of number of consecutive PDCCH monitoring occasions. For example, the UE may assume that the TCI state for PDCCH monitoring occasion with index i, (i=0, . . . , N_MOs-1) has TCI state with index j (0<=j<N) from L_TCIs, such that j=floor(i/N^MOs_TCI)+I_startTCI.

For a CORESET associated with a search space set, if the UE has not been provided a configuration of TCI state list L_TCIs for the CORESET, the UE can assume that the DM-RS antenna port associated with ith PDCCH reception is quasi co-located with ith SS/PBCH block in the associated active BWP. If the UE has been provided with a configuration of TCI state list L_TCIs, the UE can receive a MAC CE to indicate a new start TCI state to apply I_startTCI and/or TCI cycling interval N^MOs_TCI. If the UE receives a MAC CE command to update the first TCI state and/or TCI cycling interval, the UE applies the command N_delay msec after a slot where the UE transmits corresponding HARQ-ACK information in a PUCCH for the PDSCH providing the command. N_delay can be defined in the specification of the system operation, for example N_delay=3 msec, and can be expressed in a number of PUCCH slots.

Figure 10:
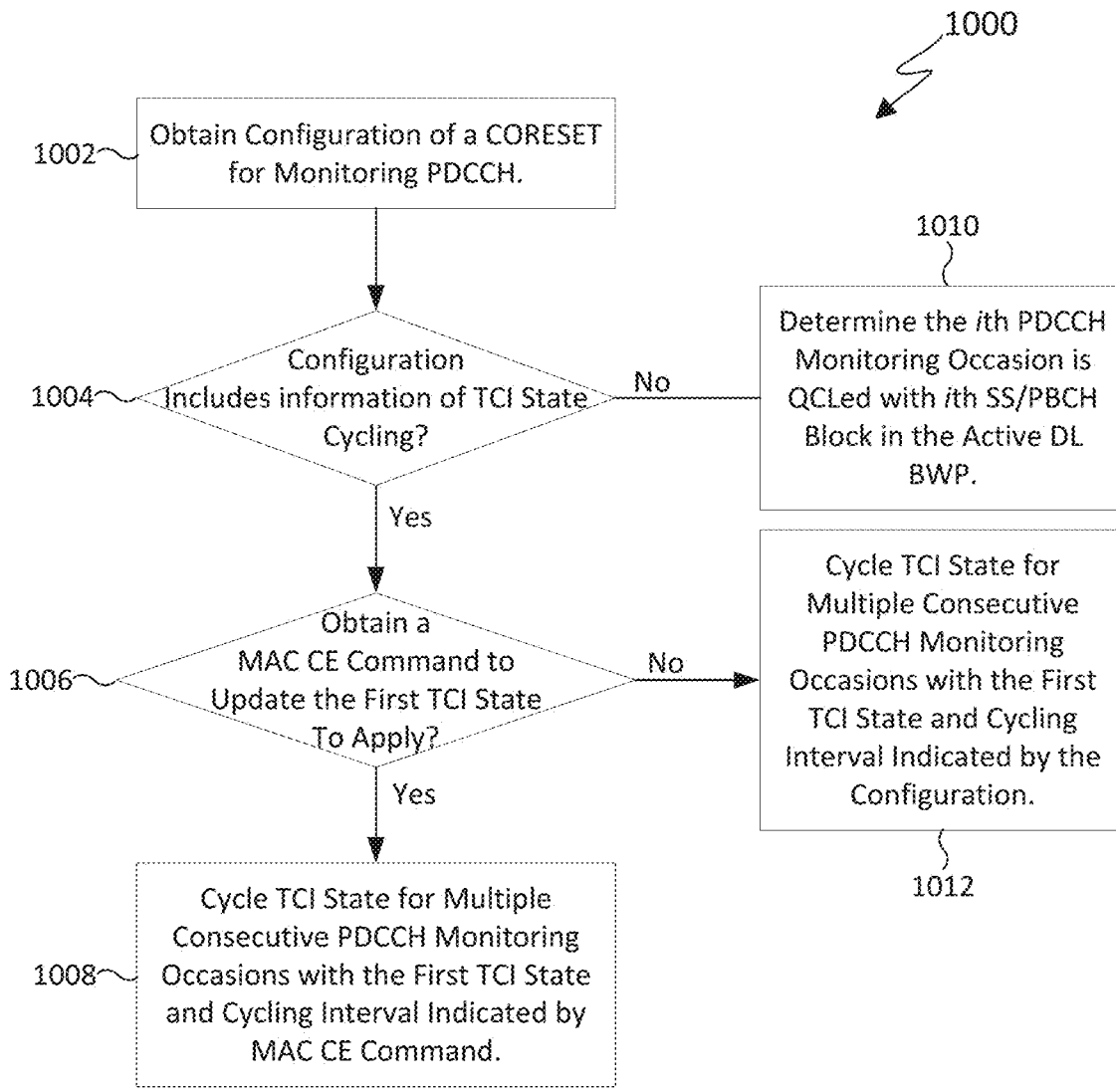
FIG. 10 illustrates a flowchart for determining a TCI state of a CORESET associated with PDCCH monitoring of a search space set in accordance with various embodiments of this disclosure.

FIG. 10 illustrates a flowchart for determining a TCI state of a CORESET associated with PDCCH monitoring of a search space set in accordance with various embodiments of this disclosure. Operations of flowchart 1000 can be implemented in a UE, such as UE 116 in FIG. 3.

In operation 1002, a configuration of a CORESET associated with a search space set for monitoring PDCCH is obtained.

In operation 1004 a determination is made as to whether the configuration includes information of TCI state cycling, such as a list of TCI states L_TCIs, first TCI state to apply I_startTCI, and TCI state cycling interval N^MOs_TCI, for monitoring PDCCH over multiple PDCCH monitoring occasions. If the configuration includes the information related to TCI state cycling, the UE makes a subsequent determination in operation 1006 as to whether the UE obtains a MAC CE command to update the start of the first TCI state to apply. If the MAC CE command is obtained which indicates to update the first TCI state to apply, then the flowchart 800 proceeds to operation 1008 where the TCI state is cycled for multiple consecutive PDCCH monitoring occasions with the first TCI state and cycling interval indicated by the MAC CE command. For example, the UE cycles the TCI state every N^MOs_TCI PDCCH monitoring occasion(s) starting from the first TCI state to apply I_startTCI, where N^MOs_TCI and I_startTCI are indicated by the MAC CE command.

Returning to operation 1004, if the determination is made that the configuration does not include information regarding TCI state cycling, flowchart 1000 proceeds to operation 1010 where the ith PDCCH monitoring occasion is quasi co-located with the ith SS/PBCH block in the active DL BWP.

Returning to operation 1006, if the determination is made that a MAC CE command is not obtained which indicates a new start of TCI state or TCI state cycling interval, then flowchart 1000 proceeds to operation 1012 where the TCI state every N^MOs_TCI PDCCH monitoring occasion(s) is cycled starting from the first TCI state to apply I_startTCI, where N^MOs_TCI and I_startTCI are indicated by the configuration.

Multiple search space sets, for example multiple CSS sets, can be bundled together into a group with ID denoted as, I_group. For a DL BWP configured to a UE in a serving cell, the UE can be associated with up to N^groups groups of search space sets, where each group of search space sets is associated with at least one search space set. N^groups can be fixed and predefined in the specification of the system operation, such that N^groups=3 or N^groups=2. A UE can determine the associated search space set group ID, I_group, through one of the following two examples:

In a first example, I_group can be provided to the UE through UE specific higher layer signaling. The IDs of corresponding CSS sets associated with the group can be provided to the UE together with I_group. A UE can be provided with an UE ID, I^UE_ID, associated with the search space set group, I_group.

In a second example, I_group can be derived from a UE ID, I^UE_ID. For example, I_group=mod(floor(I^UE_ID/c1), c2), where c1 and c2 are integers, and can be either defined in the specification of the system operation, for example, c1=1, c2=8, or provided to the UE through higher layer signaling, for example, any of c1/c2 can be a number of UE groups configured by gNB.

In one sub-example of the second example, I^UE_ID can be an International Mobile Subscriber Identity (IMSI).

In another sub-example of the second example, I^UE_ID can be a SAE Temporary Mobile Subscriber Identity (s-TMSI).

In yet another sub-example of the second example, I^UE_ID can be a C-RNTI.

Multiple search space sets, for example multiple UGSS sets, can be associated with a UE group, denoted as I_UG. For a DL BWP configured to a UE in a serving cell, the UE can be associated with up to N^UGs UE groups, where each UE group is associated with at least one search space set. N^UGs can be fixed and predefined in the specification of the system operation, such that N^UGs=3. A UE can determine the associated UE group ID, I_UG, through one of the following two examples:

In a first example, I_UG can be provided to the UE through UE specific higher layer signaling. The IDs of corresponding search space sets associated with the group can be provided to the UE together with I_UG. A UE can be provided with an UE ID, I^UE_ID, within the UE group, I_UG.

In a second example, I_group can be derived from a UE ID, I^UE_ID. For example, I_group=mod(floor(I^UE_ID/c1), c2), where c1 and c2 are integers, and can be either defined in the specification of the system operation, for example, c1=1, c2=8, or provided to the UE through higher layer signaling, for example, any of c1/c2 can be a number of UE groups configured by gNB.

In one sub-example of the second example, I^UE_ID can be an International Mobile Subscriber Identity (IMSI);

In another sub-example of the second example, I^UE_ID can be a SAE Temporary Mobile Subscriber Identity (s-TMSI);

In yet another sub-example of the second example, I^UE_ID can be a C-RNTI.

For a search space set, the UE can be provided with a configuration including any parameter on search space configuration as defined in REF3, and any of the following:
  an associated a search space set group ID, I_group;
  an associated UE group ID, I_UG;
  a search space type, which can be USS or CSS or UGSS;
  an indication of DCI-formats to monitor PDCCH candidates in the search space set, for example, to monitor for DCI format_X_0, which can be a DCI format with a smallest size among DCI formats for which the UE monitors PDCCH and is carried by PDCCH in a CSS set;
  an indicator of repetition I_rep, where I_rep can be a binary bit of a bit-map to indicate whether or not ('0' value or '1' value) a PDCCH monitoring occasion, from a number of consecutive PDCCH monitoring occasions within a periodicity for PDCCH monitoring, is used for a repetition of a PDCCH with a same DCI format; and
  a number of PDCCH candidates $M_S^{(L)}$ per CCE aggregation level L by any of aggregationLevel1, aggregationLevel2, aggregationLevel4, aggregationLevel8, aggregationLevel16, aggregationLevel32, and aggregationLevel64 for CCE aggregation level 1, CCE aggregation level 2, CCE aggregation level 4, CCE aggregation level 8, and CCE aggregation level 16, CCE aggregation level 32, CCE aggregation level 64 respectively. Higher aggregation levels, such as CCE aggregation level 32 or 64, or larger number of PDCCH candidates can be considered for a CSS/UGSS set compared with USS set or a CSS set that is configured by a UE-specific higher layer signaling.

For a configured search space set, the search space set can be activated or deactivated via L1 signaling such as a DCI format, or higher layer signaling such as a MAC CE command. To reduce a signaling overhead, one of the following approaches can be considered.

In a first approach, the search space sets associated with a search space set group, I_group, can be (de)activated simultaneously. For example, an MAC CE deactivation command can indicate to a UE to deactivate of all search space sets associated with a search space set group, I_group. If the UE receives a MAC CE command to (de)activate a CSS set or all CSS sets associated with a search space set group, I_group, the UE applies the command N_delay msec after a slot where the UE transmits HARQ-ACK information for the PDSCH providing the command. N_delay can be defined in the specification of the system operation, for example N_delay=3 msec and can be in a number of slots for a PUCCH transmission. If the UE receives a L1 signal/channel to (de)activate a search space set or all search space sets associated with a search space set group, I_group, the UE applies the adaptation N_delay msec or slots after a slot where the UE receives the adaptation request. N_delay can be defined in the specification of the system operation, for example N_delay=1 or 2.

In a second approach, the search space sets associated with a UE group, I_UG, can be (de)activated simultaneously. For example, an MAC CE deactivation command can indicate to a UE to deactivate of all search space sets associated with a UE group, I_UG. If the UE receives a MAC CE command to (de)activate a search space set or all search space sets associated with a UE group, I_UG, the UE applies the command N_delay msec after a slot where the UE transmits HARQ-ACK information for the PDSCH providing the command. N_delay can be defined in the specification of the system operation, for example N_delay=3 msec and can be in a number of slots for a PUCCH transmission. If the UE receives a L1 signal/channel to (de)activate a search space set or all search space sets associated with a UE group, I_UG, the UE applies the adaptation N_delay msec or slots after a slot where the UE receives the adaptation request. N_delay can be defined in the specification of the system operation, for example N_delay=1 or 2.

Figure 11:
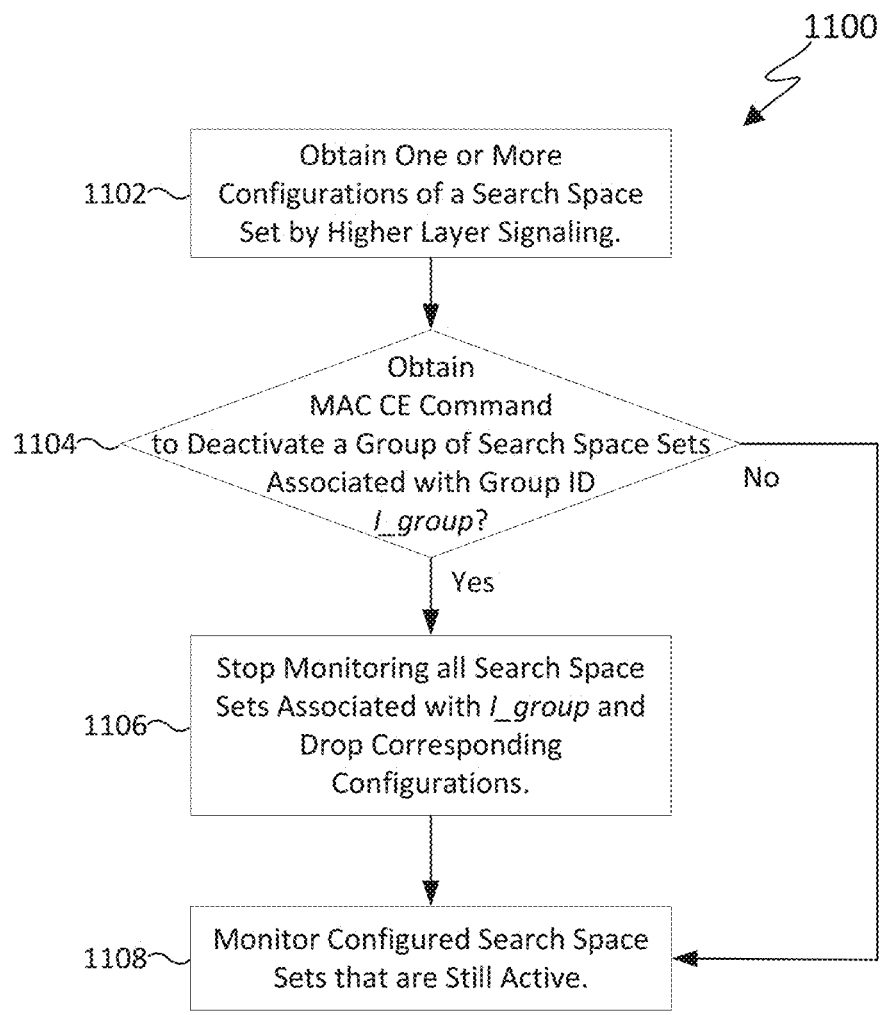
FIG. 11 illustrates a flowchart for monitoring a search space set in accordance with various embodiments of this disclosure.

FIG. 11 illustrates a flowchart for monitoring a search space set in accordance with various embodiments of this disclosure. Operations of flowchart 1100 can be implemented in a UE such as UE 116 in FIG. 3.

Flowchart 1100 begins at operation 1102 by obtaining one or more configurations of a search space set for PDCCH monitoring by higher layer signaling.

In operation 1104 a determination is made as to whether a MAC CE command is received to deactivate a group of search space sets associated with a search set group ID, I_group. If the MAC CE command is received to deactivate a group of search space sets associated with the search space set group ID, I_group, then the flowchart proceeds to operation 1106 and monitoring is stopped for all search space sets associated with I_group and the corresponding configurations are dropped. In a non-limiting embodiment, when the UE receives a MAC CE command to deactivate a search space set group, I_group, the UE can stop monitoring all search space sets associated with I_group, N_delay msec after a slot om which the UE transmits a PUCCH with HARQ-ACK information for the PDSCH providing the deactivation command.

Flowchart 1100 continues to operation 1108 where monitoring of PDCCH continues in the configured search space sets that are still active.

Returning to operation 1104, if a MAC CE command is not obtained which deactivates a group of search space sets associated with a group ID I_group, then flowchart 1100 proceeds from operation 1104 directly to operation 1108.

Regarding blind decoding in each PDCCH monitoring occasion for each scheduled cell, the UE is not required to monitor on the active DL BWP with SCS configuration µ of the scheduling cell more than $\min(M_{PDCCH}^{max,slot,\mu}, M_{PDCCH}^{total,slot,\mu})$ PDCCH candidates or more than $\min(C_{PDCCH}^{max,slot,\mu}, C_{PDCCH}^{total,slot,\mu})$ non-overlapped CCEs per slot, where $M_{PDCCH}^{max,slot,\mu}$ and $C_{PDCCH}^{max,slot,\mu}$ are maximum number of monitored PDCCH candidates per slot and maximum number of non-overlapped CCEs for a DL BWP with SCS configuration µ as defined in REF 3, respectively. Further, $M_{PDCCH}^{total,slot,\mu}$, and $C_{PDCCH}^{total,slot,\mu}$, are total number of monitored PDCCH candidates per slot and total number of non-overlapped CCEs for configured active search space set in the DL BWP with SCS configuration µ as defined in REF 3, respectively. For all activated search space sets within a slot, denote by $S_{CSS}$ a set of CSS sets with cardinality of $I_{CSS}$, by $S_{USS}$ a set of USS sets with cardinality of $J_{USS}$, and by $S_{UGSS}$ a set of UGSS sets with cardinality of $J_{UGSS}$. The location of USS sets $S_j$, $0 \le S_j < J_{USS}$, in $S_{USS}$ is according to an ascending order of the search space set index. The location of UGSS sets $S_k$, $0 \le S_k < J_{UGSS}$, in $S_{UGSS}$ is according to an ascending order of the search space set index. Denote by $M_{S_{CSS}}^{(L)}(i)$, $0 \le i < I_{CSS}$, the number of configured PDCCH candidates for CSS set $S_{CSS}(i)$ and by $M_{S_{USS}}^{(L)}(j)$, $0 \le j < J_{USS}$, the number of configured PDCCH candidates for USS set $S_{USS}(j)$. For the CSS sets, a UE monitors $M_{PDCCH}^{CSS} = \sum_{i=0}^{I_{CSS}-1} \sum_L M_{S_{CSS}}^{(L)}(i)$ PDCCH candidates requiring a total of $C_{PDCCH}^{CSS}$ non-overlapping CCEs in a slot. Denote by $M_{S_{UGSS}}^{(L)}(k)$, $0 \le k < I_{UGSS}$, the number of configured PDCCH candidates for UGSS set $S_{UGSS}(k)$ and by $M_{S_{UGSS}}^{(L)}(j)$, $0 \le k < J_{UGSS}$, the number of configured PDCCH candidates for UGSS set $S_{UGSS}(k)$. For the UGSS sets, a UE monitors $M_{PDCCH}^{UGSS} = \sum_{k=0}^{I_{UGSS}-1} \sum_L M_{S_{UGSS}}^{(L)}(k)$ PDCCH candidates requiring a total of $C_{PDCCH}^{UGSS}$ non-overlapping CCEs in a slot. The UE allocates monitored PDCCH candidates to USS sets for the primary cell having an active DL BWP with SCS configuration µ in slot n according to the following pseudocode. A UE does not expect to monitor PDCCH in a USS set without monitored PDCCH candidates. Denote by $V_{CCE}(S_{USS}(j))$ the set of non-overlapping CCEs for search space set $S_{USS}(j)$ and by $C(V_{CCE}(S_{USS}(j)))$ the cardinality of $V_{CCE}(S_{USS}(j))$ where the non-overlapping CCEs for search space set $S_{USS}(j)$ are determined considering the monitored PDCCH candidates for the activated CSS sets and the monitored PDCCH candidates for all activated search space sets $S_{USS}(k)$, $0 \le k < j$.

The previously mentioned pseudocode is as follows:

```
Set M_PDCCH^USS = min(M_PDCCH^maxslot,µ, M_PDCCH^total,slot,µ) -
  M_PDCCH^CSS - M_PDCCH^UGSS
Set C_PDCCH^USS = min(C_PDCCH^maxslot,µ, C_PDCCH^total,slot,µ) -
  C_PDCCH^CSS - C_PDCCH^UGSS
Set j = 0
  while Σ_L M_{s_uss(j)}^(L) ≤ M_PDCCH^USS AND C(V_CCE(S_uss(j))) ≤ C_PDCCH^USS
    allocate Σ_L M_{s_uss(j)}^(L) monitored PDCCH candidates to USS set
    S_uss(j);
    M_PDCCH^USS = M_PDCCH^USS - Σ_L M_{s_uss(j)}^(L);
    C_PDCCH^USS = C_PDCCH^USS - C(V_CCE(S_uss(j)));
    j = j + 1;
  end while.
```

GROUP COMMON PDCCH FOR MULTICAST IN DL

Another embodiment of this disclosure considers a type of PDCCH that a UE monitors in a search space, for example a CSS or a UGSS, and provides a DCI format scheduling PDSCH multicast to a group of UEs. This type of PDCCH is referred to as Type1-PDCCH in this disclosure. Type1-PDCCH can be monitored at least for UE in RRC_CONNECTED state.

A UE can be provided by higher layers a RNTI that scrambles the CRC of the DCI format transmitted in Type1-PDCCH. The RNTI is referred as M-RNTI in this disclosure. A UE can determine the M-RNTI associated with Type1-PDCCH monitoring through one of the following:

in one example, M-RNTI can be provided to the UE through UE-specific/dedicated RRC signaling;
  in another example, M-RNTI can be provided to the UE through UE-common RRC signaling, for example in system information, for another example, in a TB through a multicast PDSCH scheduled by Type1-PDCCH; and
  in yet another example, M-RNTI can be provided to the UE through a MAC CE in a PDSCH.

Figure 12:
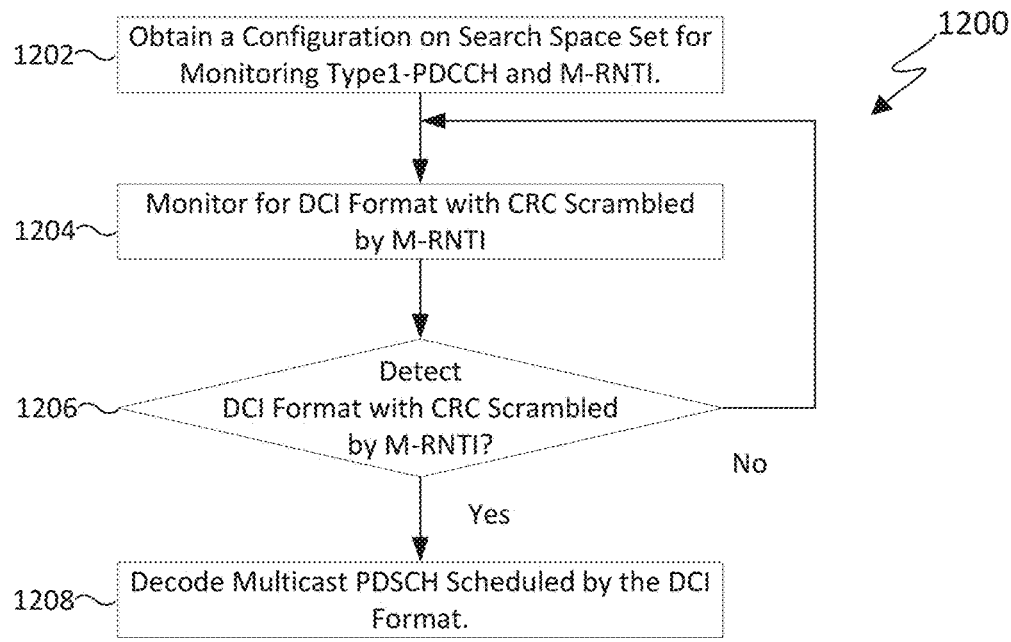
FIG. 12 illustrates a flowchart for receiving a multicast TB scheduled by a Type1-PDCCH in a search space set t in accordance with various embodiments of this disclosure.

FIG. 12 illustrates a flowchart for receiving a multicast TB scheduled by a Type1-PDCCH in a search space set t in accordance with various embodiments of this disclosure. Operations of flowchart 1200 can be implemented in a UE such as UE 116 in FIG. 3.

Flowchart 1200 begins at operation 1202 by obtaining a configuration on search space set for monitoring a Typ1_PDCCH and M-RNTI. In a non-limiting embodiment, the configuration on the search space set is a CSS set or a UGSS.

In operation 1204, monitoring for a DCI format with CRC scrambled by M-RNTI is performed. A determination is made in operation 1206 as to whether the DCI format with CRC scrambled by M-RNTI is detected. If the DCI format with CRC scrambled by M-RNTI is not detected, then flowchart 1200 returns to operation 1204. However, if the DCI format with CRC scrambled by M-RNTI is not detected, then flowchart 1200 proceeds to operation 1208 where multicast PDSCH scheduled by the DCI format is decoded. In one embodiment, a UE decodes a TB in scheduled PDSCH based on the DL assignment/grant from the detected DCI format.

The DCI format with CRC scrambled by M-RNTI, that is used for scheduling a PDSCH to through Type1-PDCCH in search space set, can include any field in DCI format 1_0 or DCI format 1_1 in REF 2 and any of the following five fields.

A first field is a number of repetitions for the scheduled multicast PDSCH, N_rep. N_rep indicates a TB in scheduled PDSCH is repeated in N_rep slots. The N_rep slots can be consecutive such as for FDD operation or non-consecutive such as for TDD operation where slots that do not include, based on a higher layer configuration for a number of slots that repeats in time, a number of DL symbols indicated by the DCI format for PDSCH reception are skipped.

A second field is a carrier indicator field, $n_{CI}$, which is the carrier indicator field value if the UE is configured with a carrier indicator field.

A third field is a redundancy version (RV) for the first repetition, I_RV_first, which can be 2 bits and indicate a value from a predetermined list, for example, L_RV={0, 1, 2, 3}. The index of RV from the list for the ith repetition can be floor(i/4)+I_RV_first. Alternatively, the first repetition can always be transmitted with the first RV from the list, i.e. 0, and a corresponding indication can be omitted in the DCI format.

A fourth field is a TB counter, n_TB. n_TB=0, 1, . . . , N_TBs−1, where N_TBs is the maximum value of TB counter, and N_TBs can either be provided to the UE through higher layer signaling or defined in the specification of the system operation, for example, N_TB=8.

A fifth field is a HARQ feedback type, n_harq_type. n_harq_type can be a binary value to indicate UE need to feedback positive acknowledgement (ACK) or negative acknowledgement (NACK) information. This indication can alternatively be provided to the UE by higher layer signaling.

For HARQ-ACK feedback, a UE can transmit a sequence, d(n), to indicate either positive acknowledgement (ACK) or negative acknowledgement (NACK) in response to success or failure, respectively, for detecting the TB in the scheduled PDSCH. The sequence can be low PAPR sequence as defined as $r_{u,v}^{(\alpha\delta)}(n)=e^{j\alpha n}\bar{r}_{u,v}(n)$, $0 \le n < M_{ZC}$ in REF 1, where u, and v are the group number and base sequence number with in the group, respectively. A UE can determine u and v through one of the following two examples.

In a first example, u and v can be associated with a UE ID, I_UE. For example, $\mu=\text{mod}(\lfloor I_{UE}/c1 \rfloor *c2+c3, 30)$, $v=\text{mod}(I_{UE}, c1)$, where c1, c2 and c3 are integers, e.g. c1 is the number of base sequence per sequence group, c2=1, c3=0.

In one sub-example of the first example, I^UE can be an International Mobile Subscriber Identity (IMSI).

In another sub-example of the first example, I^UE can be a SAE Temporary Mobile Subscriber Identity (s-TMSI);

In yet another sub-example of the first example, I^UE can be a C-RNTI.

In yet another sub-example of the first example, I^UE can be provided to UE through higher layer signaling along with CSS set group ID, I_group.

In a second example, u and v can be associated with C-RNTI. For example, For example, $\mu=\text{mod}(\lfloor n_{rnti}/c1 \rfloor *c2+c3, 30)$, $v=\text{mod}(n_{rnti}, c1)$, where c1, c2 and c3 are integers, e.g. c1 is the number of base sequence per sequence group, c2=1, c3=0, $n_{rnti}$ is C-RNTI.

The slot n for UE to feedback ACK or NACK information can be determined by the dynamic K1 in the scheduling DCI, such that n=n_PDSCH+K1, where n_PDSCH is the last/first slot index.

Figure 13:
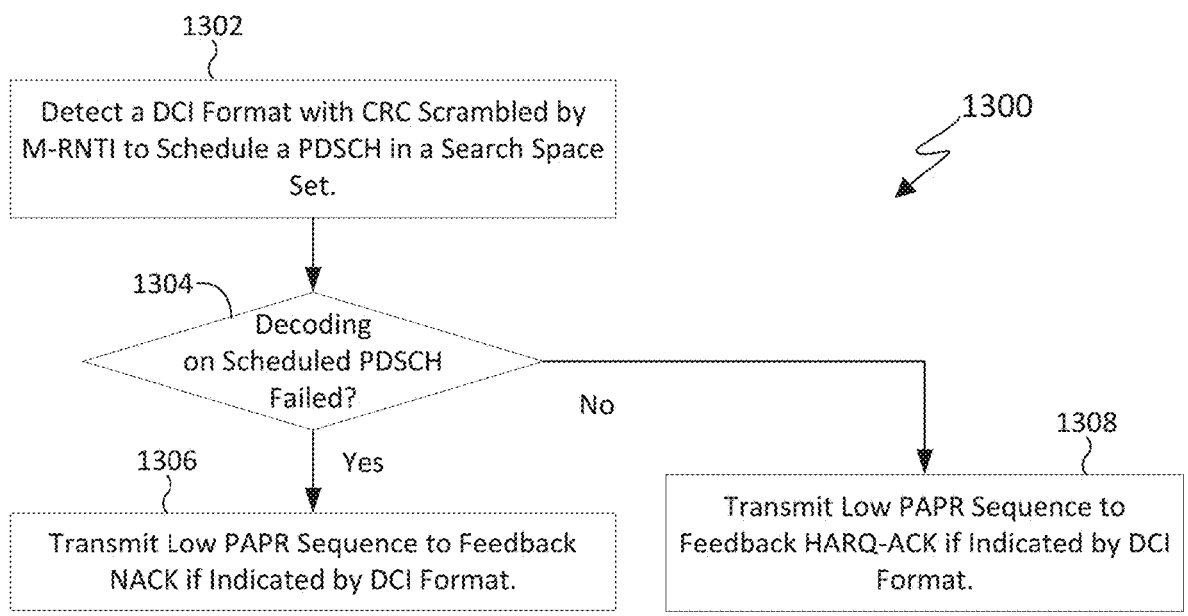
FIG. 13 illustrates a flowchart for transmitting HARQ-ACK information for a multicast TB based on Type1-PDCCH in a search space set in accordance with various embodiments of this disclosure.

FIG. 13 illustrates a flowchart for transmitting HARQ-ACK information for a multicast TB based on Type1-PDCCH in a search space set in accordance with various embodiments of this disclosure. Operations of flowchart 1300 can be implemented in a UE such as UE 116 in FIG. 3.

Flowchart 1300 begins at operation 1302 by detecting a DCI format with CRC scrambled by M-RNTI for scheduling a PDSCH in a search space set, for example a CSS set or a UGSS set.

In operation 1304, a determination is made as to whether decoding on the scheduled PDSCH has failed. If decoding on the scheduled PDSCH has failed, then flowchart 1300 proceeds to operation 1306 where a low PAPR sequence is transmitted to feedback NACK, if indicated by the DCI format. When the UE is indicated by the detected DCI format, or is configured by higher layers, to transmit NACK when the UE fails to decode the TB in the scheduled PDSCH, the UE then transmits a sequence in a slot n to indicate a NACK such that n=n_PDSCH+K1, where n_PDSCH is the first/last scheduled PDSCH repetition and K1 is a time offset indicated in the DCI format or configured by higher layers.

If decoding on the scheduled PDSCH has not failed, then flowchart 1300 proceeds to operation 1308 where a low PAPR sequence is transmitted to feedback HARQ-ACK, if indicated by the DCI format. When the UE is indicated by the detected DCI format or is configured by higher layers to transmit an ACK when the succeeds in decoding the TB in the scheduled PDSCH, the UE transmits a sequence in a slot n to indicate an ACK, such that n=n_PDSCH+K1, where n_PDSCH is the first/last scheduled PDSCH repetition and K1 is time offset indicated in the DCI format.

GROUP-COMMON PDCCH FOR CONTROL SIGNALING

Another embodiment of this disclosure considers a type of PDCCH monitored in search space, for example CSS or UGSS, for multicasting common control information to UEs. This type of PDCCH is referred as Type2-PDCCH in this disclosure. The control information can at least be used to trigger adaptation in configured transmission or receptions for a UE such as, for example, for indicating a switching of power saving states/modes, where multiple power saving states/modes can be preconfigured through higher layer signaling or for triggering a UE to go-to-sleep or to skip PDCCH monitoring for a period of time. Type2-PDCCH can be monitored at least for UE in RRC_CONNECTED state.

A UE can be configured by higher layers a RNTI that is used to scramble the CRC of the DCI format provided by the Type2-PDCCH. The RNTI is referred to as G-RNTI in this disclosure. It is 0<G-RNTI<2^N_bits−1, where N_bits is the size of G-RNTI, N_bits can be either defined in the specification of the system operation, for example, N_bits=16 or 24, or provided to the UE through higher layer signaling. A UE can be provided a G-RNTI associated with Type2-PDCCH monitoring through any of the following three examples.

In a first example, G-RNTI can be provided to the UE through dedicated RRC signaling.

In a second example, G-RNTI can be provided to the UE through UE-common RRC signaling, for example in system information, for another example, in a TB through a multicast PDSCH scheduled by Type1-PDCCH.

In a third example, G-RNTI can be provided to the UE through a MAC CE.

The DCI format with CRC scrambled by G-RNTI can include one or more of the following fields: power saving states/modes indicator, short message indicator, frequency domain resource assignment, time domain resource assignment, VRB-to-PRB mapping, modulation and coding scheme, and TB scaling. Each of these fields are discussed in more detail in the paragraphs that follow.

The power saving states/modes indicator field, I_PSM, has N1 bits, where N1 can be provided to the UE through higher layer signaling or be defined in the specification of the system operation, such as N1=2. I_PSM can indicate to the UE switch to the I_PSM th configured power saving state/mode. The 2^N1 power saving states/modes can be associated with different power saving schemes, and provided to UE through higher layer signaling.

The short message indicator field, shortMessageOnly, can have a binary value that indicates to the UE whether or not the control information in the DCI format schedules a PDSCH reception or a PUSCH transmission. When the DCI format provides only control information without scheduling a PDSCH reception or a PUSCH transmission, the UE can always process the control information in the DCI format. Otherwise, when the DCI format schedules a PDSCH reception, the UE receives the PDSCH and processes both the control information and the TB. In one example, the scheduled TB can indicate a subset of the group of UEs that monitors the DCI format as applicable UEs that need apply the adaptation request indicated by the control information. In this case, the UE ID, I^UE, can be carried in the TB of the scheduled PDSCH.

In one embodiment, I^UE can be an International Mobile Subscriber Identity (IMSI). In another embodiment, I^UE can be a SAE Temporary Mobile Subscriber Identity (s-TMSI). In yet another embodiment, I^UE can be a C-RNTI. In yet another embodiment, I^UE can be provided to UE through higher layer signaling along with CSS set group ID, I_group.

The frequency domain resource assignment field can have $\lceil \log_2(N_{RB}^{DL,BWP}(N_{RB}^{DL,BWP}+1)/2) \rceil$ bits. If the DCI format provides only the short message, this bit field is reserved or can be reinterpreted for another purpose. $N_{RB}^{DL,BWP}$ is the size (in RBs) of the associated CORESET for the PDCCH reception or of an active DL BWP for the UE.

The time domain resource assignment field can have 4 bits as defined in Subclause 5.1.2.1 of REF 4. If the DCI format provides only the short message, this bit field is reserved or can be reinterpreted for another purpose.

The VRB-to-PRB mapping field can have 1 bit according to Table 7.3.1.1.2-33 in REF 2. If the DCI format provides only the short message, this bit field is reserved or can be reinterpreted for another purpose. It is also possible for the mapping to be predetermined and this field to not exist.

The modulation and coding scheme field can have 5 bits as defined in Subclause 5.1.3 of REF 4, using Table 5.1.3.1-1, or another configurable number of bits. If the DCI format provides only the short message, this bit field is reserved or can be reinterpreted for another purpose.

The TB scaling field can have 2 bits as defined in Subclause 5.1.3.2 of REF4. If the DCI format provides only the short message, this bit field is reserved or can be reinterpreted for another purpose.

Figure 14:
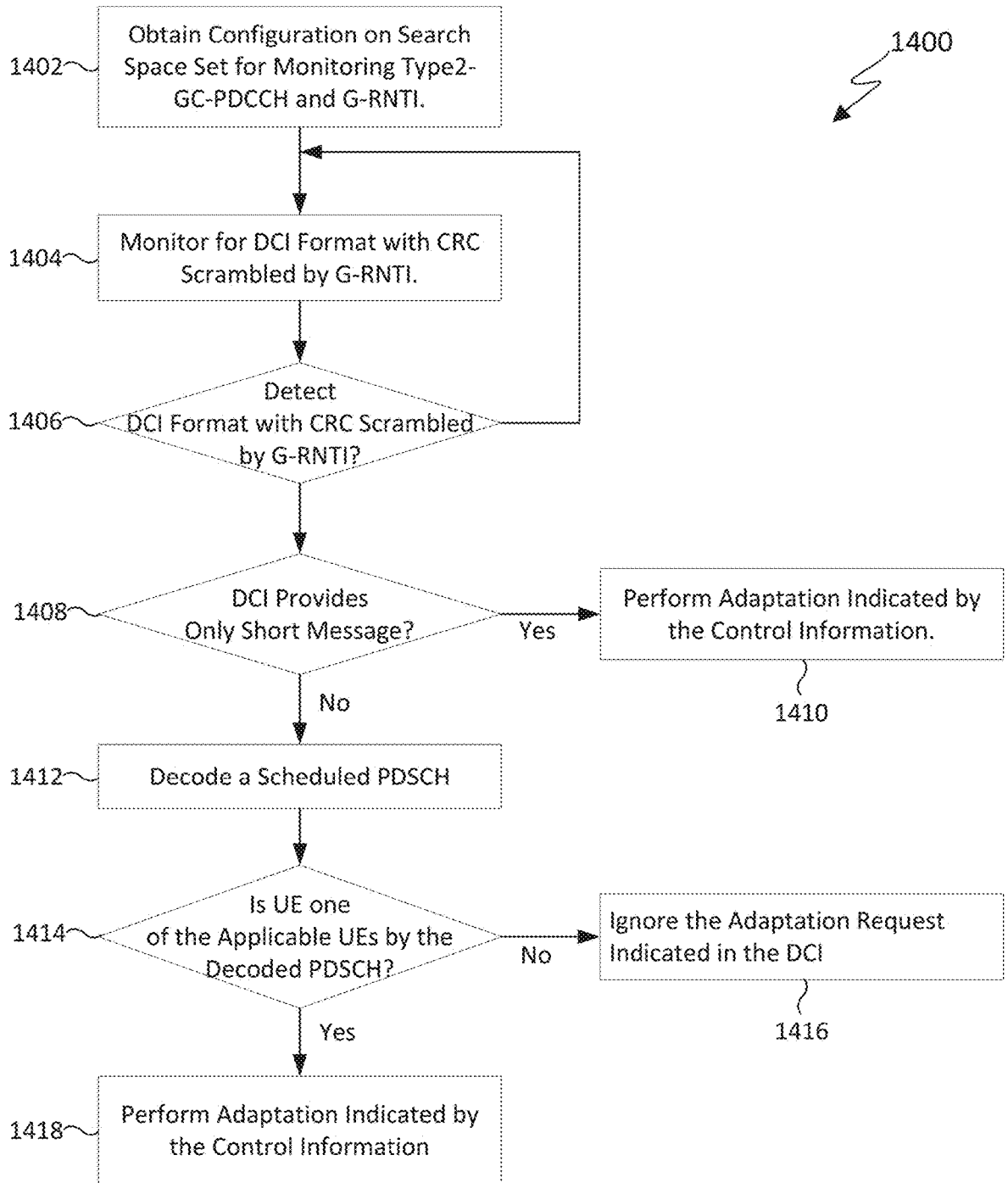
FIG. 14 illustrates flowchart for receiving control information based on Type2-PDCCH in a search space set in accordance with various embodiments of this disclosure.

FIG. 14 illustrates flowchart for receiving control information based on Type2-PDCCH in a search space set in accordance with various embodiments of this disclosure. Operations of flowchart 1400 can be implemented in a UE such as UE 116 in FIG. 3.

Flowchart 1400 begins at operation 1402 by obtaining configuration on search space set for monitoring Type2-PDCCH and a corresponding RNTI. The configuration on the search space set can be a CSS set or a UGSS set for monitoring Type2-PDCCH, and a corresponding RNTI, e.g., a G-RNTI. In operation 1404, monitoring for a DCI format with CRC scrambled by G-RNTI is performed.

A determination is made in operation 1406 as to whether a DCI format with CRC scrambled by G-RNTI is detected. If the DCI format with CRC scrambled with G-RNTI is not detected, then flowchart 1400 returns to operation 1404. However, if the DCI format with CRC scrambled with G-RNTI is detected, then flowchart 1400 proceeds to operation 1408 where a subsequent determination is made as to whether the DCI format provides only short messages.

If, in operation 1408, the determination is made that only short messages are provided in the DCI format, then flowchart 1400 proceeds to operation 1410 where adaptation indicated by the control information is performed. However, if the determination is made that the DCI format does not provide only short messages, then flowchart 1400 proceeds to operation 1412 where a scheduled PDSCH is decoded. In one embodiment, the DCI format does not provide only short messages when it provides both short messages and scheduling information.

In operation 1414 a determination is made as to whether the UE is one of the applicable UEs indicated by the decoded PDSCH, i.e., whether the information in the decoded TB in the PDSCH is applicable to the UE. If the UE is one of the applicable UEs indicated by the decoded PDSCH, i.e., the information in the decoded TB indicates that the control information in the DCI format is applicable to the UE, then flowchart 1400 proceeds to operation 1418 where the adaptation indicated in the control information is performed. However, if the UE is not one of the applicable UEs indicated by the decoded PDSCH, then flowchart 1400 proceeds to operation 1416 and the adaptation request indicated in the DCI is ignored.

TRANSMISSION ENHANCEMENT SCHEMES

Another embodiment of this disclosure considers enhancements for PDCCH transmissions in a search space set, for example a CSS set or a UGSS set, including support of repetitions and multi-beam operation and multi-slot scheduling.

A UE is configured to monitor PDCCH in a search space set. The UE can determine PDCCH monitoring occasions on an active DL BWP from configuration information for the associated search space set, including the PDCCH monitoring periodicity, the PDCCH monitoring offset, and the PDCCH monitoring pattern within a slot. The UE determines that a PDCCH monitoring occasion(s) in search space set s exists in a slot with number $n_{s,f}^{\mu}$REF1 in a frame with number $n_f$ if $(n_f N_{slot}^{frame,\mu}+n_{s,f}^{\mu}-o_s) \mod k_s=0$. When a UE is configured to monitor a DCI format in search space set s, with duration $T_s$, the UE monitors the DCI format in search space set s for $T_s$ consecutive slots, starting from slot $n_{s,f}^{\mu}$, and does not monitor the DCI format in search space set s for the next $k_s-T_s$ consecutive slots.

The UE can determine a number of PDCCH monitoring occasions in a search space set per a PDCCH monitoring periodicity, N_MOs, according to the configured duration, $T_s$, and PDCCH monitoring pattern within a slot of associated search space set s, such that N_MOs=$T_s$*N^MOs_slot, where N^MOs_slot is the number of PDCCH monitoring occasions within a slot indicated by the configured PDCCH monitoring pattern, or the number of start OFDM symbol within a slot associated with search space set s.

When the number of PDCCH monitoring occasions within a periodicity, N_MOs, is larger than one, the UE can expect only same content for a DCI format transmitted over the N_MOs PDCCH monitoring occasions. In multi-beam operation, the UE can determine the QCL assumptions (TCI states for the CORESET) for the N_MOs>1 PDCCH monitoring occasions through one of the following three examples.

In a first example, the UE can assume that the TCI state for the CORESET of the PDCCH transmission with the DCI format changes every C1 monitoring occasions within a PDCCH periodicity. In this case, the maximum of ⌈N_MOs/C1⌉ different TCI states can be transparent to the UE. Alternatively, the UE can be provided with a list of ⌈N_MOs/C1⌉ TCI states through higher layer signaling to indicate the QCL assumption of the ⌈N_MOs/C1⌉ subset of PDCCH monitoring occasions wherein the ith (i=0, 1, . . . , ⌈N_MOs/C1⌉−1) TCI state from the list indicate the QCL assumption for the ith (i=0, 1, . . . , ⌈N_MOs/C1⌉−1) subset with maximum of C1 monitoring occasions. C1 is a positive integer, and can be either defined in the specification, e.g. C1=1, or be provided to the UE through higher layer signaling.

In a second example, the UE can assume that the TCI state for the CORESET of the PDCCH transmission with the DCI format cycles every C1 monitoring occasions within a PDCCH periodicity. In this case, a UE can be provided with a list of ⌈N_MOs/C1⌉ TCI states by higher layer signaling and the UE can be provided with the index of the first TCI state, I_0, by higher layer signaling. The UE can determine the QCL assumption for the ith (i=0, 1, . . . , ⌈N_MOs/C1⌉−1) subset of maximum of C1 monitoring occasions based on I_0, such that the (I_0+i)th TCI state from the list indicate the QCL assumption for the ith subset of maximum of C1 monitoring occasions. I_0 can be reconfigured by a MAC CE. C1 is a positive integer, and can be either be defined in the specification, e.g. (C1=1, or be provided to the UE through higher layer signaling.

In a third example, the UE can assume N_MOs equals to the number of actual transmitted SS/PBCH blocks determined according to ssb-PositionsInBurst in SIB1. The ith PDCCH monitoring occasion for the DCI format within a periodicity corresponds to the ith transmitted SS/PBCH block and is QCLed (has same TCI state) with the ith transmitted SS/PBCH block. The QCL type between the ith transmitted SS/PBCH block and the ith PDCCH monitoring occasion can be QCL-TypeA/QCL-TypeB/QCL-TypeC/QCL-TypeD and can be provided to the UE through higher layer signaling.

A DCI format, such as DCI format with CRC scrambled by M-RNTI, can be used to schedule N_TBs>=1 TBs over M_slots>=N_TBs slots. This scheme is referred as multi-slot scheduling. The M_slots can be can be consecutive such as for FDD operation or non-consecutive such as for TDD operation where slots that do not include, based on a higher layer configuration for a number of slots that repeats in time, a number of DL symbols indicated by the DCI format for PDSCH reception are skipped. Any of N_TBs/M_slots can be either indicated by the DCI format or provided to the UE through higher layer signaling.

For HARQ-ACK feedback for multi-slot scheduling, the UE can feedback HARQ-ACK for the N_TBs TBs jointly. In this case, when the UE is indicated by a DCI format or higher layer signaling to feedback NACK, the UE transmits a NACK to the gNB if the UE fails on decoding any of the N_TBs. When the UE is indicated to by a DCI format or higher layer signaling to feedback ACK, UE transmits an ACK to gNB only if the UE decodes all the N_TBs TBs correctly.

Figure 15:
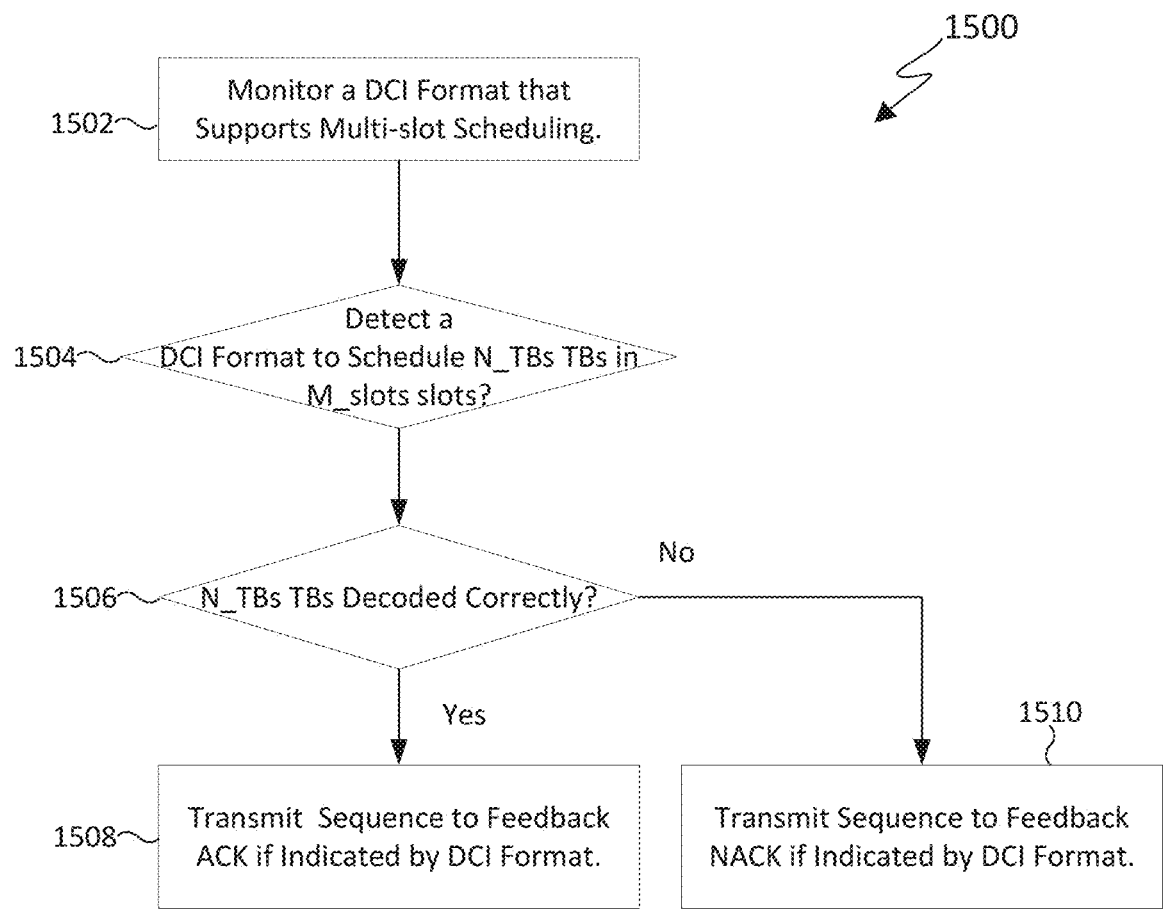
FIG. 15 illustrates a flowchart for receiving multiple TBs scheduled by a DCI format in accordance with various embodiments of this disclosure.

FIG. 15 illustrates a flowchart for receiving multiple TBs scheduled by a DCI format in accordance with various embodiments of this disclosure. Operations of flowchart 1500 can be implemented in a UE such as UE 116 in FIG. 3.

Flowchart 1500 begins at operation 1502 by monitoring for a DCI format that supports multi-slot scheduling. For example, the DCI format with CRC scrambled by M-RNTI in a search space set can be a CSS set or a UGSS set. In operation 1504, a determination is made as to whether the DCI format to schedule N_TBs TBs in M_slots slots is detected. If a DCI format that supports multi-slot scheduling is not detected, then flowchart 1500 returns to operation 1502. However, if the DCI format that supports multi-slot scheduling is detected, i.e., a DCI format that schedules N_TBs TBs over M_slots slots in the search space set, then flowchart 1500 proceeds to operation 1506 to make a determination as to whether N_TBs TBs in the scheduled PDSCH over M_slots is correctly decoded.

If all the N_TBs TBs in the scheduled PDSCH is decoded correctly, then flowchart 1500 proceeds to operation 1508 and a sequence to feedback ACK is transmitted if indicated by the DCI format. When the UE is indicated by the detected DCI format or is configured by higher layers to transmit an ACK when the succeeds in decoding all TBs in the scheduled PDSCHs, the UE transmits a sequence in a slot n to indicate an ACK, such that n=n_PDSCH+K1, where n_PDSCH is the first/last scheduled PDSCH for the reception of the N_TB TBs and K1 is time offset indicated in the DCI format.

If, at operation 1506, the determination is made that the UE fails to correctly decode any TB of the N_TBs TBs in the scheduled PDSCHs, flowchart 1500 proceeds to operation 1510 where a sequence to feedback NACK is transmitted if indicated by the DCI format. When the UE is indicated by the detected DCI format, or is configured by higher layers, to transmit NACK when the UE fails to decode any TB in the scheduled PDSCH, the UE then transmits a sequence in a slot n to indicate a NACK such that n=n_PDSCH+K1, where n_PDSCH is the first/last scheduled PDSCH for the reception of the N_TB TBs and K1 is a time offset indicated in the DCI format or configured by higher layers.

DETERMINATION OF THE CONFIGURATION OF ACTIVATED SEARCH SPACE SETS

Another embodiment of this disclosure considers determination of the configuration of an activated search space set when a UE adaptation for PDCCH monitoring in the search space set through a physical layer signal/channel is enabled. The UE adaptation can at least be (de)activation of configured search space set(s); (de)activation of CORESETs; and update on one or more configuration parameter(s) per search space set/CORESET, such as CCE ALs or PDCCH candidates per CCE AL. When an indication for (de)activation of a CORESET, or of a search space set, is provided by a DCI format, the DCI format is monitored or detected in a search space set that cannot be deactivated.

A UE can determine the search space sets applicable for PDCCH monitoring adaptation triggered by a physical layer signal/channel through one of the following exemplary methods.

In a first method of determining the search space sets applicable for PDCCH monitoring adaptation triggered by a physical layer signal/channel, the applicable search space sets can be defined in the specification of the system operation. For example, the applicable search space sets can be any USS sets configured, as described in REF 5, by SearchSpace in PDCCH-Config with searchSpaceType=ue-Specific for DCI formats with CRC scrambled by C-RNTI, MCS-C-RNTI, SP-CSI-RNTI, or CS-RNTI(s). In another example, the applicable search space sets can be any Type3-PDCCH CSS set configured by SearchSpace in PDCCH-Config with searchSpaceType=common for DCI formats with CRC scrambled by C-RNTI, MCS-C-RNTI, or CS-RNTI(s) for the primary cell.

In a second method of determining the search space sets applicable for PDCCH monitoring adaptation triggered by a physical layer signal/channel, the applicable search space sets can be indicated by RRC signaling along with the configuration of the search space sets or associated CORESETs. For example, a RRC parameter along with the configuration of the search space set can indicate whether or not PDCCH monitoring in this search space set can be adapted by a physical layer signal/channel. A UE is not expected to be configured to support adaptation to any of the following search space sets:

- a Type0-PDCCH CSS set configured by pdcch-ConfigSIB1 in MIB or by searchSpaceSIB1 in PDCCH-ConfigCommon or by searchSpaceZero in PDCCH-ConfigCommon for a DCI format with CRC scrambled by a SI-RNTI on the primary cell of the MCG;
- a Type0A-PDCCH CSS set configured by searchSpaceOtherSystemInformation in PDCCH-ConfigCommon for a DCI format with CRC scrambled by a SI-RNTI on the primary cell of the MCG;
- a Type1-PDCCH CSS set configured by ra-SearchSpace in PDCCH-ConfigCommon for a DCI format with CRC scrambled by a RA-RNTI or a TC-RNTI on the primary cell; or
- a Type2-PDCCH CSS set configured by paging-SearchSpace in PDCCH-ConfigCommon for a DCI format with CRC scrambled by a P-RNTI on the primary cell of the MCG.

In a third method of determining the search space sets applicable for PDCCH monitoring adaptation triggered by a physical layer signal/channel, the index of applicable search space set can be carried in the physical layer signal/channel that triggers PDCCH monitoring adaptation.

In a fourth method of determining the search space sets applicable for PDCCH monitoring adaptation triggered by a physical layer signal/channel, the CORESET associated with applicable search space set(s) can be indicated by RRC signaling. For example, a RRC parameter along with the configuration of the CORESET that the applicable search space set(s) are associated with can indicate whether or not PDCCH monitoring in the associated search space set(s) can be adapted by a physical layer signal/channel.

The value for any configuration parameter related to applicable search space set(s) indicated by a physical layer signal/channel overrides the value for the configuration parameter provided by RRC signaling.

For (de)activation on search space sets triggered by a physical layer signal/channel, any of the following methods can be supported.

In a first method of (de)activation of search space set(s), the search space sets associated with a CORESET can be activated or deactivated simultaneously by indicating the activated or deactivated CORESET ID. For an activated CORESET, when a UE is provided a deactivation indication by a signal/channel at the physical layer, the UE assumes that all applicable search space sets associated with the CORESET are deactivated and the UE can skip monitoring PDCCH candidates in the associated search space sets. For a deactivated CORESET, when a UE is provided an activation indication by a physical layer signal/channel, the UE assumes that all search space sets associated with the CORESET are activated and the UE monitors PDCCH candidates in the associated search space sets.

In a second method of (de)activation of search space set(s), the applicable search space sets can be activated/deactivated simultaneously. For example, a binary bit carried in the physical layer signal/channel can be used to indicate whether or not all applicable search space set is activated.

In a third method of (de)activation of search space set(s), the applicable search space sets can be (de)activated independently or separately. For example, the applicable search space sets can be divided into N>=1 groups, and each of the group consists of at least one applicable search space set. A bitmap in size of N can be carried in the physical layer signal. The nth ($1<=n<=N$) bit indicates whether or not the nth group of search space set(s) are activated or deactivated. In another example, a physical layer single/channel can indicate the search space set group ID or search space set ID that is activated or deactivated. A UE can switch search space sets for PDCCH monitoring based on an activation and deactivation indication for corresponding search space set groups. For example, when the UE receives a DCI format includes a field for a search space set group ID, the UE starts or continues monitoring PDCCH in search space sets that are associated with the search space set group, and does not monitor or stops monitoring PDCCH in search space sets that are not associated with the search space set group.

In a fourth method of (de)activation of search space set(s), the activation and deactivation can be indicated by the detection of a physical layer signal/channel, for example, a DCI format with CRC scrambled by a power saving RNTI, e.g. PS-RNTI. In one example, when detection of the physical layer signal indicates the activation of applicable search space set(s), the payload of the DCI format can be used to indicate UE adaptation on other aspects, such as PDCCH monitoring periodicity or blind decoding capability or minimum scheduling offset. When detection of the physical layer signal indicates the deactivation of applicable search space set(s), the payload of the DCI format can be used to indicate the effective duration or deactivation period. In another example, when a UE detects a DCI format indicating activation or deactivation of search space sets, the UE starts or continues monitoring PDCCH for search space sets that are associated with a search space set group with ID of X, and does not monitor or stops monitoring PDCCH in search space sets that are associated with another search space set group with ID of Y. The search space set groups can be either defined in the specification of system operation, for example, X=0, Y=1, or X=1, Y=0, or provided to the UE through higher layer signaling.

For determination of an effective time that the associated search space set(s) is deactivated/activated, any of the following methods can be supported.

In a first method of determination of activation or deactivation duration, the activation or deactivation duration can be unlimited, and the UE can activate or deactivate an applicable search space set when the UE receives an activation or deactivation indication, respectively.

In a second method of determination of activation or deactivation duration, the effective duration for activation or deactivation can be preconfigured or predetermined by a UE.

For example, through higher layer signaling or defined in the specification of the system operation, e.g. 6 ms. In one example, the power saving signal/channel is detected or monitored outside DRX ON duration, the deactivation or activation duration can be in the unit of DRX cycles. In another example, when the physical layer signal/channel is monitored within the DRX Active Time or in RRC_CONNECTED state without DRX operation, the deactivation or activation duration can be in the unit of one slot or one PDCCH monitoring periodicity. The UE starts decrementing a timer with initial value of the effective duration after applying the activation or deactivation indication. When the timer expires, the UE starts monitoring PDCCH for search space sets that are deactivated for PDCCH monitoring during the effective duration when the timer does not expire, and stops monitoring PDCCH in search space sets that are activated for PDCCH monitoring during the effective duration when the timer does not expire.

In a third method of determination of activation or deactivation duration, the effective duration for an activation or deactivation indication can be carried by the physical layer signal/channel, for example, a list of applicable values for the effective duration can be provided to the UE through higher layer signaling, and a field of a DCI format can indicate one of the applicable values. The applicable value can be unlimited or a non-zero integer. The UE starts decrementing a timer with initial value of the effective duration after applying the activation or deactivation indication. When the timer expires, the UE starts monitoring PDCCH for search space sets that are deactivated for PDCCH monitoring during the effective duration when the timer does not expire, and stops monitoring PDCCH in search space sets that are activated for PDCCH monitoring during the effective duration when the timer does not expire.

For an adaptation on CCE aggregation levels (ALs) or a number of candidates per CCE AL for one or more applicable search space set(s), any of the following methods can be considered.

In a first method of adaptation on CCE aggregation levels (ALs) or a number of candidates per CCE AL for one or more applicable search space set(s), a field of N>=1 bits can be carried in the PoSS, to indicate activation or deactivation of configured ALs. In one example, N equals to the number of RRC configured ALs, and each binary bit indicates activation or deactivation of one configured AL. In another example, N=1, the binary bit of 0 or 1 indicates activation of the first half or the second half of the configured ALs.

In a second method of adaptation on CCE aggregation levels (ALs) or a number of candidates per CCE AL for one or more applicable search space set(s), a scaling factor, c0, can be indicated by the PoSS, and the number of PDCCH candidates per AL, X, is scaled by c0, such that X=ceil(X'*c0) or X=floor(X'*c0), where X' is the number of PDCCH candidates per AL before receiving the indication of c0 in a PoSS. A list of applicable values can be provided to the UE either through higher level signaling or defined in the specification of system operation, for example, {0, 25%, 50%, 100%}.

For UE adaptation on PDCCH monitoring periodicity, T_PDCCH, for applicable search space sets triggered by a physical layer signal/channel, referred as PoSS, any of the following methods can be supported.

In a first method of determination of T_PDCCH, a scaling factor, c2, for the PDCCH monitoring periodicity adaptation can be indicated by a PoSS. The UE assumes the PDCCH monitoring periodicity, T_PDCCH, for applicable search space set(s), is T_PDCCH=floor(T'_PDCCH*c2) or ceil(T'_PDCCH*c2), where T'_PDCCH is the PDCCH monitoring periodicity before receiving the indication of c2 in a PoSS. A list of applicable values for c2 can be preconfigured by higher layer signaling or defined in the specification of the system operation, for example, {0, 25%, 50%, 100%}.

In a second method of determination of T_PDCCH, a list of N>=1 applicable PDCCH monitoring periodicity can be preconfigured by RRC signaling for applicable search space set(s). One of the applicable values is indicated by a PoSS, for example, a DCI field of ceil(log 2(N)) can indicate one of the N applicable values. UE assume the PDCCH monitoring periodicity T_PDCCH is the value indicated by the PoSS.

For UE adaptation on PDCCH monitoring duration, D_PDCCH, for applicable search space sets triggered by a physical layer signal/channel, referred as PoSS, any of the following methods can be supported.

In a first method of determination of D_PDCCH, a scaling factor, c3, for the PDCCH monitoring duration adaptation can be indicated by a PoSS. The UE assumes the PDCCH monitoring duration, D_PDCCH, for applicable search space set(s), is D_PDCCH=floor(D'_PDCCH*c3) or ceil(D'_PDCCH*c3), where D'_PDCCH is the PDCCH monitoring duration before receiving the indication of c3 in a PoSS. A list of applicable values for c3 can be preconfigured by higher layer signaling or defined in the specification of the system operation, for example, {0, 25%, 50%, 100%}.

In a second method of determination of D_PDCCH, a list of N>=1 applicable PDCCH monitoring duration can be preconfigured by RRC signaling for applicable search space set(s). One of the applicable values is indicated by a PoSS, for example, a DCI field of ceil(log 2(N)) can indicate one of the N applicable values. UE assume the PDCCH monitoring duration D_PDCCH is the value indicated by the PoSS.

A UE determines a PDCCH monitoring occasion on an active DL BWP from the PDCCH monitoring periodicity, the PDCCH monitoring offset, and the PDCCH monitoring pattern within a slot configured by RRC signaling and a physical layer signal/channel for triggering adaptation on PDCCH monitoring. For an active search space set s, the UE determines that a PDCCH monitoring occasion(s) exists in a slot with number $n_{s,f}^\mu$ in a frame with number $n_f$ if $(n_f N_{slot}^{frame,\mu} + n_{s,f}^\mu - o_s) \bmod k'_s = 0$. $k'_s = k_s^{PS}$, if the adaptation on PDCCH monitoring periodicity for search space set s, $k_s^{PS}$, is indicated by the signal/channel; otherwise $k'_s = k_s$, where $k_s$ is the PDCCH monitoring periodicity for search space set s configured to the UE by RRC signaling. The UE monitors PDCCH for search space set s for $T'_s$ consecutive slots, starting from slot $n_{s,f}^\mu$, and does not monitor PDCCH for search space sets for the next $k'_s - T'_s$ consecutive slots. $T'_s = T_s^{PS}$, if the adaptation on duration for search space set s, $T_s^{PS}$, is indicated by a PoSS; otherwise $T'_s = T_s$, where $T_s$ is the duration for search space set s configured by RRC signaling.

For determination of DCI formats to monitor for applicable search space sets, a physical layer signal/channel can indicate the UE to monitor subset of configured DCI formats. For example, a binary bit with value of "0" and "1" can indicates the UE to monitor DCI formats with size same as DCI format 0_0 only or DCI format 0_1 only in applicable search space sets. For another example, a binary bit with value of "0" and "1" can indicates the UE to monitor UL DCI formats only or DL DCI formats only in applicable search space sets.

Figure 16:
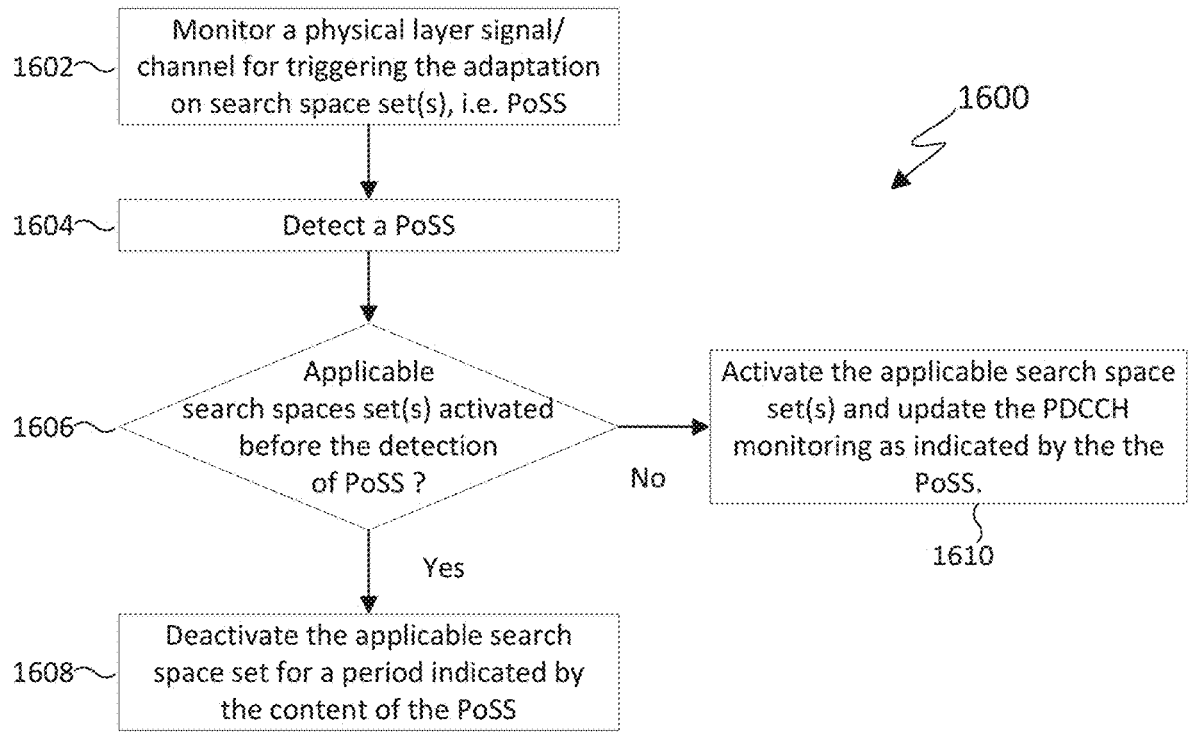
FIG. 16 illustrates a flowchart for activation/deactivation of search space sets triggered by a physical layer signal/channel in accordance with various embodiments of this disclosure.

FIG. 16 illustrates a flowchart for activation/deactivation of search space sets triggered by a physical layer signal/ channel in accordance with various embodiments of this disclosure. Operations in flowchart 1600 can be implemented in a UE, such as UE 116 in FIG. 3.

Flowchart 1600 begins at operation 1602 by monitoring a physical layer signal/channel for triggering the adaptation on one or more search space sets, i.e., PoSS. In operation 1604, a PoSS is detected in a configured monitoring occasion. In operation 1606 a determination is made as to whether the applicable search space set(s) are activated before detection of PoSS. If the applicable search space set(s) are activated before the detection of the PoSS, then the flowchart 1600 proceeds to operation 1608 to deactivate the applicable search space set for a period indicated by the PoSS. For example, a binary bit of 0 can indicate the UE to use the first half of configured ALs and corresponding PDCCH candidates for PDCCH monitoring in the applicable search space set, and a binary bit of "1" can indicate the UE to apply the second half of configured ALs and corresponding PDCCH candidates for PDCCH monitoring in the applicable search space sets.

However, if at operation 1606 a determination is made that the applicable search space set(s) are not activated before detection of the PoSS, then flowchart 1600 proceeds to operation 1610 where the applicable search space set(s) is activated and PDCCH monitoring is updated as indicated by the PoSS. For example, the PoSS can indicate PDCCH monitoring periodicity or CCE aggregation levels, or PDCCH candidates per CCE aggregation levels.

DETERMINATION OF THE CONFIGURATION OF CORESET

Another embodiment of this disclosure considers determination of the configuration of a CORESET when a UE adaptation on the configuration of a CORESET through a physical layer signal/channel is enabled. The physical layer signal/channel that triggers UE adaptation on PDCCH monitoring in one or more applicable CORESET(s) is referred as PoSS in this disclosure.

The UE adaptation can at least be (de)activation of configured search space set(s); (de)activation of CORESETs; and/or update on one or more configuration parameter(s) per search space set/CORESET, such as CCE ALs or PDCCH candidates per CCE AL.

A UE can determine the CORSET applicable for PDCCH monitoring adaptation triggered by a physical layer signal/channel through one of the following methods.

In a first method of determination of applicable CORESET, the applicable CORESET can be indicated by RRC signaling. For example, a RRC parameter along with the configuration of the CORESET can indicate whether or not PDCCH monitoring in the CORESET can be adapted by a physical layer signal/channel.

In a second method of determination of applicable CORESET, the index of the applicable CORESET can be carried in the PoSS.

The value for any configuration parameter related to applicable CORESET indicated by a physical layer signal/channel can override the value for the configuration parameter provided by RRC signaling.

When an adaptation of one or more CORESET(s) is indicated by a signal/channel at physical layer such as a DCI format provided by a PDCCH, for each DL BWP configured to a UE in a serving cell, the UE can be indicated by the signal/channel an adaptation for P'<=N1 CORESETs.

For an applicable CORESET for PDCCH monitoring adaptation triggered by a PoSS, the UE is indicated at least one of the following adaptive parameters by the PoSS, and each indication can override the configuration provided by RRC signaling.

Adaptive parameter 1: CORESET index p. The CORESET index can be indicated implicitly. In this case, the configured CORESETs that can be adapted can be ordered in ascending/descending order, a field in the DCI format can carry a value of mod(j, Y)+c2, where i is the order index of the CORESET, Y can either be the number of configured CORESETs that can be adapted or the maximum of configured CORESETs, e.g. 3, and c2 is a integer, e.g. c2=0. The CORESET index p can indicate the respective CORESET for adaptive parameter(s) or (de)activation of the CORESET.

Adaptive parameter 2: A binary activated/deactivated value.

Adaptive parameter 3: A precoder granularity for a number of REGs in the frequency domain where the UE can assume use of a same DM-RS precoder.

Adaptive parameter 4: A number of consecutive symbols that provides a CORESET size in the time domain, N_OFDM. For example, a positive or negative offset of X symbols can be indicated by the signal/channel, such that N_OFDM=min(N'_OFDM+X, N_max) or N_OFDM=max(N'_OFDM−X, N_min), where X can either be predefined in the specification of the system operation, e.g. 1, or provided to the UE by higher layer signaling, N_max and N_min is the maximum and minimum consecutive symbols of CORESET with adaptation, for example, N_max=3, N_min=1, N'_OFDM is the number of symbols of the applicable CORESET before adaptation.

Adaptive parameter 5: A set of resource blocks that provides a CORESET size in the frequency domain. For example, the configured resource blocks of CORESET can be divided into multiple subsets, and a binary activation/deactivation value for each subset can be indicated by a PoSS.

Figure 17:
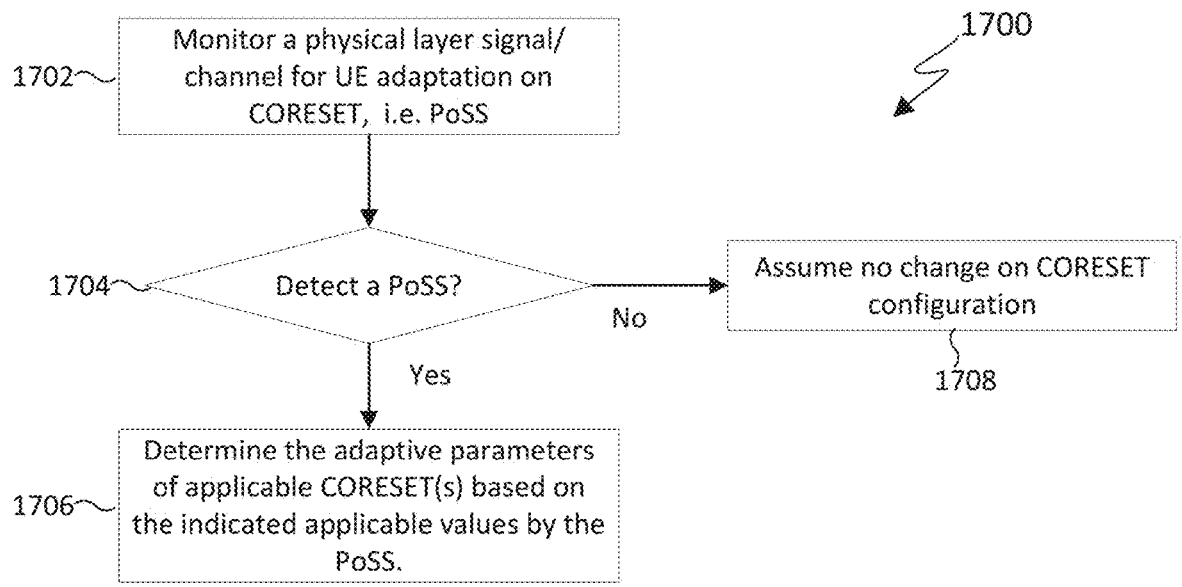
FIG. 17 illustrates a flowchart for adaptation on CORESET based on a signal/channel at the physical layer in accordance with various embodiments of this disclosure.

FIG. 17 illustrates a flowchart for adaptation on CORESET based on a signal/channel at the physical layer in accordance with various embodiments of this disclosure. Operations of flowchart 1700 can be implemented in a UE, such as UE 116 in FIG. 3.

Flowchart 1700 begins at operation 1702 by monitoring a physical layer signal/channel for UE adaption on CORESET, i.e., PoSS. In operation 1704, a determination is made as to whether a PoSS is detected. If a PoSS is detected, the flowchart 1700 proceeds to operation 1706 where adaptive parameters of applicable CORESET(s) is determined based on applicable values indicated by the PoSS. However, if the PoSS is not detected, then the flowchart 1700 proceeds to operation 1708 and an no changes on the CORESET configuration is assumed.

DETERMINATION OF PDCCH CANDIDATES/NON-OVERLAPPING CCEs

Another embodiment of this disclosure considers determination of PDCCH candidates and non-overlapping CCEs per slot for a DL BWP when adaptation on PDCCH monitoring is triggered by a signal/channel at the physical layer.

For an activated search space set s associated with CORESET p, CCE indexes for an activated aggregation level L corresponding to PDCCH candidates $m_{s,n_{CI}}$ of the search space set s in slot $n_{s,f}^{\mu}$ for an active DL BWP of a serving cell corresponding to carrier indicator field value $n_{CI}$ can be given by:

$$L \cdot \left\{ \left( Y_{p,n_{s,f}^{\mu}} + \left\lfloor \frac{m_{s,n_{CI}} \cdot N_{CCE,p}}{L \cdot M'^{(L)}_{s,max}} \right\rfloor + n_{CI} \right) \bmod \lfloor N_{CCE,p}/L \rfloor \right\} + i \quad \text{(Equation 3)}$$

where:

$m_{s,n_{CI}} = 0, \ldots, M'^{(L)}_{s,n_{CI}} - 1$;

$M'^{(L)}_{s,n_{CI}}$ is a number of PDCCH candidates the UE monitors for aggregation level L of a search space set S for a serving cell corresponding to $n_{CI}$;

$M'^{(L)}_{s,n_{CI}} = M^{(L,PS)}_{s,n_{CI}}$, if $M^{(L,PS)}_{s,n_{CI}}$ is indicated by a signal/channel at physical layer, otherwise $M'^{(L)}_{s,n_{CI}}$ equals to the default value configured by RRC signaling;

for a USS, $M'^{(L)}_{s,max}$ is the maximum PDCCH candidates indicated by a signal/channel at physical layer if the signal/channel triggers the adaptation on the maximum PDCCH candidates, otherwise $M'^{(L)}_{s,max}$ is a maximum of $M'^{(L)}_{s,n_{CI}}$ over all configured $n_{CI}$ values for a CCE aggregation level L of search space set s;

$i = 0, \ldots, L-1$; and other parameters are same as NR Rel-15 in REF 3.

Figure 18:
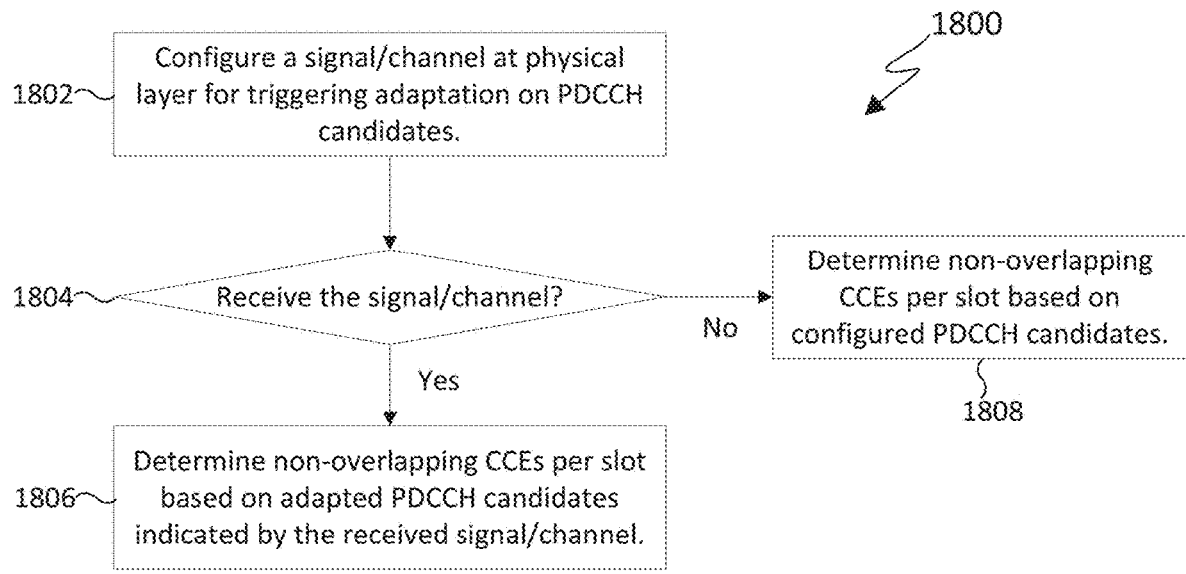
FIG. 18 illustrates a flowchart for determining non-overlapping CCEs with adaptation requests through a signal/channel at the physical layer in accordance with various embodiments of this disclosure.

FIG. 18 illustrates a flowchart for determining non-overlapping CCEs with adaptation requests through a signal/channel at the physical layer in accordance with various embodiments of this disclosure. Operations of flowchart 1800 can be implemented in a UE, such as UE 116 in FIG. 3.

Flowchart 1800 begins at operation 1802 where a signal/channel at a physical layer is configured for triggering adaptation on PDCCH candidates. For example, the UE can be configured with a signal/channel at physical layer for triggering adaptation on PDCCH candidates per CCE AL of search space sets.

In operation 1804 a determination is made as to whether the signal/channel is received. If the signal/channel is received, then flowchart 1800 proceeds to operation 1806 where the non-overlapping CCEs per slot are determined based on adapted PDCCH candidates indicated by the received signal/channel. In one embodiment, non-overlapping CCEs per slot are determined based on adapted PDCCH candidates per AL or maximum PDCCH candidate indicated by the received signal/channel according to Equation 3.

If the signal/channel is not received in operation 1804, then the flowchart 1800 proceeds to operation 1808 where non-overlapping CCEs per slot are determined based on the configured PDCCH candidates, e.g., through RRC signaling.

In some embodiments, a UE can be expected to monitor PDCCH candidates for up to 4 sizes of DCI formats that include up to $\min(N^{PS}_{DCI}, 3)$ sizes of DCI formats with CRC scrambled by C-RNTI per serving cell, where $N^{PS}_{DCI}$ can be indicated by a signal/channel. The UE can count a number of sizes for DCI formats per serving cell based on a number of configured or activated PDCCH candidates in respective search space sets for the corresponding active DL BWP.

Table 3 provides the maximum number of monitored PDCCH candidates, $M'_{PDCCH}{}^{maxslot,\mu}$, for a DL BWP with SCS configuration $\mu$ for a UE per slot for operation with a single serving cell when an adaptation on number of PDCCH candidates per slot, $M_{PDCCH,PS}{}^{maxslot,\mu}$, is indicated by a signal/channel.

TABLE 3

| $\mu$ | Maximum number of monitored PDCCH candidates per slot and per serving cell $M'_{PDCCH}{}^{max,\ slot,\ \mu}$ |
|---|---|
| 0 | 44 or $M_{PDCCH,PS}{}^{maxslot,\mu}$ |
| 1 | 36 or $M_{PDCCH,PS}{}^{maxslot,\mu}$ |

TABLE 3-continued

| $\mu$ | Maximum number of monitored PDCCH candidates per slot and per serving cell $M'_{PDCCH}{}^{max,\ slot,\ \mu}$ |
|---|---|
| 2 | 22 or $M_{PDCCH,PS}{}^{maxslot,\mu}$ |
| 3 | 20 or $M_{PDCCH,PS}{}^{maxslot,\mu}$ |

$M'_{PDCCH}{}^{maxslot,\mu} = M_{PDCCH,PS}{}^{maxslot,\mu}$ if the maximum number of monitored PDCCH candidates per slot per serving cell is indicated by a signal/channel; otherwise, $M'_{PDCCH}{}^{maxslot,\mu} = M_{PDCCH}{}^{maxslot,\mu}$, where $M_{PDCCH}{}^{maxslot,\mu}$ is the maximum number of monitored PDCCH candidates per slot and per severing cell defined in Table 10.1-2 in REF3. For a number of PDCCH candidates indicated by a signal/channel, $M_{PDCCH,PS}{}^{maxslot,\mu}$ can either be indicated b signal/channel explicitly, or be derived from a scaling factor $M_s$ provided by a signal/channel such as $M'_{PDCCH}{}^{max,slot,\mu} = M'_{PDCCH}{}^{max,slot,\mu} \cdot M_s$, or a set of values for $M'_{PDCCH}{}^{max,slot,\mu}$ can be provided by higher layers, such as 4 values, and one value can be indicated by a field in a DCI format provided by a PDCCH, such as a field with 2 bits.

A UE can be requested by a signal/channel a capability to monitor PDCCH candidates for $N_{cell}{}^{cap,PS}$ downlink cells. $N_{cell}{}^{cap,PS}$ can override the default value of the maximum number of downlink cells to monitor PDCCH candidates, i.e. 4, or the configured capability $N_{cells}{}^{cap}$ through pdcch-BlindDetectionCA.

In some embodiments, a UE does not monitor, on the active DL BWP of the scheduling cell, more than $M_{PDCCH}{}^{total,slot,\mu} = M'_{PDCCH}{}^{maxslot,\mu}$ PDCCH candidates or more than $C_{PDCCH}{}^{total,slot,\mu} = C_{PDCCH}{}^{max,slot,\mu}$ non-overlapped CCEs per slot for each scheduled cell if the following two conditions are met.

Condition 1: the UE is capable for operation with carrier aggregation with a maximum of 4 downlink cells or indicates through pdcch-BlindDetectionCA a capability to monitor PDCCH candidates for $N_{cells}{}^{cap} \geq 4$ downlink cells or requested through power saving signal/channel a capability to monitor PDCCH candidates for $0 < N_{cell}{}^{cap,PS} < N_{cells}{}^{cap}$; and Condition 2: the UE is configured with $N_{cells}{}^{DL,\mu}$ downlink cells with DL BWPs having SCS configuration $\mu$, where $\Sigma_{\mu=0}^{3} N_{cell}{}^{DL,\mu} \leq 4$ or $\Sigma_{\mu=0}^{3} N_{cell}{}^{DL,\mu} \leq N_{cells}{}^{cap}$, or $\Sigma_{\mu=0}^{3} N_{cell}{}^{DL,\mu} \leq N_{cell}{}^{cap,PS}$ respectively.

In some embodiments, a UE does not monitor more than $M_{PDCCH}{}^{total,slot,\mu} = \lfloor N_{cells}{}^{cap} \cdot M'_{PDCCH}{}^{maxslot,\mu} \cdot N_{active,cells}{}^{DL,\mu} / \Sigma_{j=0}^{j} N_{active,cells}{}^{DL,j} \rfloor$ PDCCH candidates or more than $C_{PDCCH}{}^{total,slot,\mu} = \lfloor N_{cells}{}^{cap} \cdot C_{PDCCH}{}^{maxslot,\mu} \cdot N_{active,cells}{}^{DL,\mu} / \Sigma_{j=0}^{j} N_{active,cells}{}^{DL,j} \rfloor$ non-overlapping CCEs per slot on the active DL BWP(s) of scheduling cell(s) from the $N_{active,cells}{}^{DL,\mu}$ downlink cells if the following two conditions are met.

Condition 1: the UE indicates through pdcch-BlindDetectionCA a capability to monitor PDCCH candidates for $N_{cells}{}^{cap} \geq 4$ downlink cells or requested through a signal/channel a capability to monitor PDCCH candidates for $0 < N_{cell}{}^{cap,PS} < N_{cells}{}^{cap}$, and Condition 2: The UE is configured with $N_{cells}{}^{DL,\mu}$ downlink cells with DL BWPs having SCS configuration $\mu$ where $\Sigma_{\mu=0}^{3} N_{cell}{}^{DL,\mu} > N_{cells}{}^{cap}$ or $\Sigma_{\mu=0}^{3} N_{cell}{}^{DL,\mu} > N_{cell}{}^{cap,PS}$, respectively, a DL BWP of an activated cell a DL BWP of an activated cell is the active DL BWP of the activated cell, and a DL BWP of a deactivated cell is the DL BWP with index provided by firstActiveDownlinkBWP-Id and signal/channel for the deactivated cell.

For each scheduled cell, the UE is not required to monitor on the active DL BWP with SCS configuration µ of the scheduling cell more than $\min(M'_{PDCCH}{}^{maxslot,\mu}, M_{PDCCH}{}^{total,slot,\mu})$ PDCCH candidates or more than $\min(C_{PDCCH}{}^{maxslot,\mu}, C_{PDCCH}{}^{total,slot,\mu})$ non-overlapped CCEs per slot.

For all activated search space sets within a slot, denote by $S_{CSS}$ a set of CSS sets with cardinality of $I_{CSS}$ and by $S_{USS}$ a set of USS sets with cardinality of $J_{USS}$. The location of USS sets $S_j$, $0 \leq S_j < J_{USS}$, in $S_{USS}$ is according to an ascending order of the search space set index.

Denote by $M'_{S_{CSS}(i)}{}^L$, $0 \leq i < I_{CSS}$, the number of configured or activated PDCCH candidates for CSS set $S_{CSS}(i)$ and by $M'_{S_{USS}(j)}{}^L$, $0 \leq j < J_{USS}$, the number of configured or activated PDCCH candidates for activated USS set $S_{USS}(j)$. For the CSS sets, a UE monitors $M_{PDCCH}{}^{CSS} = \Sigma_{i=0}^{I_{CSS}-1} \Sigma_L M'_{S_{CSS}(i)}{}^L$ PDCCH candidates requiring a total of $C_{PDCCH}{}^{CSS}$ non-overlapping CCEs in a slot.

Denote by $V_{CCE}(S_{USS}(j))$ the set of non-overlapping CCEs for search space set $S_{USS}(j)$ and by $C(V_{CCE}(S_{USS}(j)))$ the cardinality of $V_{CCE}(S_{USS}(j))$ where the non-overlapping CCEs for search space set $S_{USS}(j)$ are determined considering the monitored PDCCH candidates for the activated CSS sets and the monitored PDCCH candidates for all activated search space sets $S_{USS}(k)$, $0 \leq k < j$.

---

Set $M_{PDCCH}{}^{USS} = \min(M'_{PDCCH}{}^{maxslot,\mu}, M_{PDCCH}{}^{total,slot,\mu}) - M_{PDCCH}{}^{CSS}$
Set $C_{PDCCH}{}^{USS} = \min(C_{PDCCH}{}^{maxslot,\mu}, C_{PDCCH}{}^{total,slot,\mu}) - C_{PDCCH}{}^{CSS}$
Set j = 0
while $\Sigma_L M_{suss(j)}{}^{(L)} \leq M_{PDCCH}{}^{uss}$ AND $C(V_{CCE}(S_{uss}(j))) \leq C_{PDCCH}{}^{uss}$
   if search space set j is activated or not deactivated by power saving signal/channel
      allocate $\Sigma_L M_{suss(j)}{}^{(L)}$ monitored PDCCH candidates to USS set $S_{uss(j)}$;
      $M_{PDCCH}{}^{uss} = M_{PDCCH}{}^{uss} - \Sigma_L M_{suss(j)}{}^{(L)}$;
      $C_{PDCCH}{}^{uss} = C_{PDCCH}{}^{uss} - C(V_{CCE}(S_{uss}(j)))$;
   end if;
   j = j + 1;
end while

---

ADDITIONAL TIMELINE FOR UE ADAPTATION

Another embodiment of this disclosure also considers additional timeline for applying UE adaptation request on one or more adaptive parameter(s). The associated adaptation parameter(s) can be any adaptive parameter in this disclosure. When a UE receives an adaptation indication through a signal/channel at physical layer or MCA CE, a UE can apply the UE adaptation or indicated value(s) on associated adaptive parameter(s) after an application delay.

In first embodiment on determination of application delay, if a UE receives an adaptation request or adaptation indication through MAC CE, the UE can apply the indicated value(s) on associated adaptive parameters at a time $T_{gap}{}^{AR}$ millisecond(s)/slot(s) after the slot when the UE transmits HARQ-ACK information for the PDSCH providing the adaptation request.

Figure 19:
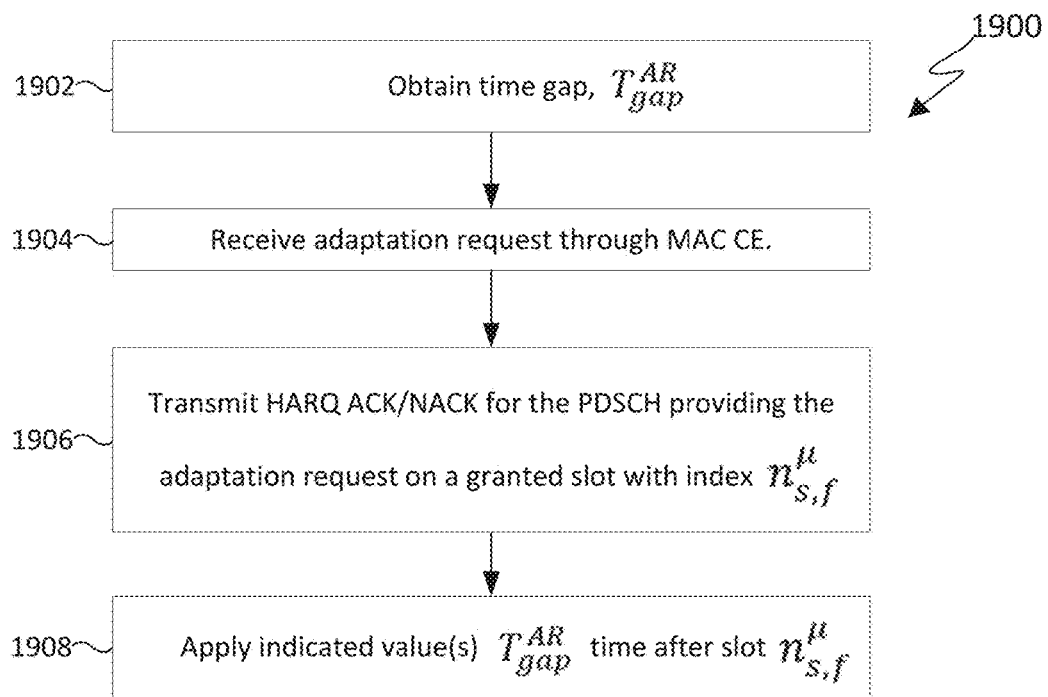
FIG. 19 illustrates a flowchart for applying an adaptation request by a UE when the adaptation request is received through a MAC CE in accordance with various embodiments of this disclosure.

FIG. 19 illustrates a flowchart for applying an adaptation request by a UE when the adaptation request is received through a MAC CE in accordance with various embodiments of this disclosure. Operations of flowchart 1900 can be implemented in a UE, such as UE 116 in FIG. 3.

Flowchart 1900 begins at operation 1902 by obtaining a time gap. The time gap, $T_{gap}{}^{AR}$, can have a unit of one millisecond or one slot. In operation 1904, an adaptation request is received through MAC CE, e.g., in a PDSCH.

In operation 1906, a HARQ ACK/NACK is transmitted for the PDSCH providing the adaptation request on a granted slot with an index of $n_{s,f}{}^{\mu}$.

In operation 1908, newly indicated value(s) in the adaptation request can be applied at $T_{gap}{}^{AR}$ time after the slot $n_{s,f}{}^{\mu}$. In one example, when $T_{gap}{}^{AR}$ is in the unit of one slot, the UE can apply the new indicated value(s) starting from a slot with index $n_{s,f}{}^{\mu} + T_{gap}{}^{AR}$. In the other words, UE is not expected to apply the new indicated value(s) before slot $n_{s,f}{}^{\mu} + T_{gap}{}^{AR}$. In another example, when $T_{gap}{}^{AR}$ is in the unit of one millisecond, the UE can apply the new indicated value(s) starting from a slot with index $n_{s,f}{}^{\mu} + T_{gap}{}^{AR} \cdot 2^{\mu}$, where µ=0, 1,2,3 is the SCS index of active DL BWP. In the other words, UE is not expected to apply the new indicated value(s) before slot $n_{s,f}{}^{\mu} + T_{gap}{}^{AR} \cdot 2^{\mu}$, where µ=0, 1,2,3 is the SCS index of active DL BWP.

In second embodiment on determination of application delay, if a UE receives an adaptation request or indication through a DCI format with CRC scrambled by C-RNTI, the UE can apply the indicated value(s) to associated adaptive parameter(s) at a time $T_{gap}{}^{AR}$ millisecond(s)/slot(s) after slot $n_{s,f}{}^{\mu}$. The slot $n_{s,f}{}^{\mu}$ can be the slot index when UE transmits HARQ-ACK information for the PDSCH granted by the DCI format providing the adaptation request. In this case, UE does not apply the triggered adaptation request or indicated value(s) when UE transmits HARQ-NACK for the PDSCH granted by the DC format. Alternatively, $n_{s,f}{}^{\mu}$ can be the slot index when UE transmits HARQ-ACK/NACK information for the PDSCH granted by the DCI format providing the adaptation request or indication. In this case, the UE can apply the indicated value(s) or adaptation request with a time gap of $T_{gap}{}^{AR}$ after feedback the either HARQ-ACK or HARQ-NACK for the PDSCH granted by the same DCI format that provides the adaptation request/indication.

In one example, the UE can apply the new indicated value(s) starting from a slot with index $n_{s,f}{}^{\mu} + T_{gap}{}^{AR}$. In the other word, UE is not expected to apply the new indicated value(s) before slot $n_{s,f}{}^{\mu} + T_{gap}{}^{AR}$.

In another example, the UE can apply the new indicated value(s) starting from a slot with index $n_{s,f}{}^{\mu} + T_{gap}{}^{AR} \cdot 2^{\mu}$, where µ=0, 1,2,3 is the SCS index of active DL BWP. In the other word, UE is not expected to apply the new indicated value(s) before slot $n_{s,f}{}^{\mu} + T_{gap}{}^{AR} \cdot 2^{\mu}$, where µ=0, 1,2,3 is the SCS index of active DL BWP.

Figure 20:
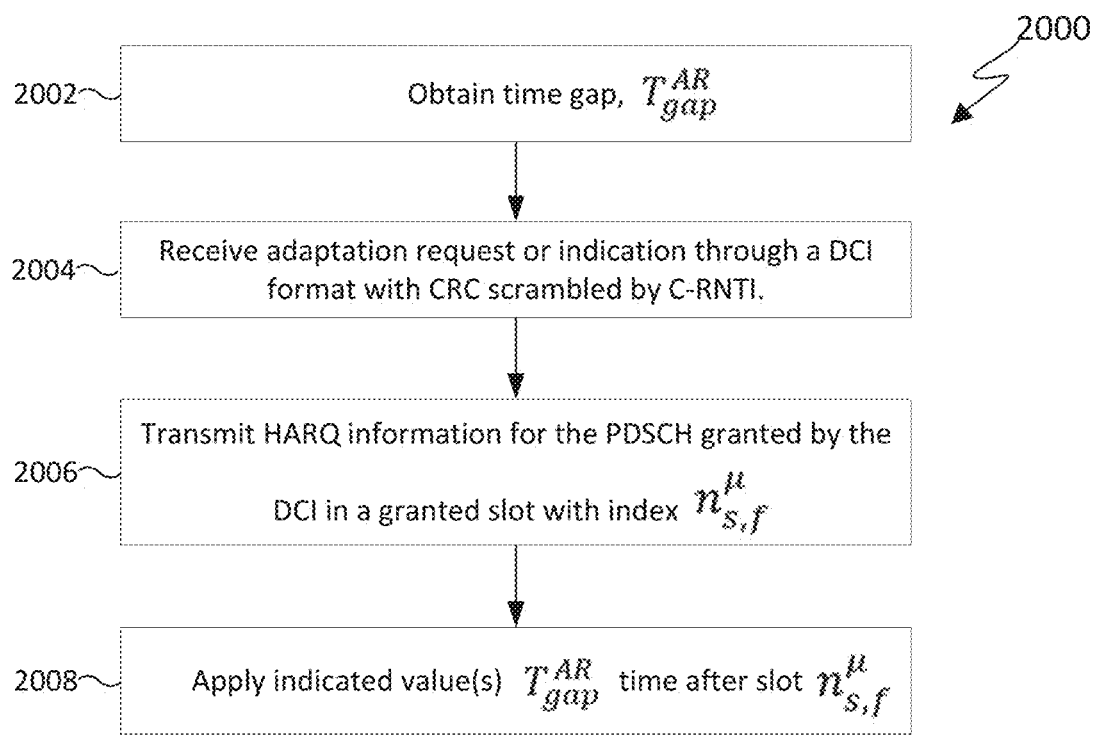
FIG. 20 illustrates a flowchart for applying an adaption request or indication by a UE when the adaptation request or indication is received through a DCI format with CRC scrambled by C-RNTI in accordance with various embodiments of this disclosure.

FIG. 20 illustrates a flowchart for applying an adaption request or indication by a UE when the adaptation request or indication is received through a DCI format with CRC scrambled by C-RNTI in accordance with various embodiments of this disclosure. Operations of flowchart 2000 can be implemented in a UE such as UE 116 in FIG. 3.

Flowchart 2000 begins at operation 2002 by obtaining a time gap. The time gap, $T_{gap}{}^{AR}$, can have units of one millisecond or one slot. In operation 2004, an adaptation request or indication is received through a DCI format with CRC scrambled by C-RNTI.

In operation 2006, HARQ information is transmitted for the PDSCH granted by the DCI providing the adaptation request/indication in a granted slot with index $n_{s,f}{}^{\mu}$. In operation 2008, the newly indicated value(s) are applied starting from a slot with index $n_{s,f}{}^{\mu} + T_{gap}{}^{AR} \cdot 2^{\mu}$, where µ=0, 1,2,3 is the SCS index of active DL BWP. UE is not expected to apply the new indicated value(s) before slot $n_{s,f}{}^{\mu} + T_{gap}{}^{AR} \cdot 2^{\mu}$, where µ=0, 1,2,3 is the SCS index of active DL BWP.

In a third embodiment on determination of application delay, if a UE receives an adaptation request or indication through a signal/channel at physical layer, the UE can apply the adaptation request or indicated values to associated PDCCH monitoring parameters $T_{gap}^{AR}$ time after the time when the UE receives the adaptation request or indication.

In one example, when the physical layer signal/channel for triggering the adaptation is a scheduling DCI, which also schedule a PDSCH, the UE is not expected to apply the new indicated value(s) before slot $$\left\lfloor (n + T_{gap}^{AR}) \cdot \frac{2^{\mu_{PDSCH}}}{2^{\mu_{PDCCH}}} \right\rfloor,$$

where n is the slot index when the UE receives the indicated value(s) with DCI CRC check successfully, and $\mu_{PDSCH}$ and $\mu_{PDCCH}$ are the subcarrier spacing configurations for PDSCH and PDCCH, respectively.

In another example, when the physical layer signal/channel for triggering the adaptation is a scheduling DCI, which also schedule a PDSCH, the UE is not expected to apply the new indicated value(s) before slot $$\left\lfloor (n + T_{gap}^{AR}) \cdot \frac{2^{\mu_{PDSCH}}}{2^{\mu_{PDCCH}}} \right\rfloor,$$

where n is the slot index when the UE receives the indicated value(s) with DCI CRC check successfully, and $\mu_{PDSCH}$ and $\mu_{PDCCH}$ are the subcarrier spacing configurations for PDSCH and PDCCH, respectively.

In yet another example, when the physical layer signal/channel for triggering the adaptation is a scheduling DCI, which also schedule a PDSCH, the UE is not expected to apply the new indicated value(s) before slot $$\left\lfloor n \cdot \frac{2^{\mu_{PDSCH}}}{2^{\mu_{PDCCH}}} \right\rfloor + T_{gap}^{AR},$$

where n is the slot index when the UE receives the indicated value(s) with DCI CRC check successfully, and $\mu_{PDSCH}$ and $\mu_{PDCCH}$ are the subcarrier spacing configurations for PDSCH and PDCCH, respectively.

In yet another example, when the physical layer signal/channel for triggering the adaptation is a scheduling DCI, which also schedule a PDSCH, the UE is not expected to apply the new indicated value(s) before slot $$\left\lfloor n \cdot \frac{2^{\mu_{PDSCH}}}{2^{\mu_{PDCCH}}} \right\rfloor + T_{gap}^{AR},$$

where n is the slot index when the UE receives the indicated value(s) with DCI CRC check successfully, and $\mu_{PDSCH}$ and $\mu_{PDCCH}$ are the subcarrier spacing configurations for PDSCH and PDCCH, respectively.

In yet another example, when the physical layer signal/channel for triggering the adaptation is a scheduling DCI, which also schedule a PUSCH, the UE is not expected to apply the new indicated value(s) before slot $$\left\lfloor (n + T_{gap}^{AR}) \cdot \frac{2^{\mu_{PDSCH}}}{2^{\mu_{PDCCH}}} \right\rfloor,$$

where n is the slot index when the UE receives the indicated value(s), and $\mu_{PUSCH}$ and $\mu_{PDCCH}$ are the subcarrier spacing configurations for PUSCH and PDCCH, respectively.

In yet another example, when the physical layer signal/channel for triggering the adaptation is a scheduling DCI, which also schedule a PUSCH, the UE is not expected to apply the new indicated value(s) before slot $$\left\lfloor (n + T_{gap}^{AR}) \cdot \frac{2^{\mu_{PDSCH}}}{2^{\mu_{PDCCH}}} \right\rfloor,$$

where n is the slot index when the UE receives the indicated value(s) with DCI CRC check successfully, and $\mu_{PUSCH}$ and $\mu_{PDCCH}$ are the subcarrier spacing configurations for PUSCH and PDCCH, respectively.

In yet another example, when the physical layer signal/channel for triggering the adaptation is a scheduling DCI, which also schedule a PUSCH, the UE is not expected to apply the new indicated value(s) before slot $$\left\lfloor n \cdot \frac{2^{\mu_{PDSCH}}}{2^{\mu_{PDCCH}}} \right\rfloor + T_{gap}^{AR},$$

where n is the slot index when the UE receives the indicated value(s) with DCI CRC check successfully, and $\mu_{PUSCH}$ and $\mu_{PDCCH}$ are the subcarrier spacing configurations for PUSCH and PDCCH, respectively.

In yet another example, when the physical layer signal/channel for triggering the adaptation is a scheduling DCI, which also schedule a PUSCH, the UE is not expected to apply the new indicated value(s) before slot $$\left\lfloor n \cdot \frac{2^{\mu_{PDSCH}}}{2^{\mu_{PDCCH}}} \right\rfloor + T_{gap}^{AR},$$

where n is the slot index when the UE receives the indicated value(s) with DCI CRC check successfully, and $\mu_{PUSCH}$ and $\mu_{PDCCH}$ are the subcarrier spacing configurations for PUSCH and PDCCH, respectively.

In yet another example, when the physical layer signal/channel for triggering the adaptation is a non-scheduling DCI format, e.g. a DCI format dedicated for power saving with CRC scrambled by PS-RNTI in the means of either USS or CSS, the UE is not expected to apply the new indicated value(s) before slot $n+T_{gap}^{AR} \cdot 2^\mu$, where $\mu=0, 1,2,3$ is the SCS index of active DL BWP when UE is ready to apply the triggered adaptation, and n is the slot index when the UE receives the indicated value(s) with DCI CRC check successfully.

In yet another example, when the physical layer signal/channel for triggering the adaptation is a non-scheduling DCI format, e.g. a DCI format dedicated for power saving with CRC scrambled by PS-RNTI in the means of either USS or CSS, the UE is not expected to apply the new indicated value(s) before slot $n+T_{gap}^{AR}$, where n is the slot index when the UE receives the indicated value(s) with DCI CRC check successfully.

Figure 21:
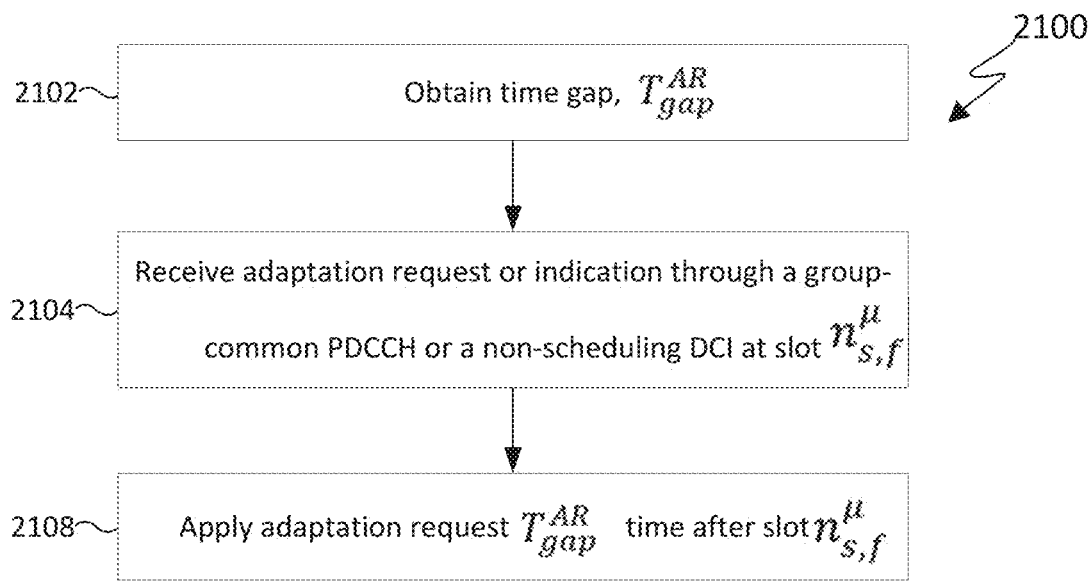
FIG. 21 illustrates a flowchart for applying an adaptation request on PDCCH monitoring in a UE when the adaptation request is received through a group-common PDCCH or non-scheduling DCI without HARQ feedback in accordance with various embodiments of this disclosure.

FIG. 21 illustrates a flowchart for applying an adaptation request on PDCCH monitoring in a UE when the adaptation request is received through a group-common PDCCH or non-scheduling DCI without HARQ feedback in accordance with various embodiments of this disclosure. Operations of flowchart 2100 can be implemented in a UE, such as UE 116 in FIG. 3.

Flowchart 2100 begins at operation 2102 by obtaining a time gap. The time gap, $T_{gap}^{AR}$, can have units of one millisecond or one slot or an OFDM symbol duration. In operation 2104 an adaptation request or indication is received through a group-common PDCCH or a non-scheduling DCI at slot $n_{s,f}^\mu$. In operation 2106, the adaptation request or indication is applied at time or slot that is at least $T_{gap}^{AR}$ after the slot $n_{s,f}^\mu$.

A UE can determine a value for $T_{gap}^{AR}$ through one of the following examples. In a first example, $T_{gap}^{AR}$ is fixed and defined in the specification of the system operation, e.g. $T_{gap}^{AR}=1$ or $T_{gap}^{AR}=0$. In one example, $T_{gap}^{AR}$ can be defined per SCS configuration.

In a second example, $T_{gap}^{AR}=\max(Y, Z)$, where Y is the minimum K0 value before applying newly indicated applicable value or UE adaptation, Z is the smallest feasible non-zero application delay. Z can be fixed and defined in the specification of the system operation, e.g. Z=1 or Z=2. Z can depend on DL SCS, e.g. Z=1 for SCS=15 KHz/30 KHz, Z=2 for SCS=60 KHz, and the Z=3 for Z=120 KHz.

In a third example, $T_{gap}^{AR}=\max(Y, Z)$, where Y is maximum value of minimum K0, and/or minimum K2, and/or minimum aperiodic CSI-RS triggering offset before applying newly indicated applicable value(s) or UE adaptation, Z is the smallest feasible non-zero application delay. Z can be fixed and defined in the specification of the system operation, e.g. Z=1 or Z=2. Z can depend on DL SCS, e.g. Z=1 for SCS=15 KHz/30 KHz, Z=2 for SCS=60 KHz, and the Z=3 for Z=120 KHz.

In a fourth example, $T_{gap}^{AR}$ can be provided to the UE through higher layer signaling.

In a fifth example, $T_{gap}^{AR}$ can be provided to UE through higher layer signaling in response to assistance information of the preferred value on transmitted from UE to gNB.

AR In a sixth example, $T_{gap}^{AR}$ can be associated with a time gap/offset between the first monitoring occasion of the physical layer signal/channel for triggering the UE adaptation and the start of next DRX ON duration, denoted as O^MO_DRX1.

In a sub-example of the sixth example, $T_{gap}^{AR}=\max(Z, O\hat{}MO\_DRX1)$, where Z is the smallest feasible non-zero application delay. Z can be defined in the specification of the system operation, e.g. Z=1, or Z=2 or Z=1 for SCS=15 KHz/30 KHz, Z=2 for SCS=60 KHz, and Z=3 for SCS=120 KHz or Z is UE capability of BWP switching delay, i.e. bwp-SwitchingDelay.

In another sub-example of the sixth example, $T_{gap}^{AR}=O\hat{}MO\_DRX1$. UE can start applying the triggered UE adaptation or indicated applicable values in the first slot of the next DRX ON duration. UE is not expects to be configured with O^MO_DRX2<bwp-SwitchingDelay, where bwp-SwitchingDelay is UE capability of BWP switching delay, when the physical layer signal/channel outside of DRX Active Time also triggers BWP switching.

In a seventh example, $T_{gap}^{AR}$ can be associated with a time gap/offset between the last monitoring occasion of the physical layer signal/channel for triggering the UE adaptation and the start of next DRX ON duration, denoted as O^MO_DRX2.

In a sub-example of the seventh example, $T_{gap}^{AR}=\max(Z, O\hat{}MO\_DRX2)$, where Z is the smallest feasible non-zero application delay. Z can be defined in the specification of the system operation, e.g. Z=1, or Z=2 or Z=1 for SCS=15 KHz/30 KHz, Z=2 for SCS=60 KHz, and Z=3 for SCS=120 KHz or Z is UE capability of BWP switching delay, i.e. bwp-SwitchingDelay.

In another sub-example of the seventh example, $T_{gap}^{AR}=O\hat{}MO\_DRX2$. UE can start applying the triggered UE adaptation or indicated applicable values in the first slot of the next DRX ON duration. UE is not expects to be configured with O^MO_DRX2<bwp-SwitchingDelay, where bwp-SwitchingDelay is UE capability of BWP switching delay, when the physical layer signal/channel outside of DRX Active Time also triggers BWP switching.

In an eighth example, when a UE adaptation is triggered by a physical layer signal/channel outside of DRX Active Time, $T_{gap}^{AR}$ can be the time gap between the time when the UE receives an adaptation request or indication through a signal/channel at physical layer and the Nth slot within the Active Time of next associated DRX cycle. In this case, the UE is not expected to apply the triggered UE adaptation or indicated value(s) before the Nth slot within the Active Time of next associated DRX cycle. N can be either provided through higher layer signaling or defined in the specification of the system operation, e.g. N=1.

In a ninth example, when a UE adaptation is triggered by a physical layer signal/channel outside of DRX Active Time, $T_{gap}^{AR}$ can be the time gap between the time when the UE receives an adaptation request or indication through a signal/channel at physical layer and the first slot of PDCCH monitoring occasion within the Active Time of next associated DRX cycle. In this case, the UE is not expected to apply the triggered UE adaptation or indicated value(s) before the first slot of PDCCH monitoring within the Active Time of next associated DRX cycle.

For UE adaptation triggered by a physical layer signal/channel, a UE can have a different application delay depending on whether or not the UE detects the physical layer signal/channel outside or within the Active Time when a DRX cycle is configured. The Active Time is defined in REF 6.

Figure 22:
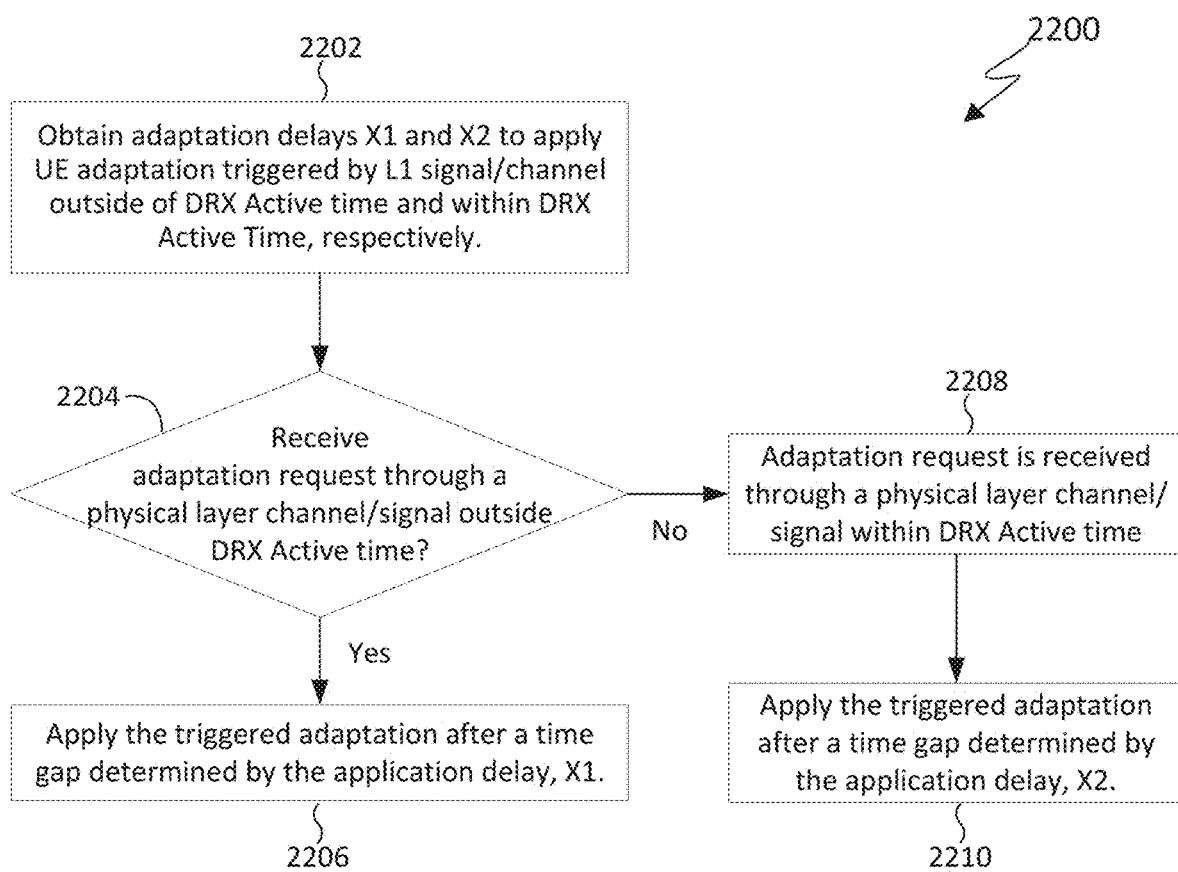
FIG. 22 illustrates a flowchart for applying an application delay by a UE when power saving signal/channel is monitored outside and inside of the DRX active time in accordance with various embodiments of this disclosure.

FIG. 22 illustrates a flowchart for applying an application delay by a UE when power saving signal/channel is monitored outside and inside of the DRX active time in accordance with various embodiments of this disclosure. Operations of flowchart 2200 can be implemented in a UE, such as UE 116 in FIG. 3.

Flowchart 2200 begins at operation 2202 by obtaining one or more application delays for applying UE adaptation triggered by a physical layer signal/channel within and outside Active Time of DRX cycle. In this non-limiting embodiment of FIG. 22, X1 is an adaptation delay outside of DRX Active time and X2 is an adaptation delay within DRX Active time.

In operation 2204 a determination is made as to whether the adaptation request is received through a physical layer channel/signal outside of the DRX Active time.

If the adaptation request is received through a physical layer channel/signal outside of the DRX Active time, e.g., a DCI format with CRC scrambled by a RNTI dedicated for power saving, (PS-RNTI), then flowchart 2200 proceeds to operation 2206 where the triggered adaptation is applied after a time gap determined by the application delay X1. In one example, the UE is not expected to apply the applicable value(s) of minimum K0 and/or K2, and/or aperiodic CSI-RS triggering offset indicated by the DCI format, before the first slot index of PDCCH monitoring occasion within the next associated DRX Active Time. In another example, the UE is not expected to operate in the target BWP indicated by the DCI format before the first slot index within the next associated DRX Active Time. In this other example, the time offset between the last PDCCH monitoring occasion of the physical layer signal/channel to trigger the BWP switching outside of DRX Active Time and the start of next associated DRX ON duration should be no less than the BWP switching delay.

Returning to operation 2204, if the determination is made that the adaptation request is not received through a physical layer channel/signal outside of the DRX Active time, then flowchart 2200 proceeds to operation 2208 where the adaptation request is received through a physical layer channel/signal within the DRX Active time, e.g., a scheduling DCI format with CRC scrambled by C-RNTI. In operation 2210, the triggered adaptation is applied after a time gap determined by the application delay X2. For example, the UE is not expected to apply the indicated applicable value(s) of minimum K0 and/or K2, and/or aperiodic CSI-RS triggering offset before the slot where UE transmits HARQ ACK information for the PDSCH scheduled by the DCI format providing the UE adaptation request.

UE adaptation on one or more adaptive parameter(s) based on a signal/channel at physical layer can be reset to default value(s). The default value(s) can be either pre-defined in the specification of the system operation or configured by higher layer signaling.

In one example, the value(s) for associated adaptive parameter(s) can be reset to the default value(s) every $T_{reset}^{AR}$ milliseconds(s)/slot(s).

In another example, a UE can receive a higher layer command, e.g., MAC CE, to indicate reset of the adaptive parameters to default value(s).

In yet another example, the value(s) for associated adaptive parameter(s) can be reset to default value(s) if UE current value(s) is/are not invalid. For example, after BWP switching, the current value(s), such as minimum K0/K2/aperiodic CSI-RS may be larger than all configured candidate value(s) in the new active DL/UL BWP, and thus is/are not valid. In this case, UE can apply/reset the associated adaptive parameter to default value(s). When the invalid value is minimum K0/K2, the default value can be the minimum value of the used time domain resource allocation (TDRA) table in the new active DL/UL BWP.

A UE can determine a value for $T_{reset}^{AR}$ through one of the following examples.

In a first example, $T_{reset}^{AR}$ is fixed and defined in the specification of the system operation, e.g. $T_{gap}^{AR}$=100 ms.

In a second example, $T_{reset}^{AR}$ can be provided to the UE through higher layer signaling.

In a third example, $T_{reset}^{AR}$ can be provided to UE through higher layer signaling in response to assistance information of the preferred value on transmitted from UE to gNB.

To avoid an error case resulting from a UE failing to detect a signal/channel that can lead to the UE and a serving gNB having a different understanding of PDCCH candidates or search spaces sets that the UE monitors, such as the UE failing to detect a DCI format in a PDCCH that included a field providing an adaptation for a number of PDCCH candidates or for search space sets for the UE to monitor PDCCH, one of the following two examples can be implemented.

In one example, activation or deactivation of PDCCH candidates or of search space sets can be achieved according to a descending search space set index starting from the largest activated search space set index. The index of the search space set, s, that is triggered to be adapted by a DCI format transmitted by gNB, can be carried in a field of the DCI format. For example, one field with size of c1 in a DCI format for triggering the adaptation on PDCCH monitoring can be used to carry the information of mod(s, 2^c1), where c1 is either defined in the specification of the system operation, such that c1=1, or provided to a UE through higher layer signaling.

In another example, the DCI format can include a field with c2 bits, and the c2 bits can carry a counter, x=0, 1, . . . , 2^c2-1, such that x=mod (x'+1, 2^c2), where x' is the counter in previous DCI format transmitted by gNB.

INTERPRETATION OF DCI FORMAT FOR TRIGGERING UE ADAPTATION

Another embodiment of this disclosure considers interpretation of a DCI format for triggering UE adaptation for power saving. A UE can receive a DCI format with CRC scrambled by a RNTI dedicated for power saving, for example, PS-RNTI. The DCI format is referred to herein as PS-DCI.

The PS-DCI can be transmitted by a gNB to one or more UEs, and each associated UE can be configured a location in PS-DCI for one or more fields associated to the UE. For example, the PS-DCI can consist of N>=1 blocks. Each of the blocks is dedicated to one UE. A UE can be provided with a block index, n_block, and size of the block, N^block_bits. The UE can derive the start bit of the block associated to the UE as n_block*N^block_bits.

One or more DCI fields can be bundled together to be associated with a power saving scheme/technology. The bundled DCI fields can be activated or deactivated by higher layer signaling.

PS-DCI can be monitored by a UE outside DRX Active Time or inside of DRX Active Time or in RRC_CONNECTED state without C-DRX configured. When PS-DCI is monitored by UE both outside of DRX Active Time and within a DRX Active Time in RRC_CONNECTED state, the fields of PS-DCI for triggering UE adaptation can have a different interpretation depending on whether or not the UE detects the DCI format outside DRX Active Time or within a DRX Active Time, or a location within a DRX Active Time.

When the UE detects a DCI format with fields for power saving before a DRX ON duration, a field of 1 bit can indicate whether or not the UE should wake up for next X>=1 DRX ON duration(s) or next X>=1 DRX cycles, this field is referred as first field in this disclosure. In the other word, the first field can indicate whether or not the UE skips PDCCH monitoring at a next X>=1 DRX ON duration(s)/cycle(s). X is a positive integer, and can be defined in the specification of the system operation, e.g. X=1 or can be provided to the UE through higher layer signaling, or can be the number of DRX cycles within current periodicity of the DCI format and before the next monitoring occasion in the next periodicity. For example, "1" of the first field can indicate wake up and do not skip PDCCH monitoring for the next X DRX ON duration(s)/cycle(s); "0" of the first field can indicate got to sleep and skip PDCCH monitoring for the next X DRX ON duration(s)/cycle(s). For another example, "0" of the first field can indicate wake-up and do not skip PDCCH monitoring for the next X DRX ON duration(s)/cycle(s); "1" of the first field can indicate got-to-sleep and skip PDCCH monitoring for the next X DRX ON duration(s)/cycle(s). The remaining fields of a DCI format for triggering UE adaptation can be interpreted based on the result of the first field according to the following rules.

Rule 1: When the UE is indicated to not wake up or skip PDCCH monitoring for next X DRX ON duration(s), another field of one or more bit(s), denoted as second field in this disclosure can be any of the following examples.

In a first example of Rule 1, the second field can indicate whether the UE wakes up for a number of next N1*Y DRX ON duration(s)/cycle(s) after the next X DRX ON duration(s)/cycle(s). In this case, the second field can consists of N1 binary bits wherein each bit indicate whether or not a UE should wake up for the ith set of Y consecutive DRX ON duration(s)/cycle(s) after the next X DRX ON duration(s)/cycle(s), i=0, . . . , N1−1. N1 can be either predefined in the specification, e.g. N1=1, or provided to the UE through higher layer signaling. Y>=N1, can be either predefined in the specification of the system operation, e.g. Y=1, or provided to the UE through higher layer signaling.

In a second example of Rule 1, the second field of 1 bit can indicate whether or not the UE needs to monitor PDCCH in CSS sets in next X ON duration(s) or DRX cycle(s). The associated PDCCH can be such as DCI format with CRC scrambled by P-RNTI or DCI format with CRC scrambled by SI-RNTI.

In a third example of Rule 1, the second field can indicate additional sleep duration, where the UE skip the DRX ON duration(s) within the sleep duration. A list of non-zero applicable values for sleep duration can be provided to the UE either through higher layer signaling or predefined in the specification of system operation. The second field can indicate one of the candidate values for sleep duration. The sleep duration can be in the unit of one DRX ON duration or one DRX cycle.

In a fourth example of Rule 1, the second field can indicate the switching between 'dormancy-like' and 'non-dormancy-like' behavior on activated SCell(s) other than the SCell that UE monitors the PS-DCI. When UE is indicated to have 'dormancy-like' behavior for a SCell, the UE does not monitor PDCCH for at least USS sets in the SCell, or monitors PDCCH in a relative large monitoring periodicity for at least USS sets in the SCell.

Rule 2: When the UE is indicated to wake up or not to skip PDCCH monitoring for next X DRX ON duration, another field of one or more bit(s), denoted as second field in this disclosure can be any of the following examples.

In a first example of Rule 2, the second field of N1' bits can indicate the active DL BWP that the UE assumes for next X DRX ON duration. N1' can be either predefined in the specification of the system operation, e.g. N1'=1, or provided to the UE through higher layer signaling. N1' can be ceil(log 2(N^DL_BWPs)), where N^DL_BWPs is the number of the configured DL BWP.

In a second example of Rule 2, the second field of N2' bits can indicate minimum K0/K2, wherein K0/K2 indicate the slot offset between DCI and its scheduled PDSCH/PUSCH. N2' can be either predefined in the specification of the system operation, e.g. N2'=1, or provided to the UE through higher layer signaling.

In a third example of Rule 2, the second field can be CSI request, where the UE is indicated to report an aperiodic CSI. The second field can be 0, 1, 2, 3, 4, 5, or 6 bits determined by higher layer parameter reportTiggerSize in REF 7. The UE assumes same indication method and report method as NR Rel-15.

In a fourth example of Rule 2, the second field can indicate the switching between 'dormancy-like' and 'non-dormancy-like' behavior on activated SCell(s) other than the SCell that UE monitors the PS-DCI. When the UE is indicated to have 'dormancy-like' behavior for a SCell, the UE does not monitor PDCCH for at least USS sets in the SCell, or monitors PDCCH in a relative large monitoring periodicity for at least USS sets in the SCell. The activated SCells other than the carrier where the UE monitors the PS-DCI can be divided into N3' groups. The second field can be N3' bits, and the jth (1=<j<=N3') bit indicate whether or not UE should operate in 'dormancy-like' behavior in the SCell(s) associated with the jth group.

In a fifth example of Rule 2, the second field indicates minimum scheduling offset, wherein any scheduling offset between the scheduling DCI format and the scheduled data transmission or reception is larger than the minimum scheduling offset.

In a sixth example of Rule 2, the second field indicates the maximum MIMO layer for PDSCH transmission or PUSCH reception that applies to any of the serving cells.

In a seventh example of Rule 2, the second field indicates the maximum TX antenna ports or RX antenna ports for UL data transmission or DL data reception, respectively.

In an eighth example of Rule 2, the second field indicates the PDCCH monitoring periodicity for at least USS sets in any of the serving cells.

In a ninth example of Rule 2, the second field indicates the minimum PDCCH monitoring periodicity for at least USS sets in any of the serving cells.

In a tenth example of Rule 2, the second field can be a joint adaptation indicator to trigger adaptation on multiple power consumptions aspects. In this case, a UE can be provided with an adaptation table to address adaptation on RRC parameters that are not configured per BWP but are essential to define different power consumption levels or power saving states. The joint adaptation indicator is the row index of the adaptation table, which indicate an adaptation on associated adaptive parameters. Table 4 shows an example an adaptation table with adaptation signaling on minimum K0/K2, maximum MIMO layers/ports, and active CC group. The configured active cells can be grouped by gNB, and the cell group index can be included in the adaptation table.

TABLE 4

| Joint adaptation indicator | Mini K0/K2 | Maximum MIMO layers/ports | Active CC group Index | Notes |
| --- | --- | --- | --- | --- |
| 0 | 4 | 1 | 1 | Very high power saving state/level |
| 1 | 2 | 2 | 2 | High power saving state/level |
| 2 | 1 | 3 | 3 | medium power saving state/level |
| 3 | 0 | 4 | 4 | low power saving state |

Figure 23:
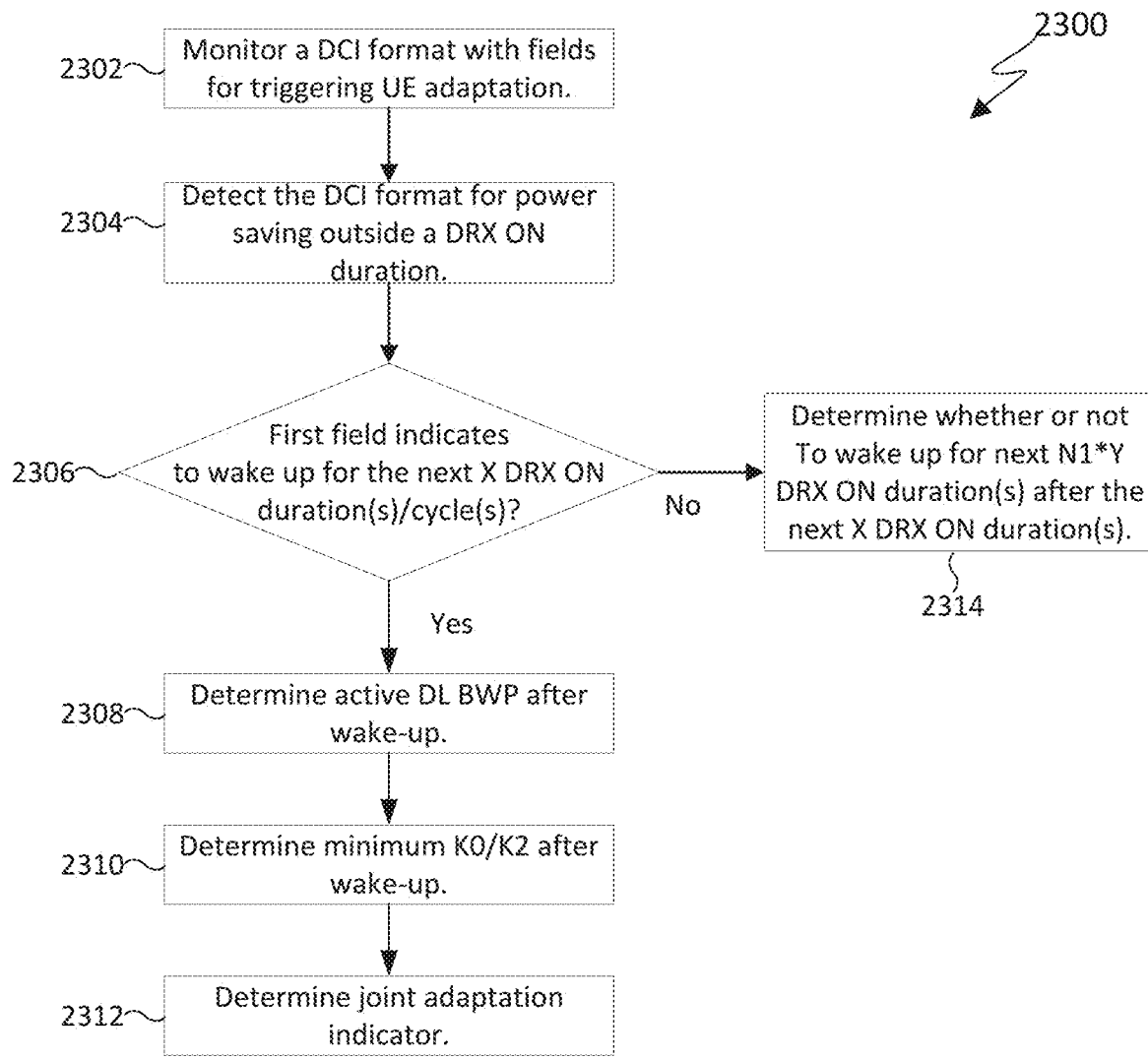
FIG. 23 illustrates a flowchart for interpretation of a PS-DCI detected outside of the DRX active time by a UE in accordance with various embodiments of this disclosure.

FIG. 23 illustrates a flowchart for interpretation of a PS-DCI detected outside of the DRX active time by a UE in accordance with various embodiments of this disclosure. Operations of flowchart 2300 can be implemented in a UE, such as UE 116 in FIG. 3.

Flowchart 2300 begins at operation 2302 by monitoring a DCI format with fields for triggering UE adaptation. In one embodiment, the UE adaptation can be for power savings. In operation 2304, a DCI format for power saving is detected outside of a DRX ON duration. The DCI format can be detected with a successful CRC check. A determination is made in operation 2306 as to whether a first field indicates to wake up for the next X DRX ON duration(s)/cycle(s). In one embodiment, the first field can include a binary bit that triggers the UE adaptation for power savings.

If the determination made in operation 2306 indicates that a UE should wake up for the next X DRX ON duration(s)/cycle(s), then flowchart 2300 proceeds to operation 2308 where an active DL BWP is determined after wake-up. In operation 2310, a minimum K0/K2 is determined after wakeup, and in operation 2312, a joint adaptation indicator is determined. The active DL BWP, the minimum K0/K2, and the joint adaptation indicator can be determined based on binary bits included in the same field, e.g., a second field. Alternatively, the binary bits can be in different fields in the detected DCI formats.

Returning to operation 2306, when the first field indicates the UE not to wake up for the next X DRX ON duration(s)/cycle(s), i.e., to skip PDCCH monitoring or go to sleep for next X DRX ON duration(s), then flowchart 2300 proceeds to operation 2314 where the UE determines whether or not to wake up for the next N1*Y DRX ON duration(s)/cycle(s) after the next X DRX ON duration(s). The determination can be made based on the binary bits in same field as the one that includes the active DL BWP, the minimum K0/K2, and the joint adaptation indicator, i.e., in the second field. Alternatively, the binary bits can be in a different field.

When the UE detects a DCI format with fields for triggering UE adaptation at the beginning of a DRX ON duration period or within the first K slots/milliseconds of the DRX on duration, a field or first field of 1 bit can indicate whether or not the UE go to sleep or skips PDCCH monitoring for the remaining Active Time of current DRX cycle. In one example, "1" of the first field can indicate go-to-sleep and skip PDCCH monitoring for the remaining Active Time of current DRX cycle; "0" of the first field can indicate continue PDCCH monitoring and do not go to sleep for the remaining Active Time of current DRX cycle. In another example, "0" of the first field can indicate go-to-sleep and skip PDCCH monitoring for the remaining Active Time of current DRX cycle; "1" of the first field can indicate continue PDCCH monitoring and do not go to sleep for the remaining Active Time of current DRX cycle. K slots/milliseconds can be either defined in the specification of the system operation, for example, K=1, or provided to the UE through higher layer signaling. The remaining fields of the DCI format for triggering UE adaptation which is detected at the beginning of a DRX ON duration period or within the first K slots/milliseconds of the DRX on duration can be interpreted based on the result of the first field according to the following rules.

Rule 1. When the UE goes to sleep or skips PDCCH monitoring for the remaining Active Time of current DRX cycle, another field or a second field of N1 bit(s) can indicate whether the UE skips PDCCH monitoring for a number of next N1*Y DRX ON durations after the Active Time of current DRX cycle. The field can consists of N1 binary bit, and each of the N1 bit indicates whether or not the UE can skip PDCCH monitoring for the ith set, i=0, 1, . . . , N1−1, of Y consecutive DRX ON duration(s)/cycle(s). Any of N1/Y can be either predefined in the specification of the system operation, e.g. N1=1/Y=1, or provided to the UE through higher layer signaling.

Rule 2. When the UE does not go to sleep or skip PDCCH monitoring for the remaining Active Time of current DRX cycle, another field or a second field of N1' bits after the first field can indicate the active DL BWP. N1' can be either predefined in the specification of the system operation, e.g. N1'=1, or provided to the UE through higher layer signaling. When the UE does not go to sleep or skip PDCCH monitoring for the remaining Active Time of current DRX cycle, yet another field or a third field of N2' bits after the first or second field can indicate minimum K0/K2 for cross-slot scheduling, wherein K0/K2 indicate the slot offset between DCI and its scheduled PDSCH/PUSCH. N2' can be either predefined in the specification of the system operation, e.g. N2'=1, or provided to the UE through higher layer signaling. When the UE does not go to sleep or skip PDCCH monitoring for the remaining Active Time of current DRX cycle, yet another field after the first field can be a joint adaptation indicator to trigger adaptation on multiple power consumptions aspects. In this case, a UE can be provided with an adaptation table to address adaptation on RRC parameters that are not configured per BWP but are essential to define different power consumption levels or power saving states.

Figure 24:
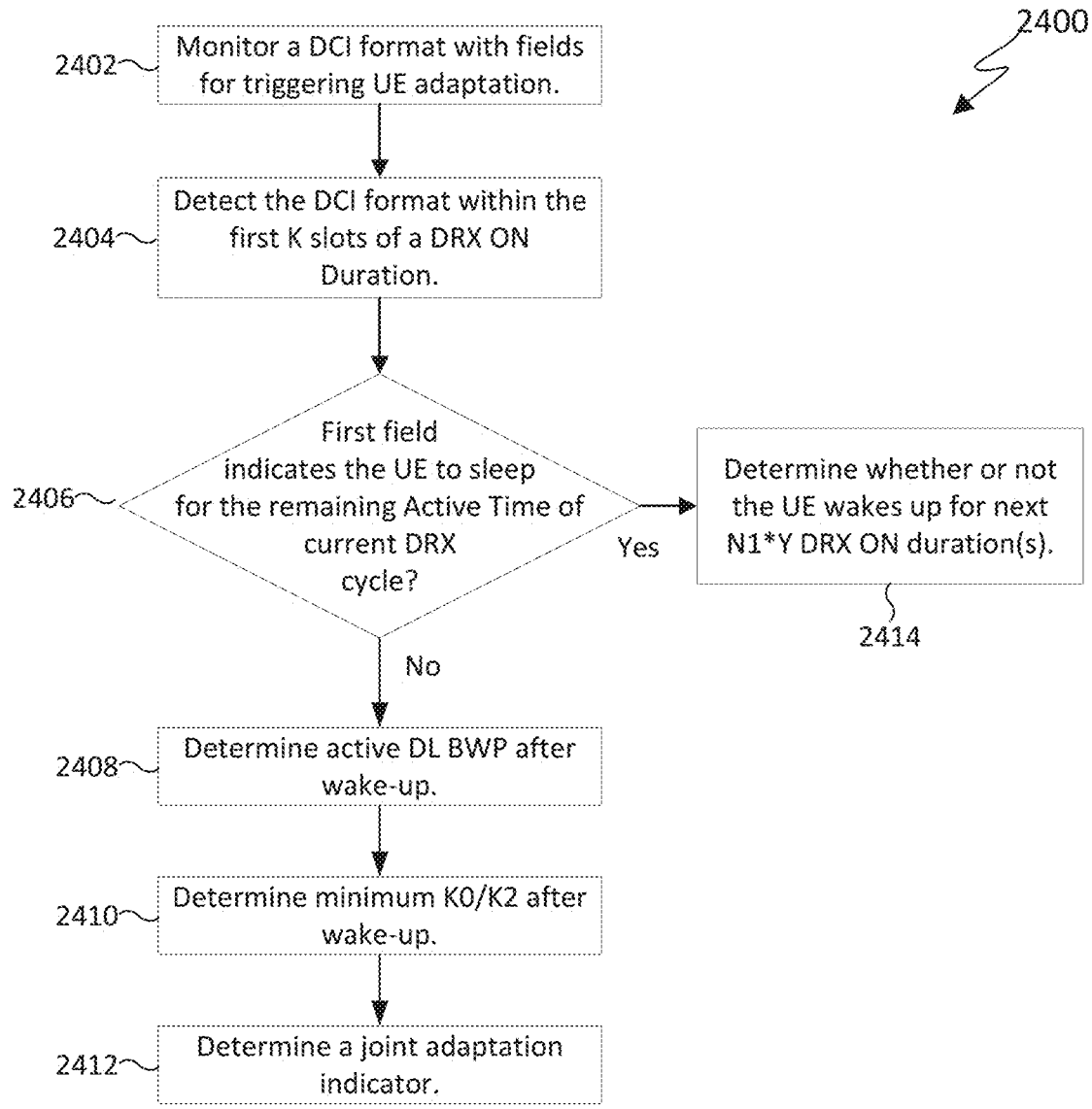
FIG. 24 illustrates a flowchart for detecting a DCI format by a UE at the beginning of a DRX ON duration for triggering UE adaptation in accordance with various embodiments of this disclosure.

FIG. 24 illustrates a flowchart for detecting a DCI format by a UE at the beginning of a DRX ON duration for triggering UE adaptation in accordance with various embodiments of this disclosure. Operations of flowchart 2400 can be implemented in a UE, such as UE 116 in FIG. 3.

Flowchart 2400 begins at operation 2402 by monitoring a DCI format with fields for triggering UE adaptation. In operation 2404, the DCI format is detected within the first K slots of a DRX ON duration. In operation 2406, a determination is made whether to go to sleep for the remaining Active Time of current DRX cycle. In one embodiment, the determination is made based on a binary bit in the first field for triggering UE adaptation.

If the first field indicates that a UE should not go to sleep for the remaining Active Time of current DRX cycle, i.e., continue PDCCH monitoring, then flowchart 2400 proceeds from operation 2406 to operation 2408 where the active DL BWP is determined after wake-up. In operation 2410, a minimum K0/K2 is determined after wake-up, and in operation 2412, a joint adaptation indicator is determined. The active DL BWP, minimum K0/K2, and the joint adaptation indicator can be determined based on an information bit in the same field, i.e., a second field, or based on information bits in different fields.

Returning to operation 2406, if the determination is made that the first field indicates that the UE should go to sleep for the remaining Active Time of the current DRX cycle, i.e., skip PDCCH monitoring, then flowchart 2400 proceeds from operation 2406 to operation 2414 where a determination is made whether to wake up for the next N1*Y DRX ON duration(s) after the Active Time of current DRX cycle. In one embodiment, this determination can be made based on the information bits in another field/second field.

When a UE detects a DCI format with fields for triggering UE adaptation during a DRX Active Time or after the first K slots/milliseconds of a DRX ON duration or when a DRX is not configured, the fields in the DCI format can be interpreted as indicating UE adaptation without association from DRX operation. K can be either defined in the specification of the system operation, for example, K=1, or provided to the UE by higher layer. The content of DCI format can be any of the following examples.

In a first example, a field or first field of 1 binary bit can indicate whether or not the UE skips PDCCH monitoring for X PDCCH monitoring occasions, periodicities, milliseconds, and/or slots in respective search space sets that can be adapted by the DCI format. X can be either predefined in the specification of the system operation, e.g. X=10, or can be provided to the UE through higher layer signaling. For example, "1" of the first field can indicate UE skips PDCCH monitoring for X PDCCH monitoring occasions, periodicities, milliseconds, and/or slots; "0" of the first field can indicate UE does not skip PDCCH monitoring for X PDCCH monitoring occasions, periodicities, milliseconds, and/or slots. For another example, "0" of the first field can indicate UE skips PDCCH monitoring for X PDCCH monitoring occasions, periodicities, milliseconds, and/or slots; "1" of the first field can indicate UE does not skip PDCCH monitoring for X PDCCH monitoring occasions, periodicities, milliseconds, and/or slots. The remaining fields of the DCI format for triggering UE adaptation can be interpreted based on the result of the first field according to the following rules.

Rule 1. When the UE is triggered to skip PDCCH monitoring for X PDCCH monitoring occasions, periodicities, milliseconds, and/or slots, another field or a second field of N1 bit(s) can indicate whether the UE skips PDCCH monitoring for additional time period after the X PDCCH monitoring occasions, periodicities, and/or slots. For example, the second field can be N1 bits and indicates whether or not the UE can skip PDCCH monitoring for a number of next N1*Y PDCCH monitoring occasions and/or periodicities after the X PDCCH monitoring occasions, periodicities, and/or slots. In this case, each of the N1 bits can indicate whether or not the UE can skip PDCCH monitoring for the ith (i=0, 1, . . . , N1–1) set of Y consecutive PDCCH monitoring periodicities/occasions. Any of N1/Y can be either predefined in the specification of the system operation, e.g. N1=1/Y=1, or provided to the UE through higher layer signaling. For another example, the second field can be N1 bits, and can indicate one of 2^N1 preconfigured time periods that the UE can skip PDCCH monitoring in the respective search space set after.

Rule 2. When the UE is triggered to not go to sleep or continue PDCCH monitoring for X PDCCH monitoring occasions/periodicities, another field or a second field of N1' bits after the first field can indicate adaptation on PDCCH monitoring periodicity. N1' can be either predefined in the specification of the system operation, e.g. N1'=1, or provided to the UE through higher layer signaling. When the UE does not go to sleep or skip PDCCH monitoring for the remaining Active Time of current DRX cycle, yet another field or a third field of N2' bits after the first or second field can indicate minimum K0/K2 for cross-slot scheduling, wherein K0/K2 indicate the slot offset between DCI and its scheduled PDSCH/PUSCH. N2' can be either predefined in the specification of the system operation, e.g. N2'=1, or provided to the UE through higher layer signaling. When the UE does not go to sleep or skip PDCCH monitoring for the remaining Active Time of current DRX cycle, yet another field or a third field of N3' bits after the first or second field can indicate adaptation on PDCCH candidates per CCE AL for respective search space sets. The respective search space sets can be either defined in the specification of system operation or provided to the UE through higher layer signaling. N3' can be either predefined in the specification of the system operation, e.g. N3'=1, or provided to the UE through higher layer signaling.

In a second example, a field of N1>=1 bits can indicate one of 2^N1 joint candidate adaptations associated with multiple adaptive parameters related to PDCCH monitoring in respective search space sets that can be adapted by the DCI format. The 2^N1 candidate adaptations can be either predefined in the specification of the system operation, for example, N1=2, Table 5, or provided to the UE through higher layer signaling. A related adaptive parameter can be minimum PDCCH monitoring periodicity for respective search space sets. In this case, for a respective search space s with a PDCCH monitoring periodicity less than X, UE will assume the PDCCH monitoring periodicity is adapted to X when the UE receives the DCI format indicating the minimum PDCCH monitoring periodicity of X. Another related adaptive parameter can be maximum number of PDCCH candidates per CCE AL in respective search space sets. In this case, for a respective search space s with PDCCH candidates per CCE AL that is larger than Y, UE will assume the PDCCH candidates per CCE AL is adapted to Y when the UE receives the DCI format indicating the maximum PDDCH candidates of Y.

TABLE 5

| DCI field | Minimum PDCCH monitoring periodicity, /slot | Maximum PDCCH candidates per AL |
| --- | --- | --- |
| 00 | T = 1 | 16 |
| 01 | T = 2 | 8 |
| 10 | T = 3 | 4 |
| 11 | T = 4 | 2 |

In a third example, a field can indicate a minimum scheduling delay offset, i.e. minimum applicable value of K0 or K2.

In a fourth example, a field can indicate a minimum processing timeline offset. The field can be c1 bit to indicate 2^c1 preconfigured a list of candidate values. The minimum processing time offset can indicate any of the following:
  minimum applicable value of K0;
  minimum applicable value of K2;
  minimum applicable value of aperiodic CSI-RS triggering offset;
  minimum applicable value of SRS slot offset; and/or
  minimum applicable value of K1.

In a fifth example, the DCI format can include any of the following fields to trigger adaptation on PDCCH monitoring associated with a search space set s in CORESET p:
  a field with c1 bit to indicate the associated search space set index, s, for adaptation. For example, mod(s, 2^c1) is carried in the DCI, where c1 can either be defined in the specification of the system operation, for example, c1=1, or provided to a UE by higher layer signaling;
  a field with 1 bit to indicate deactivation or activation of search space set s;
  a field with 1 bit to indicate deactivation or activation of CORESET p, associated with search space set s;
  a field with 1 bit to indicate scaling of the monitoring periodicity of search space set s, e.g., "0" indicate reduce the monitoring periodicity of search space set by half, "1" indicate double the monitoring periodicity of search space set s;
  a field with 1 bit to indicate scaling on the monitoring duration of search space set s, e.g., "0" indicate reduce the monitoring duration of search space set by half, "1" indicate double the monitoring duration of search space set s;
  a field with c2 bits to indicate the activated or deactivated CCE ALs, where c2 can either be defined in the specification of the system operation, for example, c2=2, or provided to a UE by higher layer signaling; and/or
  a field with c3 bits to indicate the activated or deactivated PDCCH candidates per CCE AL, where c3 can either be defined in the specification of the system operation, for example, c3=2, or provided to a UE by higher layer signaling.

In a sixth example, the DCI format can include any of the following fields to trigger adaptation on PDCCH monitoring in one or more respective search space set(s):
- a field with c4 bits to indicate the number of cells to monitoring PDCCH candidates, where c4 can either be defined in the specification of the system operation, for example, c4=2, or provided to a UE by higher layer signaling;
- a field with c5 bits to indicate the scaling on maximum number of monitored PDCCH candidates per slot and per serving cell, where c5 can either be defined in the specification of the system operation, for example, c5=2, or provided to a UE by higher layer signaling;
- a field with c6 bits to indicate the active DL BWP, where c6 can either be defined in the specification of the system operation, for example, c6=2, or provided to a UE by higher layer signaling;
- a field with 1 bit to indicate whether or not UE skips monitoring PDCCH for N slots/milliseconds, where N can be defined in the specification of the system operation, such that N=1, or provided to a UE by higher layer signaling; and/or
- a field with c7 bits to indicate a sleep duration, T_sleep, where UE do not monitor PDCCH in any respective search space sets within the indicated sleep duration. For example, c7 bit can indicate $2^{c7}$ candidate sleep durations, where c7 and candidate sleep durations can be either defined in the specification of the system operation or provided to a UE by higher layer signaling.

Figure 25:
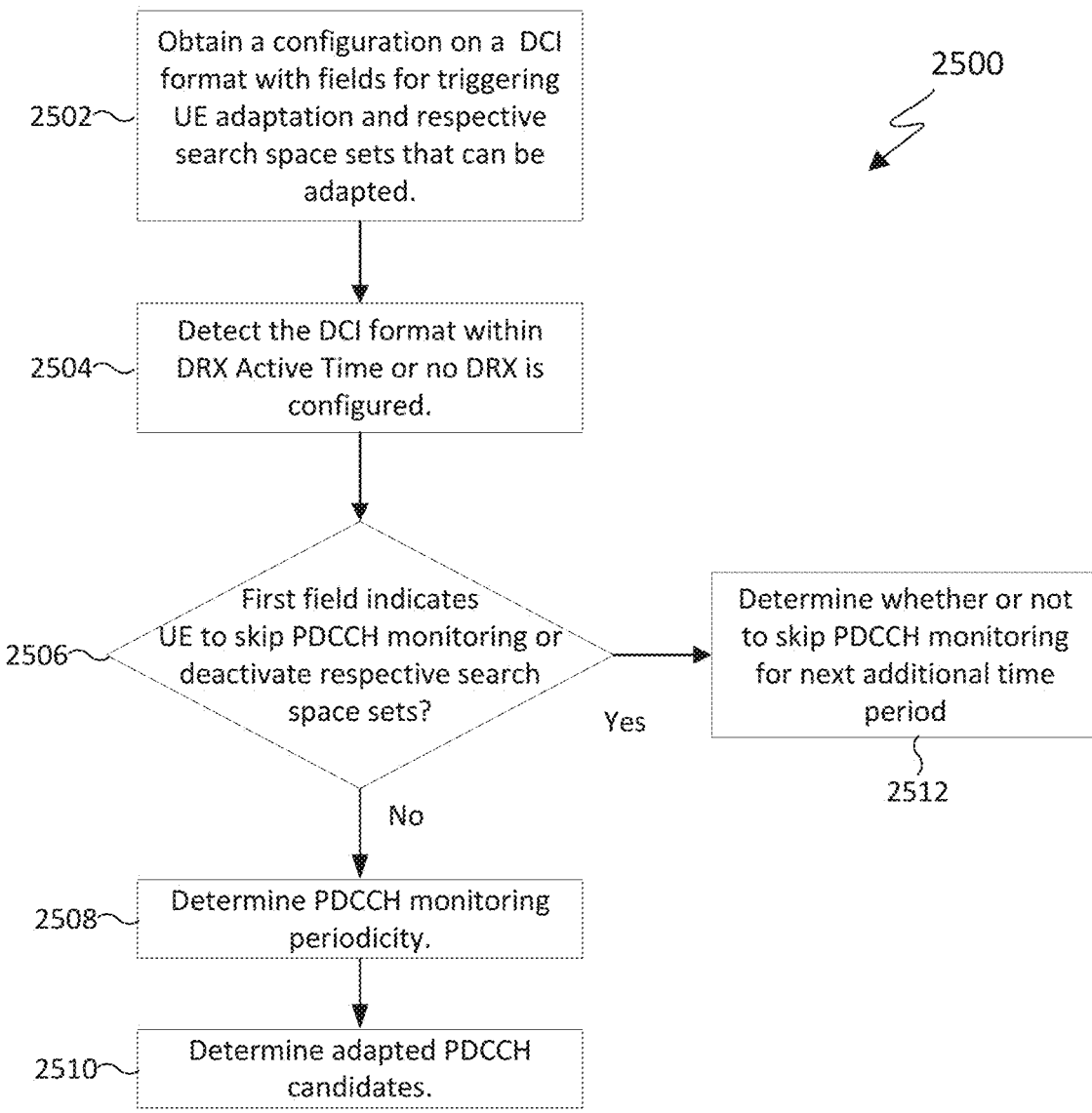
FIG. 25 illustrates a flowchart for detecting a DCI format by a UE within the DRX Active Time for power saving in accordance with various embodiments of this disclosure.

FIG. 25 illustrates a flowchart for detecting a DCI format by a UE within the DRX Active Time for power saving in accordance with various embodiments of this disclosure. Operations of flowchart 2500 can be implemented in a UE, such as UE 116 in FIG. 3.

Flowchart 2500 begins at operation 2502 by obtaining a configuration on a DCI format with fields for triggering UE adaptation and respective search space sets that can be adapted. In operation 2504, a DCI format within the DRX Active Time is detected or no DRX is configured. In one embodiment, the DCI format is detected with a successful CRC check within the DRX Active Time. In operation 2506 a determination is made as to whether a first field indicates to skip PDCCH monitoring or deactivate respective search space sets. For example, the determination can be for skipping PDCCH monitoring in the respective search space set(s) for a time period, such as X PDCCH monitoring occasions, periodicities, slots, and/or milliseconds.

If the first field associated with adaptation signaling indicates not to skip PDCCH monitoring, then flowchart 2500 proceeds from operation 2506 to operation 2508 where the PDCCH monitoring periodicity is determined, and then to operation 2510 where the adapted PDCCH candidates per CCE AL is determined for the respective search space sets that are not deactivated.

If the first field associated with adaptation signaling indicates to skip PDCCH monitoring, then flowchart 2500 proceeds to operation 2512 to determine whether PDCCH monitoring should be skipped for an additional time period, such as the next N1*Y PDCCH monitoring occasions/periodicities/slots/milliseconds after the deactivated time period indicated by the first field. The determination can be made based on information bits included in a second field, or another field.

DETERMINATION OF PDCCH MONITORING OCCASION FOR TRIGGERING UE ADAPTATION ASSOCIATED WITH DRX OPERATION

Another embodiment of this disclosure relates to determination of monitoring occasions of signal/channel at physical layer for triggering UE adaptation associated with DRX operation in RRC_CONNECTED state. A UE can receive a DCI format with CRC scrambled by a RNTI dedicated for power saving, for example, PS-RNTI. The DCI format is referred to herein as PS-DCI.

A UE can be configured with a PDCCH based signal/channel in a search space set s for triggering UE adaptation with association with DRX operation in RRC_CONNECTED state, the UE can determine a PDCCH monitoring occasion on an active DL BWP from the PDCCH monitoring periodicity, the PDCCH monitoring offset, and the PDCCH monitoring pattern within a slot. The UE determines that a PDCCH monitoring occasion(s) for the signal/channel in the respective search space set s exists in a slot with number $n_{s,f}^{\mu}$REF1 in a frame with number $n_f$ if $(n_f N_{slot}^{frame,\mu}+n_{s,f}^{\mu}-o_s) \mod k_s=0$. The value X is applicable as candidate value for PDCCH monitoring periodicity of search space set s, i.e. monitoringSlotPeriodicityAndOffset in REF7, only if X is multiples of configured DRX cycle in the unit of slots, T_DRX, such that MOD(X,T_DRX)=0. The value Y is applicable as candidate value for PDCCH monitoring offset of search space set s, only if $o_s<=$O_DRX, where O_DRX is the configured delay/offset of a DRX cycle. The signal/channel can be applied to long DRX cycle only. In this case, when only short DRX cycle is configured, UE does not expect to monitor the signal/channel for triggering adaptation associated with DRX operation. When a UE is configured to monitor a DCI format for triggering UE adaptation associated with DRX operation in search space set s, with duration $T_s$, the UE monitors the DCI format in search space set s for $T_s$ consecutive slots, starting from slot $n_{s,f}^{\mu}$, and does not monitor the DCI format in search space set s for the next $k_s-T_s$ consecutive slots.

A UE can determine the number of PDCCH monitoring occasions for transmitting a PS-DCI to trigger UE adaptation associated with DRX operation per a PDCCH monitoring periodicity, N_MOs, according to the configured duration, $T_s$, and PDCCH monitoring pattern within a slot of associated search space set s, such that N_MOs=$T_s$*N^MOs_slot, where N^MOs_slot is the number of PDCCH monitoring occasions within a slot indicated by the configured PDCCH monitoring pattern, or the number of start OFDM symbol within a slot associated with search space set s.

The UE can expect only same content of a PS-DCI for triggering UE adaptation associated with DRX operation can be transmitted within a PDCCH periodicity. Regarding the number of repetitions, the number of repetitions of the DCI format can be transparent to the UE. In this case, the UE can skip PDCCH monitoring for the DCI format in the remaining monitoring occasions within a periodicity if the UE detects the DCI format from one of the N_MOs monitoring occasions. Alternatively, the UE can assume that the DCI format for triggering UE adaptation associated with DRX operation is repeated over the N_MOs monitoring occasions within a periodicity.

When the number of PDCCH monitoring occasions within a periodicity, N_MOs, is larger than one, a multi-beam operation can be supported to transmit the DCI format for triggering UE adaptation associated with DRX operation. In multi-beam operation, a UE can determine the QCL assumptions for the N_MOs>1 PDCCH monitoring occasions through one of the following examples.

In a first example, the UE can assume that QCL assumption of PDCCH for transmitting the DCI format changes every C1 monitoring occasions within a PDCCH periodicity. In this case, the maximum of [N_MOs/C1] different QCL assumptions can be transparent to the UE. Alternatively, the UE can be provided with a list of [N_MOs/C1] TCI states through higher layer signaling to indicate the QCL assumption of the [N_MOs/C1] subset of PDCCH monitoring occasions wherein the ith (i=0, 1, . . . , [N_MOs/C1]−1) TCI state from the list indicate the QCL assumption for the ith (i=0, 1, . . . , [N_MOs/C1]−1) subset with maximum of C1 monitoring occasions. C1 is a positive integer, and can be either defined in the specification, e.g. C1=1, or be provided to the UE through higher layer signaling.

In a second example, the UE can assume that QCL assumption of PDCCH for transmitting the DCI format cycles every C1 monitoring occasions within a PDCCH periodicity. In this case, a UE can be provided with a list of [N_MOs/C1] TCI states by higher layer signaling, and a UE can be provided with the index of the first TCI state, I_0, by higher layer signaling. The UE can determines the QCL assumption for the ith (i=0, 1, . . . , [N_MOs/C1]−1) subset of maximum of C1 monitoring occasions based on I_0, such that the (I_0+i)th TCI state from the list indicate the QCL assumption for the ith subset of maximum of C1 monitoring occasions. I_0 can be reconfigured by a MAC CE. C1 is a positive integer, and can be either defined in the specification, e.g. C1=1, or be provided to the UE through higher layer signaling.

In a third example, the UE can assume N_MOs equals to the number of actual transmitted SS/PBCH blocks determined according to ssb-PositionsInBurst in SIB1. The $i^{th}$ PDCCH monitoring occasion for the DCI format within a periodicity corresponds to the $i^{th}$ transmitted SS/PBCH block, and is QCLed with the $i^{th}$ transmitted SS/PBCH block. The QCL type between the $i^{th}$ transmitted SS/PBCH block and the $i^{th}$ PDCCH monitoring occasion can be QCL-TypeA/QCL-TypeB/QCL-TypeC/QCL-TypeD, and can be provided to the UE through higher layer signaling.

Figure 26:
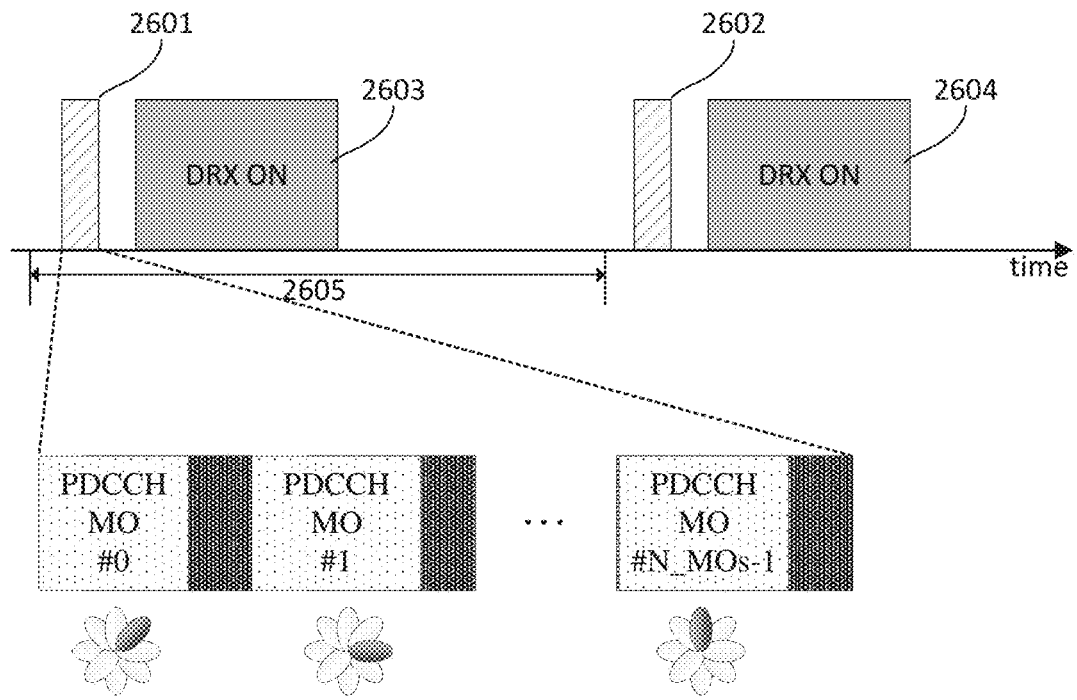
FIG. 26 illustrates a multibeam transmission on the DCI format for triggering UE adaptation associated with DRX operation through N_MOs>1 PDCCH monitoring occasions per PDCCH monitoring periodicity in accordance with various embodiments of this disclosure.

FIG. 26 illustrates a schematic of multibeam transmission on the DCI format for triggering UE adaptation associated with DRX operation through N_MOs>1 PDCCH monitoring occasions per PDCCH monitoring periodicity in accordance with various embodiments of this disclosure. A UE, such as UE 116 in FIG. 3, can be configured with a search space set for transmitting DCI format to trigger UE adaptation associated with DRX operation.

The UE can be configured with N_MOs>1 PDCCH monitoring occasions 2601 and 2602 within a PDCCH monitoring periodicity 2605. The UE expects that a DCI format for triggering UE adaptation associated with DRX operation is repeated over the N_MOs>=1 PDCCH monitoring occasions within a PDCCH monitoring periodicity. The QCL assumptions for the N_MOs>1 PDCCH monitoring occasions can be different, for example, with beam direction directions or different spatial parameters.

Figure 27:
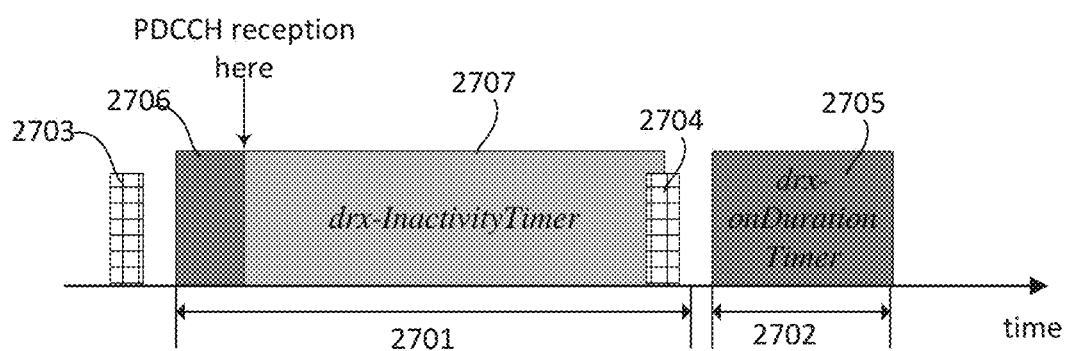
FIG. 27 illustrates a PDCCH monitoring occasion outside of DRX ON duration that is overlapped by the dynamic Active Time of the previous DRX cycle in accordance with various embodiments of this disclosure.
Figure 28:
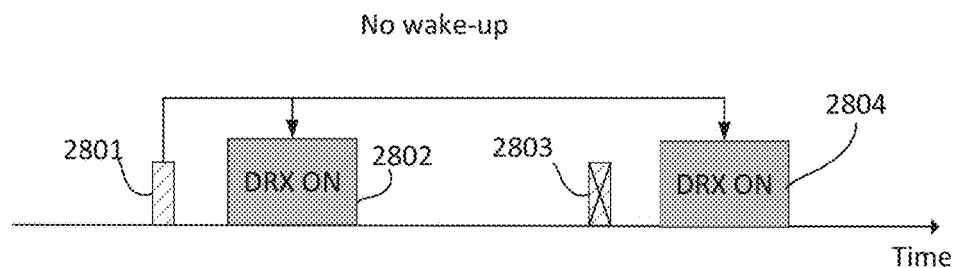
FIG. 28 illustrates a UE skipping the monitoring occasion of PS-DCI in accordance with various embodiments of this disclosure.

For a PDCCH monitoring occasion outside of DRX ON duration for transmitting a PS-DCI to trigger UE adaptation associated with DRX operation, a UE skips monitoring the PDCCH occasion when the monitoring occasion is overlapped with the Active Time of previous DRX cycle as illustrated in FIG. 27 that follows. In another approach, a UE skips monitoring the PDCCH occasion when the monitoring occasion is overlapped with the Active Time of previous DRX cycle as illustrated in FIG. 28 and with any of the following conditions.

Condition 1: the Active Time of previous DRX cycle is overlapped with the next DRX cycle the PS-DCI is associated with.

Condition 2: the total number of DCI sizes if UE monitors/decodes the PS-DCI exceeds the DCI size budget.

Condition 3: the offset between the monitoring occasion and the next DRX ON duration the PS-DCI is associated with is less than a threshold, K_threshold. K_threshold can be either defined in the specification of the system operation, e.g. K_threshold=1 slot, or provided to the UE through higher layer signaling.

Condition 4: the number of PDCCH decoding if the UE monitors/decodes the PS-DCI exceeds the PDCCH blind decoding capacity.

A gNB can transmit dummy bits in the fields associated with the UE when the UE is not supposed to monitor the PS-DCI. In one example, the dummy bits can be all zeros or all ones.

FIG. 27 illustrates a schematic diagram for a PDCCH monitoring occasion outside of DRX ON duration that is overlapped by the dynamic Active Time of the previous DRX cycle in accordance with various embodiments of this disclosure. The monitoring can be performed by a UE, such as UE 116 in FIG. 3.

The UE can determine a PDCCH monitoring occasion 2703 and 2704 outside of DRX ON duration 2705 and 2706. When an Active Time of a DRX cycle is extended, for example drx-InactivityTimer 2707 is restarted, and the extended Active Time of a DRX cycle overlaps with PDCCH monitoring occasion 2704 associated with next DRX cycle, the UE can skip monitoring the overlapped PDCCH monitoring occasion 2704, and the UE assume no DCI format to trigger UE adaptation associated with DRX operation is transmitted.

For a PDCCH monitoring occasion outside of DRX ON duration for transmitting a PS-DCI to trigger UE adaptation associated with next one or more DRX cycle(s), a UE can skip monitoring the PDCCH monitoring occasion when the UE detects a DCI format in previous PDCCH monitoring occasion that indicates the UE to sleep or skip PDCCH monitoring for at least one of the associated DRX cycle(s).

FIG. 28 illustrates a schematic diagram of skipping the monitoring occasion of PS-DCI in accordance with various embodiments of this disclosure. Skipping of the monitoring occasion can be performed by a UE, such as UE 116 in FIG. 3.

A UE can be configured with monitoring occasion for PS-DCI 2801 and 2803 before DRX ON duration 2802 and 2804. The UE can be indicated to skip PDCCH monitoring at least in USS sets for more than one DRX ON duration. When the UE is indicated to skip DRX ON duration 2802 and 2804 by the PS-DCI in monitoring occasion 2801 the UE can skip monitoring occasion of PS-DCI 2803. A gNB can transmit dummy bits in the fields associated with the UE when the UE is not supposed to monitor the PS-DCI. In one example, the dummy bits can be all zeros or all ones.

For N_MOs>=1 PDCCH monitoring occasions outside DRX ON duration or Active Time for transmitting a PS-DCI to trigger UE adaptation associated with DRX operation, if there is partial overlap between SS/PBCH blocks and the N_MOs PDCCH monitoring occasions, the UE can start monitoring PDCCH in the first PDCCH monitoring occasion after the SS/PBCH blocks. The overlapped PDCCH occasions can be skipped but is still counted as PDCCH monitoring occasions when UE determines the index of the PDCCH monitoring occasions. Alternatively, when there is an overlap between SS/PBCH blocks and the N_MOs PDCCH monitoring occasions, the first occasion after the SS/PBCH blocks can be counted as the first PDCCH monitoring occasion, and UE monitors up to N_MOs consecutive PDCCH monitoring occasions before the start of a the first associated DRX ON duration.

DETERMINATION OF PDCCH MONITORING OCCASION FOR TRIGGERING UE ADAPTATION WITHOUT ASSOCIATION WITH DRX OPERATION

Another embodiment of this disclosure relates to the determination of monitoring occasion of signal/channel at physical layer for triggering UE adaptation without association with DRX operation in RRC_CONNECTED state. For example, the signal/channel can be a DCI format transmitted to UE through PDCCH.

A UE can be configured with a PDCCH based signal/channel in a search space set s for triggering UE adaptation without association with DRX operation in RRC_CONNECTED state, the UE can determine a PDCCH monitoring occasion on an active DL BWP from the PDCCH monitoring periodicity, the PDCCH monitoring offset, and the PDCCH monitoring pattern within a slot. The UE determines that a PDCCH monitoring occasion(s) for the signal/channel in the respective search space set s exists in a slot with number $n_{s,f}^\mu$REF1 in a frame with number $n_f$ if $(n_f \cdot N_{slot}^{frame,\mu} + n_{s,f}^\mu - o_s)$ mod $k_s = 0$. When the respective search space set s is configured with duration $T_s$, the UE monitors the DCI format in search space set s for $T_s$ consecutive slots, starting from slot $n_{s,f}^\mu$, and does not monitor the DCI format in search space set s for the next $k_s - T_s$ consecutive slots.

A UE can determine the number of PDCCH monitoring occasions for transmitting a DCI format to trigger UE adaptation per a PDCCH monitoring periodicity, N_MOs, according to the configured duration, $T_s$, and PDCCH monitoring pattern within a slot of associated search space set s, such that N_MOs=$T_s$*N^MOs_slot, where N^MOs_slot is the number of PDCCH monitoring occasions indicated by the configured PDCCH monitoring pattern within a slot, or the number of start OFDM symbol within a slot associated with search space set s. The UE can expect only same content of a DCI format for triggering UE adaptation can be transmitted within a PDCCH periodicity. Regarding the number of repetitions, the number of repetitions of the DCI format can be transparent to the UE. In this case, the UE can skip PDCCH monitoring for the DCI format in the remaining monitoring occasions within a periodicity if the UE detects the DCI format from one of the N_MOs monitoring occasions. Alternatively, the UE can assume that the DCI format for triggering UE adaptation is repeated over the N_MOs monitoring occasions within a periodicity.

Figure 29:
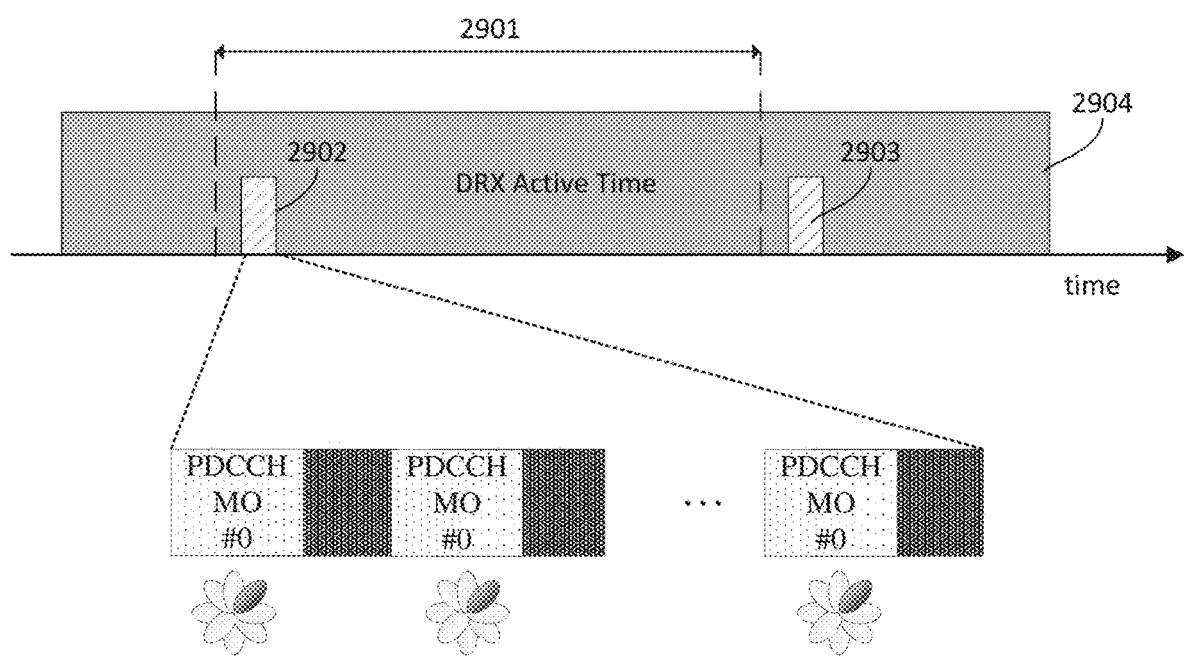
FIG. 29 illustrates repetitions on a DCI format for triggering UE adaptation within DRX Active Time in accordance with various embodiments of this disclosure.

FIG. 29 illustrates repetitions on a DCI format for triggering UE adaptation within DRX Active Time in accordance with various embodiments of this disclosure. A UE, such as UE 116 in FIG. 3, can be configured with a search space set s for transmitting DCI format to trigger UE adaptation without association with DRX operation.

The UE can be configured with N_MOs>=1 PDCCH monitoring occasions 2902 and 2903 within a PDCCH monitoring periodicity 2901. The UE can assume that the DCI format for triggering UE adaptation is repeated over the N_MOs>=1 PDCCH monitoring occasions. The QCL assumptions for the N_MOs>1 PDCCH monitoring occasions is indicated by the activated TCI state of the respective CORESET.

For a PDCCH monitoring occasion for transmitting the DCI format to trigger UE adaptation associated with next one or more PDCCH monitoring periodicity/occasion(s), a UE can skip monitoring the PDCCH occasion when the UE detects a DCI format in previous PDCCH monitoring occasion that triggers the UE to skip PDCCH monitoring for at least one of the associated PDCCH monitoring periodicity/occasion(s).

Figure 30:
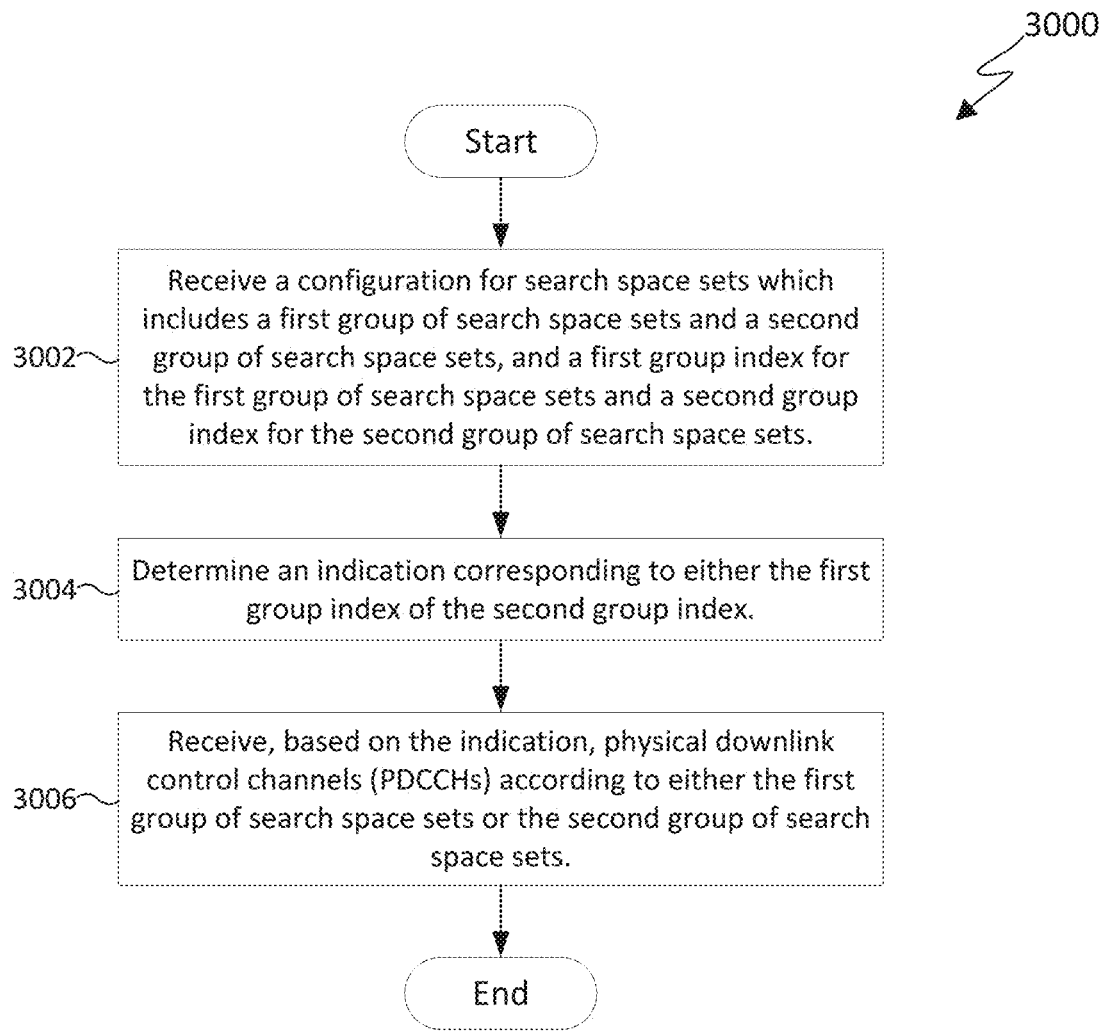
FIG. 30 illustrates a flowchart for determining search space sets for PDCCH monitoring in accordance with various embodiments of this disclosure.

FIG. 30 illustrates a flowchart of a process for determining search space sets for PDCCH monitoring in accordance with various embodiments of this disclosure. The operations of flowchart 3000 can be implemented in a UE, such as UE 116 in FIG. 3.

The process of flowchart 3000 begins at operation 3002 by receiving a configuration for search space sets which includes a first group index for a first group of search space sets and a second group index for a second group of search space sets.

In operation 3004, an indication corresponding to either the first group index or the second group index is determined.

In operation 3006, physical downlink control channels (PDCCHs) are received according to either the first group of search space sets or the second group of search space sets. The process terminates thereafter.

In some embodiments, the process also includes receiving a PDCCH according to a common search space. The PDCCH can includes a downlink control information (DCI) format. The process also includes determining the indication based on a value of a field of the DCI format. In some embodiments, the value of the field of the DCI format is the first group index, and the indication is only for the first group index.

In some embodiments, the process also includes receiving a downlink control information (DCI) format in a PDCCH reception according to the first group of search space sets; and determining, upon expiration of the time duration, the indication for only the second group index. The DCI format can include a field for a time duration.

In some embodiments, where the configuration further includes a time duration, the process also includes receiving the PDCCHs according to the first group of search space sets based on a previous indication for the first group index; and determining, upon expiration of the time duration, the indication for only the second group index.

In some embodiments, the indication becomes valid at a beginning of a first slot that is after a time period corresponding to a number of symbols.

Although this disclosure has been described with an exemplary embodiment, various changes and modifications may be suggested to one skilled in the art. For example, this disclosure includes several embodiments that can be used in conjunction or in combination with one another, or individually. It is intended that this disclosure encompass such changes and modifications as fall within the scope of the appended claims. None of the description in this application should be read as implying that any particular element, step, or function is an essential element that must be included in the claims scope. The scope of patented subject matter is defined by the claims.

What is claimed is:

1. A method for receiving physical downlink control channels (PDCCHs) by a user equipment (UE), the method comprising:
   receiving:
   a first physical downlink shared channel (PDSCH) that provides radio resource control (RRC) information indicating:
   a first group of search space sets and a second group of search space sets within a bandwidth part (BWP), and a first group index for the first group of search space sets and a second group index for the second group of search space sets, and
a first PDCCH in a first slot that provides a downlink control information (DCI) format, wherein:
the DCI format schedules a second PDSCH reception or a physical uplink shared channel (PUSCH) transmission, and
the DCI format includes a field with a first value indicating the first group index or the second group index;
determining receptions of the PDCCHs according to the first group of search space sets or the second group of search space sets based on the first value; and
receiving the PDCCHs.

2. The method of claim 1, wherein:
the first PDSCH further provides information indicating:
a third group of search space sets within the BWP, and
a third group index for the third group of search space sets;
the first value indicates the first group index, the second group index, or the third group index; and
determining the receptions of the PDCCHs further comprises determining the receptions of the PDCCHs according to the first group of search space sets, the second group of search space sets, or the third group of search space sets based on the first value.

3. The method of claim 1, wherein the first group of search space sets and the second group of search space sets exclude search space sets associated with PDCCH receptions that schedule PDSCH receptions that include any of:
a system information block (SIB),
a random access response (RAR), and
paging.

4. The method of claim 1, wherein:
the first group of search space sets is associated with PDCCH receptions in any control resource sets (CORESETs), and
the second group of search space sets is associated with PDCCH receptions in CORESETs that do not have a first index.

5. The method of claim 1, further comprising:
receiving information for a duration having a unit of one slot, wherein a second value of the field indicates the duration, and
skipping reception of PDCCHs according to the first group of search space sets and the second group of search space sets over the duration.

6. The method of claim 1, further comprising:
receiving:
information for a timer value having a unit of one slot, and
PDCCHs according to the first group of search space sets in a second slot that is after the first slot by a number of slots equal to the timer value, wherein:
the first value indicates the second group index, and
the UE does not receive PDCCHs that provide DCI formats with a cyclic redundancy check (CRC) scrambled by predetermined radio network temporary identifiers (RNTIs) over the number of slots.

7. The method of claim 1, wherein:
the reception of the first PDCCH is according to the first group of search space sets,
the first value indicates the second group index, and
the reception of the PDCCHs starts at an earliest slot that is after an end of the first PDCCH reception by a predetermined time.

8. A user equipment (UE) comprising:
a transceiver configured to receive:
a first physical downlink shared channel (PDSCH) that provides radio resource control (RRC) information indicating:
a first group of search space sets and a second group of search space sets within a bandwidth part (BWP), and
a first group index for the first group of search space sets and a second group index for the second group of search space sets, and
a first physical downlink control channel (PDCCH) in a first slot that provides a downlink control information (DCI) format, wherein:
the DCI format schedules a second PDSCH reception or a physical uplink shared channel (PUSCH) transmission, and
the DCI format includes a field with a first value indicating the first group index or the second group index; and
a processor operably coupled to the transceiver, the processor configured to determine receptions of PDCCHs according to the first group of search space sets or the second group of search space sets based on the first value,
wherein the transceiver is further configured to receive the PDCCHs.

9. The UE of claim 8, wherein:
the first PDSCH further provides information indicating:
a third group of search space sets within the BWP, and
a third group index for the third group of search space sets;
the first value indicates the first group index, the second group index, or the third group index; and
the processor is further configured to determine the receptions of the PDCCHs according to the first group of search space sets, the second group of search space sets, or the third group of search space sets based on the first value.

10. The UE of claim 8, wherein the first group of search space sets and the second group of search space sets exclude search space sets associated with PDCCH receptions that schedule PDSCH receptions that include any of:
a system information block (SIB),
a random access response (RAR), and
paging.

11. The UE of claim 8, wherein:
the first group of search space sets is associated with PDCCH receptions in any control resource sets (CORESETs), and
the second group of search space sets is associated with PDCCH receptions in CORESETs that do not have a first index.

12. The UE of claim 8, wherein the transceiver is further configured to:
receive information for a duration having a unit of one slot, wherein a second value of the field indicates the duration, and
skip reception of PDCCHs according to the first group of search space sets and the second group of search space sets over the duration.

13. The UE of claim 8, wherein:
the transceiver is further configured to receive:
  information for a timer value having a unit of one slot, and
  PDCCHs according to the first group of search space sets in a second slot that is after the first slot by a number of slots equal to the timer value,
the first value indicates the second group index, and
the transceiver does not receive PDCCHs that provide DCI formats with a cyclic redundancy check (CRC) scrambled by predetermined radio network temporary identifiers (RNTIs) over the number of slots.

14. The UE of claim 8, wherein:
the reception of the first PDCCH is according to the first group of search space sets,
the first value indicates the second group index, and
the reception of the PDCCHs starts at an earliest slot that is after an end of the first PDCCH reception by a predetermined time.

15. A base station comprising:
a transceiver configured to transmit:
  a first physical downlink shared channel (PDSCH) that provides radio resource control (RRC) information indicating:
    a first group of search space sets and a second group of search space sets within a bandwidth part (BWP), and
    a first group index for the first group of search space sets and a second group index for the second group of search space sets, and
  a first physical downlink control channel (PDCCH) in a first slot that provides a downlink control information (DCI) format, wherein:
    the DCI format schedules a second PDSCH transmission or a physical uplink shared channel (PUSCH) reception, and
    the DCI format includes a field with a first value indicating the first group index or the second group index; and
a processor operably coupled to the transceiver, the processor configured to determine transmissions of PDCCHs according to the first group of search space sets or the second group of search space sets based on the first value,
wherein the transceiver is further configured to transmit the PDCCHs.

16. The base station of claim 15, wherein:
the first PDSCH further provides information indicating:
  a third group of search space sets within the BWP, and
  a third group index for the third group of search space sets;
the first value indicates the first group index, the second group index, or the third group index; and
the processor is further configured to determine the transmissions of the PDCCHs according to the first group of search space sets, the second group of search space sets, or the third group of search space sets based on the first value.

17. The base station of claim 15, wherein the first group of search space sets and the second group of search space sets exclude search space sets associated with PDCCH transmissions that schedule PDSCH transmissions that include any of:
  a system information block (SIB),
  a random access response (RAR), and
  paging.

18. The base station of claim 15, wherein:
the first group of search space sets is associated with PDCCH transmissions in any control resource sets (CORESETs), and
the second group of search space sets is associated with PDCCH transmissions in CORESETs that do not have a first index.

19. The base station of claim 15, wherein the transceiver is further configured to:
transmit information for a duration having a unit of one slot, wherein a second value of the field indicates the duration, and
skip transmission of PDCCHs according to the first group of search space sets and the second group of search space sets over the duration.

20. The base station of claim 15, wherein:
the transceiver is further configured to transmit:
  information for a timer value having a unit of one slot, and
  PDCCHs according to the first group of search space sets in a second slot that is after the first slot by a number of slots equal to the timer value,
the first value indicates the second group index, and
the transceiver does not transmit PDCCHs that provide DCI formats with a cyclic redundancy check (CRC) scrambled by predetermined radio network temporary identifiers (RNTIs) over the number of slots.

* * * * *